United States Patent
Ohashi et al.

(10) Patent No.: US 10,680,223 B2
(45) Date of Patent: *Jun. 9, 2020

(54) LAMINATED SEPARATOR, POLYOLEFIN MICROPOROUS MEMBRANE, AND SEPARATOR FOR ELECTRICITY STORAGE DEVICE

(71) Applicant: Asahi Kasei E-materials Corporation, Tokyo (JP)

(72) Inventors: Masahiro Ohashi, Tokyo (JP); Keitaro Ameyama, Tokyo (JP); Yuzuru Sakakibara, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 15/147,399

(22) Filed: May 5, 2016

(65) Prior Publication Data

US 2016/0254513 A1 Sep. 1, 2016

Related U.S. Application Data

(60) Continuation of application No. 14/302,213, filed on Jun. 11, 2014, now Pat. No. 9,882,190, which is a (Continued)

(30) Foreign Application Priority Data

Mar. 9, 2009 (JP) ................... 2009-054795
Mar. 17, 2009 (JP) ................... 2009-064533
(Continued)

(51) Int. Cl.
*H01M 2/16* (2006.01)
*B29C 48/00* (2019.01)
(Continued)

(52) U.S. Cl.
CPC ....... *H01M 2/1686* (2013.01); *B29C 48/0018* (2019.02); *B29C 67/202* (2013.01);
(Continued)

(58) Field of Classification Search
CPC .. H01M 2/1686; H01M 2/145; H01M 2/1653; H01M 2/166; B29C 47/0057;
(Continued)

(56) References Cited

U.S. PATENT DOCUMENTS 4,650,730 A 3/1987 Lundquist et al.
4,791,144 A 12/1988 Nagou et al.
(Continued)

FOREIGN PATENT DOCUMENTS

CN 101331178 A 12/2008
CN 101469078 A 7/2009
(Continued)

OTHER PUBLICATIONS

"Lithium Ion Secondary Batteries Second Edition—Materials and Applications-" Nikkan Kogyo Shimbun, Ltd., 111 (2000).
(Continued)

*Primary Examiner* — Sean P Cullen
(74) *Attorney, Agent, or Firm* — Morgan, Lewis & Bockius LLP

(57) ABSTRACT

Disclosed is a laminated separator including a first polyolefin microporous layer and a second polyolefin microporous layer which is laminated on the first polyolefin microporous layer and which is different from the first polyolefin microporous layer, wherein at least one of the first microporous layer and the second microporous layer includes an inorganic particle having a primary particle size of 1 nm or more and 80 nm or less.

19 Claims, 1 Drawing Sheet

Related U.S. Application Data division of application No. 13/255,424, filed as application No. PCT/JP2010/053899 on Mar. 9, 2010, now Pat. No. 9,356,275.

(30) Foreign Application Priority Data

| Dec. 10, 2009 | (JP) | 2009-280486 |
|---|---|---|
| Dec. 10, 2009 | (JP) | 2009-280488 |
| Feb. 3, 2010 | (JP) | 2010-021859 |
| Feb. 3, 2010 | (JP) | 2010-022481 |

(51) Int. Cl.

| B32B 27/08 | (2006.01) |
| B32B 27/18 | (2006.01) |
| B32B 27/20 | (2006.01) |
| B32B 27/32 | (2006.01) |
| H01M 2/14 | (2006.01) |
| B29C 67/20 | (2006.01) |
| H01M 10/0525 | (2010.01) |
| H01M 10/052 | (2010.01) |
| B29K 23/00 | (2006.01) |
| B29L 31/00 | (2006.01) |

(52) U.S. Cl.
CPC .............. *B32B 27/08* (2013.01); *B32B 27/18* (2013.01); *B32B 27/205* (2013.01); *B32B 27/32* (2013.01); *H01M 2/145* (2013.01); *H01M 2/166* (2013.01); *H01M 2/1653* (2013.01); *H01M 10/0525* (2013.01); *B29K 2023/12* (2013.01); *B29L 2031/755* (2013.01); *B32B 2250/03* (2013.01); *B32B 2250/24* (2013.01); *B32B 2250/242* (2013.01); *B32B 2250/40* (2013.01); *B32B 2264/102* (2013.01); *B32B 2270/00* (2013.01); *B32B 2305/026* (2013.01); *B32B 2305/30* (2013.01); *B32B 2307/306* (2013.01); *B32B 2307/518* (2013.01); *B32B 2307/724* (2013.01); *H01M 10/052* (2013.01); *Y02T 10/7011* (2013.01)

(58) Field of Classification Search
CPC ....... B29C 67/202; B32B 27/08; B32B 27/18; B32B 27/205; B32B 27/32
USPC .................. 429/144, 249, 251, 252, 254
See application file for complete search history.

(56) References Cited

U.S. PATENT DOCUMENTS

| 5,169,712 | A | 12/1992 | Tapp |
|---|---|---|---|
| 5,176,953 | A | 1/1993 | Jacoby et al. |
| 5,491,188 | A | 2/1996 | Ikeda et al. |
| 5,910,136 | A | 6/1999 | Hetzler et al. |
| 6,072,005 | A | 6/2000 | Kobylivker et al. |
| 6,180,280 | B1 | 1/2001 | Spotnitz |
| 6,432,586 | B1 | 8/2002 | Zhang |
| 9,853,272 | B2 * | 12/2017 | Ohashi ............... B32B 27/08 |
| 2003/0148091 | A1 | 8/2003 | Ikeda et al. |
| 2005/0087487 | A1 | 4/2005 | Sakamoto et al. |
| 2006/0088769 | A1 | 4/2006 | Arora et al. |
| 2006/0127753 | A1 | 6/2006 | Nakashima et al. |
| 2007/0264578 | A1 | 11/2007 | Ozaki et al. |
| 2008/0193833 | A1 | 8/2008 | Ohashi et al. |
| 2009/0117453 | A1 | 5/2009 | Kikuchi et al. |
| 2009/0169862 | A1 | 7/2009 | Rhee et al. |
| 2009/0186280 | A1 | 7/2009 | Iidani et al. |
| 2010/0009265 | A1 | 1/2010 | Hatayarna et al. |
| 2010/0112432 | A1 * | 5/2010 | Nishida ............... H01M 2/1653 429/144 |
| 2011/0064934 | A1 | 3/2011 | Peters et al. |
| 2011/0064990 | A1 | 3/2011 | Mohr et al. |
| 2011/0268942 | A1 | 11/2011 | Rhee et al. |
| 2012/0015229 | A1 | 1/2012 | Ohashi et al. |
| 2013/0129950 | A1 | 5/2013 | Hersche et al. |
| 2014/0329127 | A1 | 11/2014 | Ohashi et al. |
| 2014/0329128 | A1 | 11/2014 | Ohashi et al. |
| 2014/0329129 | A1 | 11/2014 | Ohashi et al. |

FOREIGN PATENT DOCUMENTS

| EP | 0201875 A2 | 11/1986 |
|---|---|---|
| EP | 0951080 A1 | 10/1999 |
| EP | 1251573 A2 | 10/2002 |
| EP | 1291380 A | 3/2003 |
| EP | 1151486 B1 | 5/2003 |
| EP | 1698656 A1 | 9/2006 |
| EP | 2018962 A1 | 1/2009 |
| GB | 1126849 A | 9/1968 |
| GB | 1195958 A | 6/1970 |
| JP | S62-010857 A | 1/1987 |
| JP | S63-037560 A | 2/1988 |
| JP | S63-243146 A | 10/1988 |
| JP | H08-020659 A | 1/1996 |
| JP | H09-180699 A1 | 7/1997 |
| JP | H11-080395 A | 3/1999 |
| JP | H11-195409 A1 | 7/1999 |
| JP | H11-199692 A | 7/1999 |
| JP | H11-322989 A | 11/1999 |
| JP | 2000-173574 A | 6/2000 |
| JP | 2000-191852 A | 7/2000 |
| JP | 2001-266828 A | 9/2001 |
| JP | 2002-321323 A | 11/2002 |
| JP | 2003-238720 A | 8/2003 |
| JP | 2003-327731 A1 | 11/2003 |
| JP | 2005-071978 A | 3/2005 |
| JP | 2006-273987 A | 10/2006 |
| JP | 2006-307163 A | 11/2006 |
| JP | 2007-231289 A | 9/2007 |
| JP | 2007-250025 A | 9/2007 |
| JP | 4049416 B2 | 2/2008 |
| JP | 4136008 B2 | 6/2008 |
| JP | 2008-214425 A | 9/2008 |
| JP | 2008-226703 A | 9/2008 |
| JP | 2008-254288 A | 10/2008 |
| JP | 2009-185093 A | 8/2009 |
| JP | 2009-266808 A | 11/2009 |
| JP | 2009266808 A * | 11/2009 |
| WO | 2006/038532 A1 | 4/2006 |
| WO | 2006/137540 A1 | 12/2006 |
| WO | 2007/116672 A | 10/2007 |
| WO | 2008/035674 A1 | 3/2008 |
| WO | 2009/132802 A2 | 11/2009 |
| WO | 2009/132803 A2 | 11/2009 |

OTHER PUBLICATIONS

Takemura et al., "A powder particle size effect on ceramic powder based separator for lithium rechargeable battery," Journal of Power Sources, 146: 779-783 (2005).
Carman et al., "Monomer Sequence Distribution in Ethylene-Propylene Rubber Measured by 13C NMR 3, Use of Reaction Probability Model," The B.F. Goodrich Company, 10: 537 (1977).
Kakugo et al., "13C NMR Determination of Monomer Sequence Distribution in Ethylene-Propylene Copolymers Prepared with TiCl3—Al(C2H5)2Cl," American Chemical Society, 15: 1150-1152 (1982).
International Preliminary Report on Patentability issued in related International Patent Application No. PCT/JP2010/053899 dated Oct. 27, 2011.
Extended European Search Report issued in related European Patent Application No. 10750830.1 dated May 3, 2013.
Office Action issued in related Chinese Patent Application No. 201080011547.1 dated Aug. 19, 2013.
Extended European Search Report issued in related European Patent Application No. 13182599.4 dated Sep. 30, 2013.
Masamoto et al., "Development of Separator for Lithium Ion Secondary Battery and Its Application to the New Field," Research

(56) References Cited

OTHER PUBLICATIONS

Bulletin of Fukai Kogyo Daigaku, 37: 265-272 (2007) (see English abstract).
Hitachi Brochure, S-4700: Cold Field Emission Scanning Electron Microscope (2000).
Watt, "The principles and practice of Electron Microscopy," 24-29, 88-91, 116-125 (1997).
European Search Report issued in corresponding European Patent Application No. 18168699.9 dated Aug. 21, 2018.
Bp Polypropylene Eltext P KS419N6632—material safety data sheet (2000).

* cited by examiner

LAMINATED SEPARATOR, POLYOLEFIN MICROPOROUS MEMBRANE, AND SEPARATOR FOR ELECTRICITY STORAGE DEVICE

TECHNICAL FIELD

The present invention relates to a laminated separator, a polyolefin microporous membrane, a separator for an electricity storage device and the like.

BACKGROUND ART

Polyolefin resin microporous membranes have been used as separators for batteries, in particular, separators for lithium ion batteries. Lithium ion batteries have been used in small size electronic devices such as cellular phones and notebook-size personal computers, and also have been attempted to be applied to electric tools, hybrid vehicles, electric vehicles and the like.

For separators for lithium ion batteries, polyethylene microporous membranes have hitherto been used. This is because polyethylene microporous membranes are excellent in permeability, and have a function to perform shutdown of the current by blocking continuous pores through melting the polymer at 130° C. to 150° C., for the purpose of ensuring the safety of the batteries. The term "shutdown" means a phenomenon in which the pores of a microporous membrane are blocked by a molten resin to increase the electrical resistance of the membrane and consequently the membrane shuts down the flow of the lithium ions.

In this connection, from the viewpoint of more improving the safety of electricity storage devices, the separator is required to have, in addition to mechanical properties, above a certain level, not to be broken during repeated charge-discharge cycles, the properties such as the property (fuse property) to rapidly halt the battery reaction when abnormal heating occurs, and the property (short-circuit property) to prevent a dangerous situation of the direct reaction between the positive electrode material and the negative electrode material through maintaining the shape of the separator even when the temperature comes to be high.

It is recognized that the lower is the temperature at which the fuse occurs, the higher is the effect to safety. The higher temperature at which short-circuit occurs is preferable from the viewpoint of maintaining the film shape even after the blocking of the pores and maintaining the insulation between the electrodes.

Recently, for the purpose of further improving the safety of batteries, there have been proposed a method in which a layer mainly composed of an insulating inorganic filler is formed between the separator and each of the electrodes (for example, Patent Literature 1), and a separator made of a polyethylene microporous membrane including an inorganic substance (for example, Patent Literature 2 and Patent Literature 3).

As an attempt to increase the heat resistance of the separator, there have been performed an attempt to blend polypropylene high in melting point with polyethylene, and an attempt to laminate a polyethylene microporous membrane and a polypropylene microporous membrane (see, for example, Patent Literature 4 and Patent Literature 5).

CITATION LIST

Patent Literature

Patent Literature 1: Japanese Patent Laid-Open No. 11-080395
Patent Literature 2: Japanese Patent No. 4049416
Patent Literature 3: Japanese Patent Laid-Open No. 2001-266828
Patent Literature 4: Japanese Patent Laid-Open No. 63-243146
Patent Literature 5: Japanese Patent Laid-Open No. 62-010857

SUMMARY OF INVENTION

Technical Problem

However, any of the separators described in Patent Literature 1 to Patent Literature 3 still has room for improvement from the viewpoint of bringing about a high level of compatibility between the heat resistance, the shutdown property and the cycle property.

In view of such circumstances, a first problem to be solved by the present invention is to provide a separator having a high level of compatibility between the heat resistance, the shutdown property and the cycle property.

Any of the microporous membranes described in Patent Literature 4 and Patent Literature 5 still has room for improvement from the viewpoint of the property (cycle property) of satisfactorily maintaining the battery capacity after repeated charge-discharge cycles.

In view of such circumstances, a second problem to be solved by the present invention is to provide a polyolefin microporous membrane suitable as a separator capable of improving the cycle property of an electricity storage device.

Solution to Problem

In view of the aforementioned circumstances, the present inventors made a diligent study and consequently have found that a laminated separator including inorganic particles having a particle size falling within a specific range and having a laminated structure is capable of having a high level of compatibility between the heat resistance, the shutdown property and the cycle property.

The present inventors have also found that a polypropylene-based polyolefin microporous membrane having a specific composition is capable of solving the aforementioned second problem.

Further, the present inventors have found that the aforementioned second problem can be solved by mixing a specific propylene copolymer in a specific amount in the polypropylene based microporous membrane.

Further, the present inventors have found that the aforementioned second problem can be solved by mixing a specific propylene copolymer in a specific amount in the polypropylene based microporous membrane including an inorganic filler.

Specifically, the present invention is as follows.

[1] A laminated separator including a first polyolefin microporous layer and a second polyolefin microporous layer which is laminated on the first polyolefin microporous layer and which is different from the first polyolefin microporous layer, wherein at least one of the first microporous layer and the second microporous layer includes an inorganic particle having a primary particle size of 1 nm or more and 80 nm or less.

[2] The laminated separator according to [1], wherein the difference between the concentration C1 of the inorganic particle in the total amount of the polyolefin resin and the inorganic particle in the first polyolefin microporous layer and the concentration C2 of the inorganic particle in the total amount of the polyolefin resin and the inorganic particle in the second polyolefin microporous layer is 10% by mass or more and 95% by mass or less.

[3] The laminated separator according to [1] or [2], wherein the inorganic particle is one or two or more selected from the group consisting of silicon oxide, aluminum oxide and titanium oxide.

[4] The laminated separator according to any one of [1] to [3], wherein: the laminated separator has a two-type three-layer structure including the first polyolefin microporous layers as surface layers and the second polyolefin microporous layer as an intermediate layer; and the first polyolefin microporous layer includes polyolefin resin in an amount of 5 to 90% by mass based on the total amount of the polyolefin resin and the inorganic particle which are the constituent components of the first microporous layer, and the second polyolefin microporous layer includes polyolefin resin in an amount of 60 to 100% by mass based on the total amount of the polyolefin resin and the inorganic particle which are the constituent components of the second microporous layer.

[5] The laminated separator according to [4], wherein in each of the surface layers, the polyolefin resin includes polyethylene and polypropylene, and at the same time, the proportion of the polypropylene in the total amount of the polyethylene and polypropylene is 10% by mass or more and 95% by mass or less.

[6] A polyolefin microporous membrane formed of a polyolefin resin, as a main component, including 50 to 99% by mass of polypropylene and 1 to 50% by mass of propylene-α-olefin copolymer, wherein the content of the α-olefin in the propylene-α-olefin copolymer is more than 1% by mass and 15% by mass or less.

[7] The polyolefin microporous membrane according to [6], wherein the mixing ratio (polypropylene/propylene-α-olefin copolymer) (mass ratio) between the polypropylene and the propylene-α-olefin copolymer is 1.5 or more and 60 or less.

[8] The polyolefin microporous membrane according to [6] or [7], wherein the polyolefin resin further includes a high-density polyethylene, and the proportion of the high-density polyethylene in the polyolefin resin is 5 to 45% by mass.

[9] The polyolefin microporous membrane according to any one of [6] to [8], wherein the polyolefin resin further includes an inorganic filler, and the proportion of the inorganic filler in the total amount of the inorganic filler and the polyolefin resin is 1 to 80% by mass.

[10] The polyolefin microporous membrane according to [9], wherein the inorganic filler is one or more selected from the group consisting of silica, alumina and titania.

[11] A laminated polyolefin microporous membrane wherein on at least one side of the polyolefin microporous membrane according to any one of [6] to [10], another polyolefin microporous membrane different from the polyolefin microporous membrane is laminated.

[12] A separator for an electricity storage device, formed of the polyolefin microporous membrane according to any one of [6] to [10], or the laminated polyolefin microporous membrane according to [11].

[13] A polyolefin microporous membrane formed of a propylene-based resin composition including a polypropylene-based resin having (polypropylene)/(propylene copolymer) (mass ratio) of 80/20 to 0/100 as a main component, wherein the melting point of the propylene copolymer is 120° C. or higher and 145° C. or lower.

[14] The polyolefin microporous membrane according to [13], wherein the propylene copolymer is a random copolymer.

[15] The polyolefin microporous membrane according to [13] or [14], wherein the content of the comonomer included in the propylene copolymer is more than 1% by mass and 20% by mass or less.

[16] The polyolefin microporous membrane according to any one of [13] to [15], wherein the propylene-based resin composition further includes a high-density polyethylene, and the proportion of the high-density polyethylene in the propylene-based resin composition is 5 to 50% by mass.

[17] The polyolefin microporous membrane according to any one of [13] to [16], wherein the propylene-based resin composition further includes an inorganic filler, and the proportion of the inorganic filler in the propylene-based resin composition is 5 to 60% by mass.

[18] A laminated polyolefin microporous membrane, wherein on at least one side of the polyolefin microporous membrane according to any one of [13] to [17], another polyolefin microporous membrane different from the polyolefin microporous membrane is laminated.

[19] A separator for a nonaqueous electrolyte including the polyolefin microporous membrane according to any one of [13] to [17], or the laminated polyolefin microporous membrane according to [18].

[20] A method for producing the polyolefin microporous membrane according to any one of [13] to [17] or the laminated polyolefin microporous membrane according to [18], the method including:

(1) a kneading step of forming, according to an intended layer structure, a kneaded mixture by kneading a propylene-based resin composition including a polypropylene-based resin having a ratio of (polypropylene)/(propylene copolymer) (mass ratio) of 80/20 to 0/100 as a main component and a plasticizer, and where necessary, a high-density polyethylene and an inorganic filler;

(2) a sheet molding step, following the kneading step, of processing the kneaded mixture into a sheet-like molded body (a monolayer molded body or a laminated molded body) by extruding the kneaded mixture into a sheet and, where necessary, by laminating the resulting sheets into a laminated body, and cooling and solidifying the resulting monolayer body or the resulting laminated body;

(3) a stretching step, following the molding step, of forming a stretched product by biaxially stretching the sheet-like molded body with an area magnification of 20× or more and 200× or less;

(4) a porous body forming step, following the stretching step, of forming a porous body by extracting the plasticizer from the stretched product; and (5) a heat treatment step, following the porous body forming step, of heat treating the porous body at a temperature equal to or lower than the melting point of the polyolefin resin and widthwise stretching the porous body.

[21] The method according to [20], wherein the heat of fusion of the propylene copolymer is 60 J/g or more.

[22] A polyolefin microporous membrane, formed of a polypropylene-based resin composition including 20 to 95% by mass of a polypropylene-based resin having (polypropylene)/(propylene copolymer) (mass ratio) of 90/10 to 0/100 and 5 to 80% by mass of an inorganic filler, wherein the melting point of the propylene copolymer is 110° C. to 150° C.; and the (propylene copolymer)/(inorganic filler) (mass ratio) is 0.1/1 to 1.5/1.

[23] The polyolefin microporous membrane according to [22], wherein the propylene copolymer is a random copolymer.

[24] The polyolefin microporous membrane according to [22] or [23], wherein the content of the comonomer included in the propylene copolymer is more than 1% by mass and 20% by mass or less.

[25] The polyolefin microporous membrane according to any one of [22] to [24], wherein the propylene-based resin composition further includes a high-density polyethylene; and the proportion of the high-density polyethylene in the propylene-based resin composition is 5 to 60% by mass.

[26] The polyolefin microporous membrane according to any one of [22] to [25], wherein the inorganic filler is any of silica, alumina and titania.

[27] The laminated polyolefin microporous membrane, wherein on at least one side of the polyolefin microporous membrane according to any one of [22] to [26], another polyolefin microporous membrane different from the polyolefin microporous membrane is laminated.

[28] A separator for a nonaqueous electrolyte including the polyolefin microporous membrane according to any one of [22] to [26], or the laminated polyolefin microporous membrane according to [27].

[29] A method for producing the polyolefin microporous membrane according to any one of [22] to [26] or the laminated polyolefin microporous membrane according to [27], the method including:

(1) a kneading step of forming, according to an intended layer structure, a kneaded mixture by kneading a polypropylene-based resin composition including 20 to 95% by mass of a polypropylene-based resin having (polypropylene)/(propylene copolymer) (mass ratio) of 90/10 to 0/100 and 5 to 80% by mass of an inorganic filler, and a plasticizer, and where necessary, a high-density polyethylene;

(2) a sheet molding step, following the kneading step, of processing the kneaded mixture into a sheet-like molded body (a monolayer molded body or a laminated molded body) by extruding the kneaded mixture into a sheet and, where necessary, by laminating the resulting sheet into a laminated body, and cooling and solidifying the resulting monolayer body or the resulting laminated body;

(3) a stretching step, following the molding step, of forming a stretched product by biaxially stretching the sheet-like molded body with an area magnification of 20× or more and 200× or less;

(4) a porous body forming step, following the stretching step, of forming a porous body by extracting the plasticizer from the stretched product; and (5) a heat treatment step, following the porous body forming step, of heat treating the porous body at a temperature equal to or lower than the melting point of the polyolefin resin and widthwise stretching the porous body.

[30] The method according to [29], wherein the heat of fusion of the propylene copolymer is 60 J/g or more.

Advantageous Effects of Invention

According to the present invention, a separator having a high level of compatibility between the heat resistance, the shutdown property and the cycle property is provided.

Additionally, according to the present invention, a polyolefin microporous membrane suitable as a separator capable of improving the cycle property of an electricity storage device is provided.

DESCRIPTION OF EMBODIMENTS

Figure 1A:
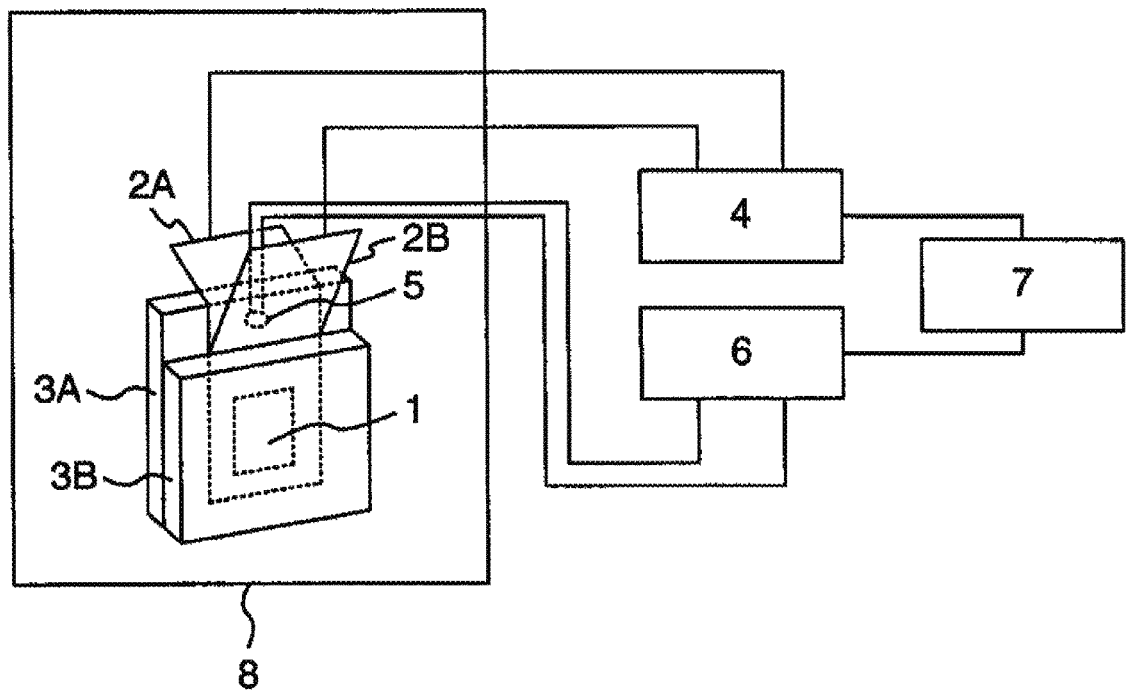
FIGS. 1(A)-1(C) show schematic views illustrating a shutdown temperature measurement apparatus used in Examples.

Hereinafter, modes for carrying out the present invention (hereinafter, abbreviated as the "embodiments") are described in detail. It is to be noted that the present invention is not limited to following Embodiments and can be embodied in various modified forms within the range of the gist of the present invention.

First Embodiment

A laminated separator of a first embodiment of the present invention (hereinafter, abbreviated as "Embodiment 1") includes a first polyolefin microporous membrane (hereinafter, also referred to as the "first microporous layer") and a second polyolefin microporous membrane (hereinafter, also referred to as the "second microporous layer") laminated on the first microporous layer and different from the first microporous layer, wherein at least one of the first microporous layer and the second microporous layer includes an inorganic particle (also described as the "inorganic filler" as the case may be) having a primary particle size of 1 nm or more and 80 nm or less.

The primary particle size of the inorganic particle used in Embodiment 1 is 1 nm or more and 80 nm or less. An inorganic particle having a primary particle size falling within the aforementioned range is able to be finely dispersed in polyolefin in a satisfactory manner, and hence it is inferred that such an inorganic particle is satisfactorily fusion bonded to polyolefin, to enable drastic improvement the melt tension of the fibrillar portion of the three-dimensional network skeleton structure of the separator.

On the other hand, the laminated separator of Embodiment 1 has a laminated structure, the respective layers are formed under different conditions, and hence it is inferred that the respective layers are different from each other in the properties such as the pore structure, the melting behavior and the dispersion condition of the inorganic particle. The adoption of an inorganic particle having a primary particle size falling within the aforementioned specific range and the aforementioned laminated structure results in realization of an unexpected effect such that a high level of compatibility between the heat resistance, the shutdown property and the cycle property is achieved.

Although the mechanism for this effect is not clear, it is inferred that the presence of such aforementioned differences (presence of the interface(s)) between the respective layers with respect to the melting behavior and the like enables to contribute to the improvement the heat resistance of the separator as a whole, and at the same time, in cooperation with the use of an inorganic particle having a primary particle size falling within a specific range, the pore structure of each of the layers is respectively uniformized in an appropriate manner, such pore structure contributes to the improvement the wettability of the electrolyte, and accordingly contributes to the improvement the cycle property and further enables to contribute to the improvement the shutdown property.

Here, the first polyolefin microporous layer and the second polyolefin microporous layer are different from each other, and the term "different" as used herein may mean the difference either in raw materials or in the structure (specifically, for example, differences in porosity and pore structure).

Examples of the polyolefin resin used in the first polyolefin microporous layer or the second polyolefin microporous layer include the polymers (homopolymers and copolymer, and multistage polymers and the like) obtained by polymerizing the monomers such as ethylene, propylene, 1-butene, 4-methyl-1-pentene, 1-hexene and 1-octene. The polymers can be used each alone or in combinations of two or more thereof.

Examples of the polyolefin resin include: polyethylene (for example, low-density polyethylene, linear low-density polyethylene, medium-density polyethylene, high-density polyethylene (density: 0.942 $g/cm^3$ or more) and ultra high molecular weight polyethylene); polypropylene (for example, isotactic polypropylene and atactic polypropylene); polybutene; ethylene-propylene rubber; propylene-ethylene copolymer; and propylene-α-olefin copolymer. In the propylene-ethylene copolymer and the propylene-α-olefin copolymer, the positions of ethylene and α-olefin in the polymer chain are not particularly limited; either a random copolymer or a block copolymer may be used. Hereinafter, polyethylene and polypropylene are abbreviated as "PE" and "PP," respectively, as the case may be.

The viscosity average molecular weight of the polyolefin resin is preferably 50,000 or more and more preferably 100,000 or more; the upper limit of the aforementioned molecular weight is preferably 10,000,000 or less and more preferably 3,000,000 or less. It is preferable to set the viscosity average molecular weight at 50,000 or more because such molecular weight increases the melt tension at the time of melt molding, accordingly the improvement the moldability can be expected, sufficient intermolecular entanglement can also be expected and a high strength tends to be attained. On the other hand, it is preferable to set the viscosity average molecular weight at 10,000,000 or less, from the viewpoint of performing uniform melt kneading and from the viewpoint of improving the moldability of the sheet, in particular, the thickness stability of the sheet. In particular, it is preferable to set the viscosity average molecular weight at 3,000,000 or less from the viewpoint of improving the moldability.

From the viewpoint of decreasing the shutdown temperature and improving the safety, the polyolefin resin may include a low molecular weight resin having a viscosity average molecular weight of preferably 800 or more, more preferably 900 or more and furthermore preferably 1000 or more, and an upper limit of the viscosity average molecular weight of 10,000 or less.

Examples of such a low molecular weight resin include polyethylene, polypropylene, polybutene and ethylene-propylene copolymer (inclusive of elastomer); however, from the viewpoint of the membrane formability and the viewpoint of performing uniformly shutdown, polyethylene and polypropylene are more preferable.

The proportion of such a low molecular weight resin in the polyolefin resin is preferably 0.1% by mass or more, more preferably 0.5% by mass or more and furthermore preferably 1% by mass or more, and the upper limit of the aforementioned proportion is preferably 20% by mass or less, more preferably 15% by mass or less and furthermore preferably 10% by mass or less.

For the below described layer including an inorganic particle, from the viewpoint of uniformly dispersing the inorganic particle, a high-density polyethylene having a viscosity average molecular weight of 200,000 or more and 3,000,000 or less and an ultra high molecular weight polyethylene having a viscosity average molecular weight of 1,000,000 or more are preferably used each alone or in combination.

Examples of the inorganic particle may include: (1) the oxides or nitrides of the elements such as silicon, aluminum and titanium; and (2) the carbonates or sulfates of the elements such as calcium and barium. It is preferable to use the inorganic particles of (1) or (2), from the viewpoint of achieving a higher level of compatibility between the heat resistance and the cycle property of the obtained separator.

Such inorganic particles are preferably present in a microporous layer as separately dispersed therein or may also be present as dispersed in a partially aggregated form.

The lower limit of the primary particle size of the inorganic particle is 1 nm or more, preferably 6 nm or more and furthermore preferably 10 nm or more, and the upper limit of the aforementioned primary particle size is 80 nm or less, preferably 50 nm or less and furthermore preferably 30 nm or less.

Various additives can be mixed, where necessary, in the resin composition (hereinafter also referred to as the "polyolefin composition") including the polyolefin resin. Examples of such additives include: a phenolic antioxidant, a phosphorus-based antioxidant and a sulfur-based antioxidant; a nucleating agent; metal soaps such as calcium stearate and zinc stearate; an ultraviolet absorber; a light stabilizer, an antistatic agent, an antifogging agent and a pigment.

The proportion of such an additive in the polyolefin composition is preferably 5% by mass or less and more preferably 2% by mass or less, and may also be substantially 0% by mass.

The difference between the concentration C1 of the inorganic particle in the total amount of the polyolefin resin and the inorganic particle in the first polyolefin microporous layer and the concentration C2 of the inorganic particle in the total amount of the polyolefin resin and the inorganic particle in the second polyolefin microporous layer is preferably 10% by mass or more, more preferably 20% by mass or more, furthermore preferably 40% by mass or more and particularly preferably 60% by mass or more. On the other hand, the upper limit of the aforementioned difference is preferably 95% by mass or less and more preferably 80% by mass or less. It is preferable to set the aforementioned concentration difference at 10% by mass or more from the viewpoint of improving the heat resistance and the cycle property. On the other hand, it is preferable to set the aforementioned concentration difference at 95% by mass or less from the viewpoint of ensuring the shutdown property and the puncture strength.

In Embodiment 1, the "inorganic particle concentration" as referred to herein means the proportion of the inorganic particle in the total amount of the polyolefin resin and the inorganic particle.

The difference between the volume proportion of the inorganic particle in the first polyolefin microporous layer and the volume proportion of the inorganic particle in the second polyolefin microporous layer is preferably 10% by volume or more, more preferably 15% by volume or more, furthermore preferably 20% by volume or more and particularly preferably 60% by volume or more. On the other hand, the upper limit of the aforementioned difference is 95% by volume or less and more preferably 80% by volume or less.

Hereinafter, the laminated separator of Embodiment 1 is described with a focus on an aspect having a two-type three-layer structure in which the first polyolefin microporous layers are the surface layers and the second polyolefin microporous layer is the intermediate layer.

The polyolefin resin concentration of the first microporous layer forming each of the surface layers is preferably 5 to 90% by mass and more preferably 20 to 80% by mass.

Here, the polyolefin resin forming each of the surface layers preferably includes PE and PP. The proportion of the PP in the total amount of PE and PP is 10% by mass or more, more preferably 20% by mass or more, furthermore preferably 40% by mass or more, preferably 95% by mass or less, preferably 90% by mass or less and furthermore preferably 80% by mass or less.

The formation of such surface layers is preferable from the viewpoint of obtaining a satisfactory heat resistance and from the viewpoint of improving the stretchability and thus obtaining a microporous membrane having a high puncture strength.

In Embodiment 1, the "polyolefin resin concentration" as referred to herein means the proportion of the polyolefin resin in the total amount of the polyolefin resin and the inorganic particle.

The C1 in each of the surface layers is preferably 10% by mass or more, more preferably 20% by mass or more, furthermore preferably 40% by mass or more and particularly preferably 60% by mass or more, and the upper limit of the C1 is preferably 95% by mass or less, more preferably 90% by mass or less and furthermore preferably 80% by mass or less. It is preferable to set the aforementioned proportion at 10% by mass or more from the viewpoint of improving the heat resistance and the cycle property. On the other hand, it is preferable to set the aforementioned proportion at 95% by mass or less from the viewpoint of improving the membrane formability at a high stretching magnification and thus improving the puncture strength of the polyolefin resin microporous membrane.

The use of the inorganic particle in combination with PE and PP in each of the surface layers, combined with the setting of the proportions of the individual components in the aforementioned ranges is preferable from the viewpoint of improving the interaction between the polyolefin resin and the inorganic particle and accordingly achieving a higher level of compatibility between the heat resistance and the cycle property of the obtained laminated separator.

The volume proportion of the inorganic filler in the first polyolefin microporous layer is preferably 10% by volume or more, more preferably 15% by volume or more and furthermore preferably 20% by volume or more, and the upper limit of the aforementioned volume proportion is preferably 95% by volume.

The polyolefin resin concentration of the second microporous layer forming the intermediate layer is preferably 60% by mass or more, more preferably 80% by mass or more and furthermore preferably 90% by mass or more, and may also be 100% by mass.

The polyolefin resin used for the intermediate layer preferably includes PE as a main component; however, it is possible to use PP in combination with PE within a range not to impair the shutdown property. In the intermediate layer, the proportion of PE in the total amount of PE and PP is preferably 60% by mass or more and more preferably 80% by mass or more, and may also be 100% by mass.

The C2 in the intermediate layer is preferably 60% by mass or less, more preferably 40% by mass or less, furthermore preferably 20% by mass and yet furthermore preferably 10% by mass or less, and may also be 0% by mass. The aforementioned proportion set at 60% by mass or less is preferable from the viewpoint of the shutdown property.

The volume proportion of the inorganic filler in the second polyolefin microporous layer is preferably 60% by volume or less, more preferably 40% by volume or less and furthermore preferably 20% by volume or less and yet furthermore preferably 10% by volume or less, and may also be 0% by volume.

The specific gravity of the inorganic filler is preferably 1.0 g/cm$^3$ or more, more preferably 1.2 g/cm$^3$ or more, furthermore preferably 1.5 g/cm$^3$ or more, and the upper limit of the aforementioned specific gravity is preferably 10.0 g/cm$^3$ or less.

From the viewpoint of the heat resistance, the shutdown property and the cycle property, preferable is a configuration having a two-type three-layer structure in which the first microporous layers are the surface layers and the second microporous layer is the intermediate layer, wherein the first microporous layer includes polyolefin resin and an inorganic particle, and the second microporous layer does not include an inorganic particle.

On the other hand, from the viewpoint of the shutdown property and the cycle property and the productivity of the battery manufacture, preferable is a configuration having a two-type three-layer structure in which the second microporous layers are the surface layers and the first microporous layer is the intermediate layer, wherein the first microporous layer includes polyolefin resin and an inorganic particle, and the second microporous layer does not include an inorganic particle.

The method for producing the laminated separator of Embodiment 1 is not particularly limited; however, examples of such a method may include a production method including the following steps (1) to (4):

(1) a step of melt-kneading the raw materials (polyolefin composition, and a plasticizer) forming each of a plurality of layers;

(2) a step, following the step (1), of coextruding the kneaded mixtures obtained by melt-kneading to form a laminated sheet, and cooling and solidifying the resulting laminated sheet;

(3) a step, following the step (2), of stretching the laminated sheet in at least one axial direction, with an area magnification of 20× or more and less than 200×;

(4) a step, preceding or following the step (3), of extracting the plasticizer.

The plasticizer used in the step (1) is preferably a non-volatile solvent capable of forming a uniform molten resin at a temperature equal to or higher than the melting point of polyolefin resin when the plasticizer is mixed with polyolefin resin, and is preferably liquid at normal temperature. Examples of the plasticizer include: hydrocarbons such as liquid paraffin and paraffin wax; esters such as dioctyl phthalate and dibutyl phthalate; and higher alcohols such as oleyl alcohol and stearyl alcohol.

The mixing proportion of the plasticizer based on the polyolefin composition is such that the mixing proportion allows uniform melt kneading, is a proportion sufficient for forming a sheet-like microporous membrane precursor and is of an order not to impair the productivity. Specifically, the content of the plasticizer (plasticizer proportion) in the total amount of the polyolefin composition and the plasticizer is preferably 20% by mass or more and 80% by mass or less and more preferably 30% by mass or more and 70% by mass or less. The content of the plasticizer set at 80% by mass or less is preferable from the viewpoint of maintaining the high melt tension at the time of melt molding and thus ensuring the moldability. On the other hand, the content of the plasticizer set at 20% by mass or more is preferable from the viewpoint of ensuring the moldability and the viewpoint of efficiently stretching the lamellar crystal in the crystalline region of the polyolefin resin. The efficient stretching of the lamellar crystal means the efficient stretching of the polyolefin resin chain without breaking the polyolefin resin chain, and is probably capable of contributing to the formation of uniform and fine pore structure and the improve of the microporous membrane strength.

The method for melt kneading the polyolefin composition and the plasticizer is preferably such that two or more extruders are used, the polyolefin resin and, where necessary, the inorganic particle and individual additives are placed, the plasticizer is introduced at an optional proportion into the polyolefin composition while the polyolefin composition is being heated and melted, and the composition is further kneaded to yield a uniform molten resin. Additionally, the method for melt kneading the polyolefin resin, the inorganic particle and the plasticizer is preferably such that in a preliminary step of beforehand kneading the polyolefin resin, the inorganic particle and the plasticizer in a predetermined ratio with a mixer such as Henschel mixer, and then the kneaded mixture is placed in an extruder and further kneaded with the plasticizer introduced into the kneaded mixture with an optional proportion while the kneaded mixture is being heated and melted.

In the coextrusion method in the step (2), preferable is intra-die adhesion in which molten mixtures from two or more extruders are extruded form a die lip, and it is preferable to use a multiple manifold method or a feed block method. Here, it is preferable to use a flat die such as a T-die or a coat hanger die.

The cooling and solidification in the step (2) is preferably performed, for example, with a method in which the product molded into a sheet shape is brought into contact with a heat conductor to cool the sheet-shaped product to a temperature sufficiently lower than the crystallization temperature of the resin.

In the step (3), as for the stretching direction, at least a uniaxial stretching is adopted. It is preferable to performing a high-magnification biaxial stretching since molecular orientation occurs in the plane direction to provide a hardly tearable and stable structure, and a high puncture strength tends to be obtained. With respect to the stretching method, simultaneous biaxial stretching, successive biaxial stretching, multiple stage stretching and multiple time stretching may be applied each alone or in all possible combinations; however, adopting simultaneous biaxial stretching as the stretching method is particularly preferable from the viewpoint of increasing the puncture strength and uniformizing the membrane thickness.

The stretching magnification ratio between MD and TD is preferably 0.5 or more and 2 or less. The stretching magnification in terms of the area magnification is preferably in a range of 20× or more and less than 200×, more preferably in a range of 20× or more and 100× or less and furthermore preferably in a range of 25× or more and 50× or less. When the total area magnification is 20× or more, a sufficient puncture strength tends to be able to be imparted to the membrane, and when the total area magnification is less than 200×, preferably the membrane fracture tends to be prevented and a high productivity tends to be obtained.

The term "MD" means the lengthwise direction of the separator or the discharge direction of the raw material resin at the time of membrane formation, and the term "TD" means the widthwise direction of the separator.

The stretching temperature is preferably equal to or higher than the melting point of polyolefin −50° C. and preferably lower than the melting point of polyolefin. The stretching temperature is more preferably equal to or higher than the melting point of polyolefin −30° C. and equal to or lower than the melting point −2° C., and furthermore preferably equal to or higher than the melting point of polyolefin −15° C. and equal to or lower than the melting point −3° C. The stretching temperature set at a temperature equal to or higher than the melting point of polyolefin −50° C. is preferable from the viewpoint of the high puncture strength. The stretching temperature set at a temperature lower than the melting point of polyolefin is preferable from the viewpoint of the reduction of the stretching unevenness.

The step (4) may be of either a batch type or a continuous type; preferably the laminated sheet is immersed in an extraction solvent to extract the plasticizer, then the laminated sheet is sufficiently dried, and thus the plasticizer is substantially removed from the microporous membrane. For the purpose of suppressing the contraction of the laminated sheet, it is preferable to constrain the ends of the laminated sheet during a series of the steps of immersion and drying. The residual amount of the plasticizer in the laminated sheets having been subjected to the extraction is preferably made to be less than 1% by mass. When additives are included, it is preferable to extract the additives together with the plasticizer in the step of extracting the plasticizer, and preferably the residual amount of the plasticizer in the membrane is substantially 0%.

Preferably, the extraction solvent is a poor solvent for polyolefin resin and the inorganic particle, a good solvent for the plasticizer, and has a boiling point lower than the melting point of the polyolefin resin. Examples of such an extraction solvent include: hydrocarbons such as n-hexane and cyclohexane; halogenated hydrocarbons such as methylene chloride and 1,1,1-trichloroethane; non-chlorine halogenated solvents such as hydrofluoroether and hydrofluorocarbon; alcohols such as ethanol and isopropanol; ethers such as diethyl ether and tetrahydrofuran; and ketones such as acetone and methyl ethyl ketone.

The addition of a heat treatment step such as thermal fixation or thermal relaxation is preferable because such treatment has a tendency to further suppress the contraction of the obtained laminated separator.

It is also possible to further add a post-processing step. Examples of the post-processing step include hydrophilization treatment with an agent such as a surfactant and cross-linking treatment with ionizing radiation or the like.

For the laminated separator of Embodiment 1, the total membrane thickness is preferably 2 µm or more, more preferably 5 µm or more, preferably 30 µm or less, more preferably 25 µm or less and furthermore preferably 20 µm or less. The total membrane thickness set at 2 µm or more is preferable from the viewpoint of improving the mechanical strength. On the other hand, the total membrane thickness set at 30 µm or less is preferable because such a membrane thickness reduces the volume occupied by the separator to lead to a tendency to be advantageous from the viewpoint of increasing battery capacities.

The lower limit of the thickness of each of the surface layers is preferably 0.5 µm or more, more preferably 1 µm or more and furthermore preferably 2 μm or more; the upper limit of the aforementioned thickness is preferably 15 μm or less, more preferably 10 μm or less and furthermore preferably 5 μm or less. The thickness of each of the surface layers set at 0.5 μm or more is preferable from the viewpoint of heat resistance. On the other hand, the thickness of each of the surface layers set at 15 μm or less is preferable from the viewpoint of improving the mechanical strength.

The porosity of the laminated separator is preferably 40% or more, more preferably 50% or more, preferably 90% or less and more preferably 80% or less. The porosity set at 40% or more is preferable from the viewpoint of battery properties. On the other hand, the porosity set at 90% or less is preferable from the viewpoint of ensuring the puncture strength.

The air permeability of the laminated separator is preferably 10 sec/100 cc or more, more preferably 50 sec/100 cc or more, preferably 1000 sec/100 cc or less, more preferably 500 sec/100 cc or less and furthermore preferably 300 sec/100 cc or less. The air permeability set at 10 sec/100 cc or more is preferable from the viewpoint of suppressing the self-discharge of batteries. On the other hand, the air permeability set at 1000 sec/100 cc or less is preferable from the viewpoint of obtaining satisfactory charge-discharge properties.

The puncture strength of the laminated separator is preferably 3.0 N/20 μm or more, more preferably 4 N/20 μm or more, preferably 10 N/20 μm or less and more preferably 7 N/20 μm or less. The puncture strength set at 3.0 N/20 μm or more is preferable from the viewpoint of suppressing the membrane breakage due to the causes such as the detached active material at the time of battery winding. On the other hand, the puncture strength set at 10 N/20 μm or less is preferable from the viewpoint of reducing thermal contraction.

The shutdown temperature as an index for the shutdown property of the laminated separator is preferably 150° C. or lower, more preferably 145° C. or lower and further more preferably 140° C. or lower. The shutdown temperature set at 150° C. or lower is preferable from the viewpoint of ensuring the safety of batteries.

The measurement value in a soldering test as the index for the heat resistance of the laminated separator is preferably 5.0 $mm^2$ or less and more preferably 4.0 $mm^2$ or less at 300° C., and preferably 8.0 $mm^2$ or less and more preferably 7.0 $mm^2$ or less at 400° C. The measurement values in a soldering test set at 5.0 $mm^2$ or less at 300° C. and 8.0 $mm^2$ at 400° C. are preferable from the viewpoint of the heat resistance and the uniform pore structure formation of a microporous membrane.

The capacity retention ratio as the index for the cycle property of the laminated separator is preferably 80% or more and more preferably 85% or more. The capacity retention ratio set at 80% or more is preferable from the viewpoint of the battery operation life.

The laminated separator of Embodiment 1 is useful as separators for batteries, in particular, lithium ion batteries. Batteries obtained by using the aforementioned laminated separator are excellent in cycle property and safety, and hence are useful for cellular phones, notebook-size personal computers, electric tools, hybrid vehicles and electric vehicles.

Second Embodiment

The polyolefin microporous membrane of a second embodiment of the present invention (hereinafter, abbreviated as "Embodiment 2") is formed of a polyolefin resin, as a main component, including 50 to 99% by mass of polypropylene and 1 to 50% by mass of propylene-α-olefin copolymer, wherein the content of α-olefin in the propylene-α-olefin copolymer is more than 1% by mass and 15% by mass or less.

In Embodiment 2, the separator having a satisfactory cycle property can be realized by adopting the aforementioned composition, and the reasons for this are not clear; however, the reasons are inferred as follows.

Specifically, in Embodiment 2, polypropylene and propylene-α-olefin copolymer are mixed together, and it is inferred that the α-olefin fraction of the propylene-α-olefin copolymer has an action to decrease the crystallinity of polypropylene. When a specific amount of the α-olefin fraction is included in the propylene-α-olefin copolymer, such an α-olefin fraction appropriately acts on the polypropylene fraction, and thus probably regulates the lamellar layers formed in the polypropylene fraction to have appropriate thinness. When a large number of appropriately thin lamellar layers are formed, probably a large number of pores uniform in size are formed in the formation of a microporous membrane. When such a microporous membrane having a large number of such pores uniform in size is disposed inside a battery, ion permeation paths are present uniformly, without being sparse or dense, clogging hardly occurs in repeated charge-discharge cycles, and hence probably the cycle property as a battery is improved.

Examples of the polypropylene include isotactic polypropylene and atactic polypropylene. These polypropylenes can be used each alone or as mixtures of two or more thereof.

The proportion of polypropylene in the polyolefin resin is 50% by mass or more, preferably 60% by mass or more and more preferably 70% by mass or more, and the upper limit of the aforementioned proportion is 99% by mass or less.

On the other hand, the propylene-α-olefin copolymer (simply described as the "propylene copolymer," as the case may be) is formed by using propylene as a monomer and α-olefin as another monomer different from propylene.

Examples of such an α-olefin include ethylene, 1-butene, 4-methyl-1-pentene, 1-hexene and 1-octene. In the propylene-α-olefin copolymer, the position of the α-olefin in the polymer chain is not particularly limited, and either a random copolymer or a block copolymer can be used.

The content of the α-olefin in the propylene-α-olefin copolymer is more than 1% by mass and 15% by mass or less, and is preferably 2% by mass or more and 10% by mass or less. The aforementioned content set at more than 1% by mass can contribute to the improvement of the battery properties. On the other hand, the aforementioned content set at 15% by mass or less is preferable from the viewpoint of improving the heat resistance of the obtained microporous membrane and improving the safety of batteries.

The proportion of the propylene-α-olefin copolymer in the polyolefin resin is 1% by mass or more, more preferably 3% by mass or more and furthermore preferably 5% by mass or more, and the upper limit of the aforementioned proportion is 50% by mass or less.

In the polyolefin resin, in addition to the aforementioned polypropylene and propylene-α-olefin copolymer, other resin components may also be mixed.

Examples of such other resin components include the polymers (homopolymers and copolymer, and multistage polymers and the like) obtained by polymerizing the monomers such as ethylene, propylene, 1-butene, 4-methyl-1-pentene, 1-hexene and 1-octene. The polymers can be used each alone or in combinations of two or more thereof.

However, the copolymer between polypropylene and the propylene-α-olefin copolymer are excluded.

Examples of such other resin components also include polyethylene {low-density polyethylene (910 kg/m$^3$ or more and less than 930 kg/m$^3$), linear low-density polyethylene, medium-density polyethylene (930 kg/m$^3$ or more and less than 942 kg/m$^3$), high-density polyethylene (942 kg/m$^3$ or more), ultra high molecular weight polyethylene} and polybutene.

The polyolefin resin preferably includes a high-density polyethylene from the viewpoint of improving the puncture strength of the obtained polyolefin microporous membrane.

The proportion of the high-density polyethylene in the polyolefin resin may be 0% by mass, and is preferably 5% by mass or more, more preferably 10% by mass or more and preferably 45% by mass or less. The proportion of the high-density polyethylene set at 45% by mass or less is preferable from the viewpoint of improving the heat resistance and improving the safety of batteries.

The viscosity average molecular weights (when two or more polyolefin components are used, the values measured for the respective polyolefin components are meant) of the aforementioned various polyolefin components are preferably 100,000 or more and more preferably 120,000 or more, and the upper limits of the aforementioned molecular weights are preferably 10,000,000 or less and more preferably 3,000,000 or less. The aforementioned viscosity average molecular weights set at 100,000 or more are preferable from the viewpoint of maintaining the high melt tension at the time of melt molding and thus ensuring the satisfactory moldability, or from the viewpoint of imparting sufficient entanglement and thus increasing the strength of the microporous membrane. On the other hand, the viscosity average molecular weights set at 10,000,000 or less are preferable from the viewpoint of realizing a uniform melt-kneading and thus improving the moldability, in particular, the thickness stability of the sheet. The viscosity average molecular weights set at 3,000,000 or less are preferable from the viewpoint of improving the moldability.

Examples of the polyolefin resin include the same resins as listed in above-described Embodiment 1. The mixing amounts of such resins are also the same as in Embodiment 1.

The polyolefin microporous membrane of Embodiment 2 includes as a main component the polyolefin resin including polypropylene and propylene-α-olefin copolymer. The term "main component" as referred to herein means that the proportion of the polyolefin resin in the polyolefin microporous membrane is preferably 20% by mass or more, more preferably 30% by mass or more, furthermore preferably 50% by mass or more, yet furthermore preferably 70% by mass or more and particularly preferably 90% by mass or more, and may also be 100% by mass.

The mixing ratio (polypropylene/propylene-α-olefin copolymer) (mass ratio) between the polypropylene and the propylene-α-olefin copolymer is preferably 1.5 or more and 60 or less and more preferably 2 or more and 55 or less. The aforementioned mixing ratio set at 60 or less is preferable from the viewpoint of improving the battery properties, and the aforementioned mixing ratio set at 1.5 or more is preferable from the viewpoint of improving the heat resistance and thus improving the safety of batteries.

The polyolefin microporous membrane of Embodiment 2 may further include an inorganic filler.

Examples of such an inorganic filler include: oxide-based ceramics such as alumina, silica (silicon oxide), titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatom earth and silica sand; and glass fiber. These can be used each alone or in combinations of two or more thereof. From the viewpoint of electrochemical stability, preferable among these are silica, alumina and titania, and particularly preferable is silica.

The average particle size of the inorganic filler is preferably 1 nm or more, more preferably 6 nm or more and furthermore preferably 10 nm or more, and the upper limit of the aforementioned average particle size is preferably 100 nm or less, preferably 80 nm or less and furthermore preferably 60 nm or less. The average particle size set at 100 nm or less leads to a tendency to make it difficult to cause the exfoliation between polyolefin and the inorganic filler even when an operation such as stretching is performed, and is preferable from the viewpoint of suppressing the occurrence of macro voids. The difficulty in occurrence of the exfoliation between polyolefin and the inorganic filler is preferable from the viewpoint of highly hardening the fibrils themselves constituting the microporous membrane, and is also preferable because a tendency to excel in the anti-compression performance in the local regions of the polyolefin microporous membrane or to excel in the heat resistance is observed. The cohesion between polyolefin and the inorganic filler is preferable from the viewpoint of realizing a separator improving the affinity of the separator for an electricity storage device to the nonaqueous electrolyte, and being excellent in the performances such as the output power retention performance and the cycle retention performance. On the other hand, the average particle size set at 1 nm or more is preferable from the viewpoint of ensuring the dispersibility of the inorganic filler and improving the anti-compression property in the local regions.

When the polyolefin resin includes polyethylene, the mixing of the inorganic filler having an average particle size of 1 nm or more and 100 nm or less in the composition including polyethylene and polypropylene is preferable from the viewpoint of improving the compatibility between polyethylene and polypropylene to suppress the phase separation between polyethylene and polypropylene and thus ensuring satisfactory stretchability.

The plasticizer oil absorption amount of the inorganic filler is preferably 150 ml/100 g or more, and the upper limit of the aforementioned oil absorption amount is preferably 1000 ml/100 g or less and more preferably 500 ml/100 g or less. The aforementioned oil absorption amount set at 150 ml/100 g or more is preferable from the viewpoint of suppressing the occurrence of aggregates in the kneaded mixture including polyolefin resin, the inorganic filler and the plasticizer and thus ensuring satisfactory moldability. The aforementioned oil absorption amount set at 150 ml/100 g or more is also preferable from the viewpoint of being excellent in the impregnation property and the liquid retention property of nonaqueous electrolytes, and ensuring the productivity of electricity storage devices and ensuring the performances in long-term use of electricity storage devices when the polyolefin microporous membrane is used as the separator for electricity storage devices. On the other hand, the aforementioned oil absorption amount set at 1000 ml/100 g or less is preferable from the viewpoint of the handleability of the inorganic filler at the time of producing the polyolefin microporous membrane.

The proportion of the inorganic filler in the total amount of the inorganic filler and the polyolefin resin is preferably 1% by mass or more, more preferably 5% by mass or more and furthermore preferably 20% by mass or more, and the upper limit of the aforementioned proportion is preferably 80% by mass or less, more preferably 60% by mass or less, furthermore preferably 50% by mass or less and particularly preferably 40% by mass or less.

The aforementioned proportion set at 1% by mass or more is preferable from the viewpoint of forming the polyolefin microporous membrane so as to have a high porosity, the viewpoint of improving the thermal contraction ratio of the polyolefin microporous membrane at 140° C. in the transverse direction (widthwise direction, TD direction) of the polyolefin microporous membrane, and moreover, the viewpoint of regulating the membrane thickness retention ratio to be high and the membrane thickness reduction ratio to be small in penetration creep. The aforementioned proportion set at 20% by mass or more is preferable from the viewpoint of improving the heat resistance.

On the other hand, the aforementioned proportion set at 80% by mass or less is preferable from the viewpoint of improving the membrane formability at a high stretching magnification and improving the puncture strength of the polyolefin microporous membrane.

The volume proportion of the inorganic filler in the polyolefin resin is preferably 10% by volume or more, more preferably 15% by volume and furthermore preferably 20% by volume or more, and the upper limit of the aforementioned proportion is preferably 80% by volume.

The specific gravity of the inorganic filler is preferably 1.0 g/cm$^3$ or more, more preferably 1.2 g/cm$^3$ or more and furthermore preferably 1.5 g/cm$^3$ or more, and the upper limit of the aforementioned specific gravity is preferably 10.0 g/cm$^3$ or less.

The polyolefin microporous membrane of Embodiment 2 may further include various additives.

Examples of such additives include various additives such as: a phenolic antioxidant, a phosphorus-based antioxidant and a sulfur-based antioxidant; metal soaps such as calcium stearate and zinc stearate; an ultraviolet absorber; a light stabilizer, an antistatic agent, an antifogging agent and a pigment. The addition amounts of these additives are preferably 0.01% by mass or more and 1% by mass or less based on the composition (hereinafter, also referred to as the "polyolefin composition") including polyolefin resin.

In the laminated polyolefin microporous membrane of Embodiment 2, on at least one side of the above-described polyolefin microporous membrane, another polyolefin microporous membrane which is different from the above-described polyolefin microporous membrane is laminated. The formation of such a laminated polyolefin microporous membrane is preferable from the viewpoint of imparting other performances such as low fuse function. From the viewpoint of the productivity, more preferable is an aspect of the two-type three-layer structure in which the two layers as the surface layers are the same in composition and the intermediate layer is different in composition from these two layers.

As the other polyolefin microporous membrane, heretofore known microporous membranes can be used.

The method for producing the polyolefin microporous membrane or the laminated polyolefin microporous membrane is not particularly limited, and for example, a method including the following steps (1) to (5) can be used:

(1) a kneading step of forming, according to an intended layer structure, a kneaded mixture by kneading a polyolefin composition and a plasticizer which are the raw materials of each layer;

(2) a sheet molding step, following the kneading step, of processing the kneaded mixture into a sheet-like molded body (a monolayer molded body or a laminated molded body) according to an intended layer structure by extruding the kneaded mixture into a sheet and, where necessary, by laminating the resulting sheets into a laminated body, and cooling and solidifying the resulting monolayer body or the resulting laminated body;

(3) a stretching step, following the molding step, of forming a stretched product by biaxially stretching the sheet-like molded body with an area magnification of 20× or more and 200× or less;

(4) a porous body forming step, following the stretching step, of forming a porous body by extracting the plasticizer from the stretched product; and (5) a heat treatment step, following the porous body forming step, of heat treating the porous body at a temperature equal to or lower than the melting point of the polyolefin resin and widthwise stretching the porous body.

The plasticizer used in the step (1) is preferably a nonvolatile solvent capable of forming a uniform solution, when mixed with the polyolefin resin, at a temperature equal to or higher than the melting point of the polyolefin resin. Additionally, the plasticizer is preferably liquid at normal temperature.

Examples of the plasticizer include: hydrocarbons such as liquid paraffin and paraffin wax; esters such as diethylhexyl phthalate and dibutyl phthalate; and higher alcohols such as oleyl alcohol and stearyl alcohol.

In particular, when the polyolefin resin includes polyethylene, the use of liquid paraffin as a plasticizer is preferable from the viewpoint of suppressing the exfoliation at the interface between the polyolefin resin and the plasticizer and thus performing uniform stretching, or the viewpoint of realizing a high puncture strength. The use of diethylhexyl phthalate is preferable from the viewpoint of increasing the load at the time of melt-extruding the kneaded mixture and improving the dispersibility of the inorganic filler (realizing a good quality membrane).

The proportion of the plasticizer in the kneaded mixture is preferably 25% by mass or more and more preferably 30% by mass or more, and the upper limit of the aforementioned proportion is preferably 80% by mass or less and preferably 75% by mass or less. The aforementioned proportion set at 80% by mass or less is preferable from the viewpoint of maintaining the high melt tension at the time of melt-molding and ensuring the moldability. On the other hand, the aforementioned proportion set at 25% by mass or more is preferable from the viewpoint of ensuring the moldability and from the viewpoint of efficiently stretching the lamellar crystals in the crystalline regions of polyolefin. The efficient stretching of the lamellar crystals means the efficient stretching of the polyolefin chain without causing the breakage of the polyolefin chain, and such an efficient stretching can contribute to the formation of uniform and fine pore structure and to the improvement of the strength and the crystallinity of the polyolefin microporous membrane.

Examples of the method for kneading polyolefin resin, an inorganic filler and a plasticizer include the following methods (a) and (b).

(a) A method in which polyolefin resin and the inorganic filler are placed in a resin kneading apparatus such as an extruder or a kneader, and a plasticizer is further introduced and kneaded while the resin is being heated, melted and kneaded.

(b) A method in which polyolefin resin, an inorganic filler and a plasticizer are preliminarily kneaded in a predetermined ratio by using a Henschel mixer or the like, and after such a preliminary kneading step, the resulting kneaded mixture is placed in an extruder, and a plasticizer is introduced into the mixture and the mixture is further kneaded while the mixture is being heated and melted.

In the preliminary kneading in the method (b), from the viewpoint of improving the dispersibility of the inorganic filler and performing a high-magnification stretching without causing the breakage of the membrane, it is preferable to perform the preliminary kneading by mixing the plasticizer in an amount specified by the range of the following formula (1) based on the polyolefin resin and the inorganic filler:

$$0.6 \leq \text{weight of plasticizer}/(\text{plasticizer oil absorption amount} \times \text{weight of inorganic filler} \times \text{density of plasticizer}) \times 100 \leq 1.2 \quad (1)$$

The step (2) is a step in which the kneaded mixture is extruded, for example, into a sheet shape through a T-die and the resulting sheet-shaped product is brought into contact with a heat conductor to be cooled and solidified and thus a gel sheet is obtained. When a laminated gel sheet is formed, such a laminated gel sheet can be prepared either by a method in which the gel sheets forming the respective layers are integrated and coextruded from the respective extruders through a die, or a method in which the gel sheets forming the respective layers are superposed and thermally fusion bonded. Of these two methods, the method performing coextrusion is more preferable because a high interlayer adhesion strength is easily obtained by this method, and this method facilitates the formation of continuous pores between the layers, accordingly facilitates the maintenance of a high permeability, and is excellent in productivity. As the aforementioned heat conductor, a metal, water, air or the plasticizer itself can be used. The cooling and solidification performed by putting a sheet between rolls is preferable from the viewpoint of increasing the membrane strength of the sheet-like molded body and improving the surface smoothness of the sheet-like molded body.

Examples of the stretching method in the step (3) include simultaneous biaxial stretching, successive biaxial stretching, multiple stage stretching and multiple time stretching. Adoption of simultaneous biaxial stretching among these is preferable from the viewpoint of increasing the puncture strength and uniformizing the membrane thickness of the polyolefin microporous membrane.

The area magnification in the step (3) is preferably 10 times or more and preferably 15 times or more, and the upper limit of the aforementioned area magnification is preferably 200 times or less and more preferably 100 times or less. The aforementioned area magnification set at 10 times or more is preferable from the viewpoint of ensuring sufficient strength as a separator.

The stretching temperature in the step (3) is, by taking the melting point of the polyolefin resin as a reference temperature, preferably the melting point −50° C. or higher, more preferably the melting point −30° C. or higher and furthermore preferably the melting point −20° C. or higher, and the upper limit of the aforementioned stretching temperature is preferably the melting point −2° C. or lower and more preferably the melting point −3° C. or lower. The aforementioned stretching temperature set at the melting point −50° C. or higher is preferable from the viewpoint of achieving a satisfactory adhesion in the interface between the polyolefin resin and the inorganic filler or between the polyolefin resin and the plasticizer and thus improving the anti-compression performance, in local and microscopic regions, of the polyolefin microporous membrane. For example, when a high-density polyethylene is used as polyolefin resin, the stretching temperature is preferably 115° C. or higher and 132° C. or lower. When a mixture of two or more polyolefins is used, the melting point of the polyolefin having the highest heat of fusion can be taken as the reference.

The step (4) is preferably performed after the step (3) from the viewpoint of improving the puncture strength of the polyolefin microporous membrane. Examples of the extraction method include a method in which the stretched product is immersed in the solvent for the plasticizer. The residual amount of the plasticizer in the microporous membrane after the extraction is preferably regulated to be 1% by mass or less.

The step (5) is preferably a step in which thermal fixation and/or the thermal relaxation is performed.

The stretching magnification in the step (5) is, in terms of the area magnification, preferably less than 4 times and more preferably less than 3 times. The aforementioned area magnification set at less than 4 times is preferable from the viewpoint of suppressing the occurrence of macro voids and the decrease of the puncture strength.

The heat treatment temperature is, by taking the melting point of the polyolefin resin as the reference, preferably 100° C. or higher, and the upper limit of the aforementioned heat treatment temperature is preferably equal to or lower than the melting point of the polyolefin. The heat treatment temperature set at 100° C. or higher is preferable from the viewpoint of suppressing the occurrence of the membrane breakage. On the other hand, the heat treatment temperature set at a temperature equal to or lower than the melting point of the polyolefin is preferable from the viewpoint of suppressing the contraction of the polyolefin resin and reducing the thermal contraction ratio of the polyolefin microporous membrane.

After the step (5), the obtained polyolefin microporous membrane may be subjected to a post treatment. Examples of such a post treatment include a hydrophilization treatment with an agent such as a surfactant and cross-linking treatment with ionizing radiation or the like.

The puncture strength of the polyolefin microporous membrane or the laminated polyolefin microporous membrane (simply abbreviated as the "microporous membrane," as the case may be) of Embodiment 2 is preferably 200 g/20 μm or more, more preferably 240 g/20 μm or more and furthermore preferably 300 g/20 μm or more, and the upper limit of the aforementioned puncture strength is preferably 2000 g/20 μm or less and more preferably 1000 g/20 μm or less. The aforementioned puncture strength set at 200 g/20 μm or more is preferable from the viewpoint of suppressing the membrane breakage due to the causes such as the detached active material at the time of battery winding, and is also preferable from the viewpoint of suppressing an adverse possibility that short-circuit occurs due to the expansion and contraction of the electrodes associated with charging and discharging. On the other hand, the aforementioned puncture strength set at 2000 g/20 μm or less is preferable from the viewpoint of being capable of reducing the width contraction due to the orientation relaxation at the time of heating.

The puncture strength can be regulated by the operations such as controlling the stretching magnification and the stretching temperature.

The porosity of the microporous membrane is preferably 20% or more and more preferably 35% or more, and the upper limit of the aforementioned porosity is preferably 90% or less and more preferably 80% or less. The aforementioned porosity set at 20% or more is preferable form the viewpoint of ensuring the permeability of the separator. On the other hand, the aforementioned porosity set at 90% or less is preferable from the viewpoint of ensuring the puncture strength.

The porosity can be regulated by variation of the stretching magnification.

The average pore size of the microporous membrane is preferably 0.1 µm or less and more preferably 0.08 µm or less, and the lower limit of the aforementioned pore size is preferably 0.01 µm or more. The aforementioned average pore size set at 0.1 µm or less is preferable from the viewpoint of suppressing the self-discharge of electricity storage devices and thus suppressing the capacity reduction.

The aforementioned average pore size can be regulated by variation of the stretching magnification.

The membrane thickness of the microporous membrane is preferably 2 µm or more and more preferably 5 µm or more, and the upper limit of the aforementioned membrane thickness is preferably 100 µm or less, more preferably 60 µm or less and furthermore preferably 50 µm or less. The aforementioned membrane thickness set at 2 µm or more is preferable from the viewpoint of improving the mechanical strength. On the other hand, the aforementioned membrane thickness set at 100 µm or less is preferable because such a membrane thickness reduces the volume occupied by the separator to lead to a tendency to be advantageous from the viewpoint of increasing battery capacities.

The air permeability of the microporous membrane is preferably 10 sec/100 cc or more and more preferably 50 sec/100 cc or more, and the upper limit of the aforementioned air permeability is preferably 1000 sec/100 cc or less and more preferably 500 sec/100 cc or less. The aforementioned air permeability set at 10 sec/100 cc or more is preferable from the viewpoint of suppressing the self-discharge of electricity storage devices. On the other hand, the aforementioned air permeability set at 1000 sec/100 cc or less is preferable from the viewpoint of obtaining satisfactory charge-discharge properties.

The aforementioned air permeability can be regulated by operations such as varying the stretching temperature and the stretching magnification.

The polyolefin microporous membrane of Embodiment 2 is useful as separators for electricity storage devices, in particular. Usually, an electricity storage device uses the aforementioned microporous membrane for the separator and includes a positive electrode, a negative electrode and an electrolyte.

The electricity storage device can be produced, for example, as follows: the microporous membrane is prepared, for example, as an oblong rectangular separator of 10 to 500 mm (preferably 80 to 500 mm) in width and 200 to 4000 m (preferably 1000 to 4000 m) in length; by using the prepared separator, a four-layer assembly is prepared by superposing a positive electrode, the separator, a negative electrode and the separator in this order, or a negative electrode, the separator, a positive electrode and the separator in this order; the four-layer assembly is wound into a cylindrical roll or an oblate cylindrical roll to yield a wound body; the wound body is housed in a battery can; and further, an electrolyte is injected into the battery to produce the aforementioned electricity storage device. Alternatively, the electricity storage device can also be produced as follows: a four-layer laminate is prepared by laminating, into a flat form, a positive electrode, the separator, a negative electrode and the separator in this order, or a negative electrode, the separator, a positive electrode and the separator in this order; the four-layer laminate is laminated with a bag-shaped film and an electrolyte is injected into the bag to produce the electricity storage device.

Third Embodiment

The polyolefin microporous membrane of a third embodiment of the present invention (hereinafter, abbreviated as "Embodiment 3") is formed of a propylene-based resin composition including a polypropylene-based resin having the (polypropylene)/(propylene copolymer) (mass ratio) of 80/20 to 0/100 as a main component, wherein the melting point of the propylene copolymer is 120° C. or higher and 145° C. or lower.

In Embodiment 3, the separator having a satisfactory cycle property can be realized by adopting the aforementioned composition, and the reasons for this are not clear; however, the reasons are inferred as follows.

Specifically, in Embodiment 3, polypropylene and a propylene copolymer (propylene-ethylene copolymer or propylene-α-olefin copolymer) having a specific melting point are mixed together, and it is inferred that the ethylene fraction of the propylene-ethylene copolymer and the α-olefin fraction of the propylene-α-olefin copolymer each have an action to decrease the crystallinity of the polypropylene. Accordingly, the ethylene fraction of the propylene-ethylene copolymer and the α-olefin fraction of the propylene-α-olefin copolymer appropriately acts on the polypropylene fraction, and thus probably regulates the lamellar layers formed in the polypropylene fraction to have appropriate thinness. When a large number of appropriately thin lamellar layers are formed, probably a large number of pores uniform in size are formed in the formation of a microporous membrane.

Probably, by setting the melting point of the propylene-ethylene copolymer or the propylene-α-olefin random copolymer so as to fall within a specific range of 120° C. or higher and 145° C. or lower, the stretchability of the composition as a whole is improved and the pore size is more increased.

When such a microporous membrane having a large number of such pores large and uniform in size is disposed inside a battery, ion permeation paths are present uniformly, without being sparse or dense, clogging hardly occurs in repeated charge-discharge cycles, and hence probably the cycle property as a battery is improved.

The polyolefin microporous membrane of Embodiment 3 is formed of a polypropylene-based resin composition including, as a main component, a polypropylene-based resin including polypropylene and propylene copolymer.

Examples of the polypropylene include isotactic polypropylene and atactic polypropylene. These polypropylenes can be used each alone or as mixtures of two or more thereof.

The heat of fusion of the polypropylene is preferably 80 J/g or more, more preferably 85 J/g or more and furthermore preferably 90 J/g or more. The heat of fusion of the polypropylene set at 80 J/g or more is preferable from the viewpoint of improving the porosity.

On the other hand, the propylene copolymer (propylene-ethylene copolymer or propylene-α-olefin copolymer) is formed by using propylene as a monomer and ethylene or α-olefin as another monomer different from propylene.

Examples of such an α-olefin include 1-butene, 4-methyl-1-pentene, 1-hexene and 1-octene. In the propylene-ethylene copolymer or the propylene-α-olefin copolymer, the position of the ethylene or the α-olefin in the polymer chain may be either of a block copolymer or of a random copolymer; however, the random copolymer is preferable from the viewpoint of improving the stretchability and increasing the pore size.

The heat of fusion of the propylene-ethylene copolymer or the propylene-α-olefin copolymer is preferably 60 J/g or more, more preferably 65 J/g or more and furthermore preferably 70 J/g or more, from the viewpoint of improving the porosity of the polyolefin microporous membrane.

The heat of fusion of the propylene-ethylene copolymer or the propylene-α-olefin copolymer set at 60 J/g or more is preferable from the viewpoint of improving the porosity.

The content of ethylene or α-olefin in the propylene copolymer is more than 1% by mass and 20% by mass or less, and is preferably 2% by mass or more and 18% by mass or less. The aforementioned content set at more than 1% by mass is capable of contributing to the improvement of the battery properties. On the other hand, the aforementioned content set at 20% by mass or less is preferable from the viewpoint of improving the heat resistance of the obtained microporous membrane and improving the safety of batteries.

The proportion of the propylene copolymer in the polypropylene-based resin is 20% by mass or more, more preferably 25% by mass or more and furthermore preferably 30% by mass or more, and the upper limit of the aforementioned proportion is 100% by mass or less.

The aforementioned proportion set at 20% by mass or more is preferable from the viewpoint of uniformizing and increasing in size the pores of the polyolefin microporous membrane and improving the membrane formability at a high stretching magnification.

The melting point of the propylene copolymer is 120° C. or higher, preferably 122° C. or higher and furthermore preferably 125° C. or higher, and the upper limit of the aforementioned melting point is 145° C. or lower, preferably 143° C. or lower and furthermore preferably 140° C. or lower.

The melting point of the aforementioned propylene copolymer set at 120° C. or higher is preferable from the viewpoint of improving the stretchability.

In the polypropylene-based resin composition, in addition to the aforementioned polypropylene and propylene copolymer, other resin components may also be mixed.

Examples of such other resin components include the same resin components as listed in Embodiment 2.

The polypropylene-based resin composition preferably includes a high-density polyethylene from the viewpoint of improving the puncture strength of the obtained polyolefin microporous membrane.

The proportion of the high-density polyethylene in the polypropylene-based resin composition is preferably 5% by mass or more and more preferably 10% by mass or more, and the upper limit of the aforementioned proportion is preferably 50% by mass or less. The proportion of the high-density polyethylene set at 50% by mass or less is preferable from the viewpoint of improving the heat resistance and improving the safety of batteries.

The proportion of the polypropylene in the polypropylene-based resin composition is preferably 0% by mass or more and more preferably 20% by mass or more, and the upper limit of the aforementioned proportion is 80% by mass or less. The proportion of polypropylene set at 80% by mass or less is preferable from the viewpoint of improving the stretchability.

The viscosity average molecular weights (when two or more components are used, the values measured for the respective components are meant) of the aforementioned various components are preferably 100,000 or more and more preferably 120,000 or more, and the upper limits of the aforementioned molecular weights are preferably 10,000,000 or less and more preferably 3,000,000 or less. The aforementioned viscosity average molecular weights set at 100,000 or more are preferable from the viewpoint of maintaining the high melt tension at the time of melt molding and thus ensuring the satisfactory moldability, or from the viewpoint of imparting sufficient entanglement and thus increasing the strength of the microporous membrane. On the other hand, the viscosity average molecular weights set at 10,000,000 or less are preferable from the viewpoint of realizing a uniform melt-kneading and thus improving the moldability, in particular, the thickness stability of the sheet. The viscosity average molecular weights set at 3,000,000 or less are preferable from the viewpoint of improving the moldability.

Examples of the polyolefin resin include the same resins as listed in above-described Embodiment 1. The mixing amounts of such resins are also the same as in Embodiment 1.

The polyolefin microporous membrane of Embodiment 3 preferably includes as a main component the polypropylene-based resin. The term "main component" as referred to herein means that the proportion of the polypropylene-based resin in the polypropylene-based resin composition is preferably 20% by mass or more, more preferably 30% by mass or more, furthermore preferably 40% by mass or more and particularly preferably 45% by mass or more. The upper limit of the aforementioned proportion is preferably 100% by mass or less.

The polyolefin microporous membrane of Embodiment 3 may further include an inorganic filler.

Examples of such an inorganic filler include the same inorganic fillers as listed in Embodiment 2.

The primary particle size of the inorganic filler is preferably 1 nm or more, more preferably 6 nm or more and furthermore preferably 10 nm or more, and the upper limit of the aforementioned primary particle size is preferably 100 nm or less, preferably 80 nm or less and furthermore preferably 60 nm or less. The primary particle size set at 100 nm or less leads to a tendency to make it difficult to cause the exfoliation between polyolefin and the inorganic particles even when an operation such as stretching is performed, and is preferable from the viewpoint of suppressing the occurrence of macro voids. The difficulty in occurrence of the exfoliation between polyolefin and the inorganic filler is preferable from the viewpoint of highly hardening the fibrils themselves constituting the microporous membrane, and is also preferable because a tendency to excel in the anti-compression performance in the local regions of the polyolefin microporous membrane or to excel in the heat resistance is observed. The cohesion between polyolefin and the inorganic filler is preferable from the viewpoint of realizing a separator improving the affinity of the separator for an electricity storage device to the nonaqueous electrolyte, and being excellent in the performances such as the output power retention performance and the cycle retention performance.

The plasticizer oil absorption amount of the inorganic filler is preferably 150 ml/100 g or more, and the upper limit of the aforementioned oil absorption amount is preferably 1000 ml/100 g or less and more preferably 500 ml/100 g or less. The aforementioned oil absorption amount set at 150 ml/100 g or more is preferable from the viewpoint of suppressing the occurrence of aggregates in the kneaded mixture including polyolefin resin, the inorganic filler and the plasticizer and thus ensuring satisfactory moldability. The aforementioned oil absorption amount set at 150 ml/100 g or more is also preferable from the viewpoint of being excellent in the impregnation property and the liquid retention property of nonaqueous electrolytes, and ensuring the productivity of electricity storage devices and ensuring the performances in long-term use of electricity storage devices when the polyolefin microporous membrane is used as the separator for electricity storage devices. On the other hand, the aforementioned oil absorption amount set at 1000 ml/100 g or less is preferable from the viewpoint of the handleability of the inorganic filler at the time of producing the polyolefin microporous membrane.

The proportion of the inorganic filler in the polyolefin-based resin composition is preferably 5% by mass or more, more preferably 10% by mass or more and furthermore preferably 20% by mass or more, and the upper limit of the aforementioned proportion is preferably 60% by mass or less, more preferably 50% by mass or less and furthermore preferably 40% by mass or less.

The aforementioned proportion set at 5% by mass or more is preferable from the viewpoint of forming the polyolefin microporous membrane so as to have a high porosity, the viewpoint of improving the thermal contraction ratio of the polyolefin microporous membrane at 140° C. in the transverse direction (widthwise direction, TD direction) of the polyolefin microporous membrane, and moreover, the viewpoint of regulating the membrane thickness retention ratio to be high and the membrane thickness reduction ratio to be small in penetration creep. The aforementioned proportion set at 20% by mass or more is preferable from the viewpoint of improving the heat resistance.

On the other hand, the aforementioned proportion set at 60% by mass or less is preferable from the viewpoint of improving the membrane formability at a high stretching magnification and improving the puncture strength of the polyolefin microporous membrane.

The volume proportion of the inorganic filler in the propylene-based resin composition is preferably 10% by volume or more, more preferably 15% by volume or more and furthermore preferably 20% by volume or more, and the upper limit of the aforementioned proportion is preferably 80% by volume or less.

The specific gravity of the inorganic filler is preferably 1.0 g/cm$^3$ or more, more preferably 1.2 g/cm$^3$ or more and furthermore preferably 1.5 g/cm$^3$ or more, and the upper limit of the aforementioned specific gravity is preferably 10.0 g/cm$^3$ or less.

The propylene-based resin composition may further include various additives.

Examples of such additives include the same additives as listed in Embodiment 2.

In the laminated polyolefin microporous membrane of Embodiment 3, on at least one side of the above-described polyolefin microporous membrane, another polyolefin microporous membrane different from the above-described polyolefin microporous membrane is laminated. The formation of such a laminated polyolefin microporous membrane is preferable from the viewpoint of imparting other performances such as low fuse function. From the viewpoint of the productivity, more preferable is an aspect of the two-type three-layer structure in which the two layers as the surface layers are the same in composition and the intermediate layer is different in composition from these two layers.

As the other polyolefin microporous membrane, heretofore known microporous membranes can be used.

As the method for producing the polyolefin microporous membrane or the laminated polyolefin microporous membrane, the same production method as in Embodiment 2 can be used.

For the polyolefin microporous membrane or the laminated polyolefin microporous membrane (simply abbreviated as the "microporous membrane," as the case may be) of Embodiment 3, the appropriate numerical ranges of the puncture strength, the porosity, the average pore size, the membrane thickness and the air permeability are the same as in Embodiment 2.

The capacity retention ratio as the index for the cycle property of the laminated separator is preferably 70% or more and more preferably 75% or more. The capacity retention ratio set at 70% or more is preferable from the viewpoint of the battery operation life.

The high-temperature storage property of the laminated separator is preferably 60% or more and more preferably 65%. The high-temperature storage property set at 65% or more is preferable from the viewpoint of the battery operation life.

The short-circuit temperature as an index for the heat resistance of the laminated separator is preferably 160° C. or higher and more preferably 165° C. or higher. The short-circuit temperature set at 160° C. or higher is preferable from the viewpoint of the safety of batteries.

The microporous membrane is useful as separators for electricity storage devices, in particular. Usually, an electricity storage device uses the aforementioned microporous membrane for the separator and includes a positive electrode, a negative electrode and an electrolyte.

The electricity storage device can be produced in the same manner as in above-described Embodiment 2.

Fourth Embodiment

The polyolefin microporous membrane of a fourth embodiment of the present invention (hereinafter, abbreviated as "Embodiment 4") is formed of a polypropylene-based resin composition including 20 to 95% by mass of a polypropylene-based resin having (polypropylene)/(propylene copolymer) (mass ratio) of 90/10 to 0/100 and 5 to 80% by mass of an inorganic filler, wherein the melting point of the propylene copolymer is 110° C. to 150° C., and the (propylene copolymer/inorganic filler) (mass ratio) is 0.1/1 to 1.5/1.

The "propylene copolymer" means "propylene-ethylene copolymer or propylene-α-olefin copolymer."

In Embodiment 4, the separator having a satisfactory cycle property can be realized by adopting the aforementioned composition, and the reasons for this are not clear; however, the reasons are inferred as follows.

Specifically, in Embodiment 4, in the presence of polypropylene, a propylene copolymer having a specific melting point and an inorganic filler are mixed. When such a specific propylene copolymer is mixed in a predetermined amount based on the inorganic filler, the propylene copolymer can satisfactorily interact with polypropylene and the inorganic filler in the melting temperature region of polypropylene, and consequently, the fluidity of the resin as a whole in the molten state can be degraded. It is inferred that even when low molecular weight components and/or polymer components low in crystallinity are included in the raw material, the degradation of the fluidity of the resin as a whole suppresses the migration, to the surface of the microporous membrane, of such components during the membrane formation, and thus leads to the difficulty in forming a skin layer. The formation of the skin layer leads to the impairment of the pore structure (blocking of the pores) present in the surface of the microporous membrane. In other words, in Embodiment 4, there can be realized a microporous membrane in which the skin layer formation is suppressed, the pores in the surface layer are not blocked and a large number of pores uniform in size are provided. When such a microporous membrane is disposed inside a battery, ion permeation paths are present uniformly, without being sparse or dense, clogging hardly occurs in repeated charge-discharge cycles, and hence probably the cycle property as a battery is improved.

The polyolefin microporous membrane of Embodiment 4 is formed of a polypropylene-based resin composition including a polypropylene-based resin including polypropylene and a propylene copolymer, and an inorganic filler.

Examples of the polypropylene include isotactic polypropylene and atactic polypropylene. These polypropylenes can be used each alone or as mixtures of two or more thereof.

From the viewpoint of improving the high-temperature storage property and the membrane formability of the polyolefin microporous membrane, the MFR (meaning "melt flow rate," this also being the case hereinafter) of the polypropylene is preferably 0.1 g/10 min or more and 10.0 g/10 min or less and more preferably 8.0 g/min or less and furthermore preferably 5.0 g/min or less.

The heat of fusion of the polypropylene is preferably 80 J/g or more, more preferably 85 J/g or more and furthermore preferably 90 J/g or more. The heat of fusion of the polypropylene set at 80 J/g or more is preferable from the viewpoint of improving the porosity.

On the other hand, the propylene copolymer (propylene-ethylene copolymer or propylene-α-olefin copolymer) is formed by using propylene as a monomer and ethylene or α-olefin as another monomer different from propylene.

Examples of such an α-olefin include 1-butene, 4-methyl-1-pentene, 1-hexene and 1-octene. In the propylene-ethylene copolymer or the propylene-α-olefin copolymer, the position of the ethylene or the α-olefin in the polymer chain may be either of a block copolymer or of a random copolymer; however, the random copolymer is preferable.

The proportion of the propylene copolymer in the propylene-based resin is 10% by mass or more, more preferably 15% by mass or more and furthermore preferably 20% by mass or more, and the upper limit of the aforementioned proportion is preferably 100% by mass or less, more preferably 80% by mass or less and furthermore preferably 60% by mass or less.

The aforementioned proportion set at 10% by mass or more is preferable from the viewpoint of uniformizing and increasing in size the pores of the polyolefin microporous membrane and improving the membrane formability at a high stretching magnification.

The melting point of the propylene copolymer is 110° C. or higher, preferably 115° C. or higher and furthermore preferably 120° C. or higher, and the upper limit of the aforementioned melting point is 150° C. or lower, preferably 147° C. or lower and furthermore preferably 145° C. or lower.

The melting point of the aforementioned propylene copolymer set at 110° C. or higher is preferable from the viewpoint of improving the stretchability.

From the viewpoint of improving the membrane formability of the polyolefin microporous membrane, the MFR of the propylene copolymer is preferably 0.1 g/10 min or more and 20.0 g/10 min or less, more preferably 15.0 g/10 min or less and furthermore preferably 10.0 g/10 min.

The heat of fusion of the propylene copolymer is 60 J/g or more, more preferably 65 J/g or more and furthermore preferably 70 J/g or more.

The heat of fusion of the propylene copolymer set at 60 J/g or more is preferable from the viewpoint of improving the porosity.

The content of the comonomer (the content of ethylene and α-olefin) in the propylene copolymer is more than 1% by mass and is 20% by mass or less and is preferably 2% by mass or more and 18% by mass or less. The aforementioned content set at more than 1% by mass can contribute to the improvement of the battery properties. On the other hand, the aforementioned content set at 20% by mass or less is preferable from the viewpoint of improving the heat resistance of the obtained microporous membrane and improving the safety of batteries.

In the polypropylene-based resin composition, in addition to the aforementioned polypropylene and propylene copolymer, other resin components may also be mixed.

Examples of such other resin components include the same resin components as listed in Embodiment 2.

The polypropylene-based resin composition preferably includes a high-density polyethylene from the viewpoint of improving the puncture strength of the obtained polyolefin microporous membrane.

The proportion of the high-density polyethylene in the polypropylene-based resin composition is preferably 5% by mass or more and more preferably 10% by mass or more, and the upper limit of the aforementioned proportion is preferably 60% by mass or less. The proportion of the high-density polyethylene set at 60% by mass or less is preferable from the viewpoint of improving the heat resistance and improving the safety of batteries.

The viscosity average molecular weights (when two or more components are used, the values measured for the respective components are meant) of the aforementioned various components are preferably 100,000 or more and more preferably 120,000 or more, and the upper limits of the aforementioned molecular weights are preferably 10,000,000 or less and more preferably 3,000,000 or less. The aforementioned viscosity average molecular weights set at 100,000 or more are preferable from the viewpoint of maintaining the high melt tension at the time of melt molding and thus ensuring the satisfactory moldability, or from the viewpoint of imparting sufficient entanglement and thus increasing the strength of the microporous membrane. On the other hand, the viscosity average molecular weights set at 10,000,000 or less are preferable from the viewpoint of realizing a uniform melt-kneading and thus improving the moldability, in particular, the thickness stability of the sheet. The viscosity average molecular weights set at 3,000,000 or less are preferable from the viewpoint of improving the moldability.

Examples of the polyolefin resin include the same resins as listed in above-described Embodiment 1. The mixing amounts of such resins are also the same as in Embodiment 1.

The polyolefin microporous membrane of Embodiment 4 preferably includes the polypropylene-based resin as a main component. The term "main component" as referred to herein means that the proportion of the polypropylene-based resin in the polypropylene-based resin composition is preferably 20% by mass or more, more preferably 30% by mass or more, furthermore preferably 40% by mass or more and particularly preferably 45% by mass or more. The upper limit of the aforementioned proportion is preferably 95% by mass or less.

The polyolefin microporous membrane of Embodiment 4 further includes an inorganic filler.

Examples of such an inorganic filler include the same inorganic fillers as listed in Embodiment 2.

The average particle size of the inorganic filler is preferably 1 nm or more, more preferably 6 nm or more and furthermore preferably 10 nm or more, and the upper limit of the aforementioned average particle size is preferably 100 nm or less, preferably 80 nm or less and furthermore preferably 60 nm or less. The average particle size set at 100 nm or less leads to a tendency to make it difficult to cause the exfoliation between polyolefin and the inorganic particles even when an operation such as stretching is performed, and is preferable from the viewpoint of suppressing the occurrence of macro voids. The difficulty in occurrence of the exfoliation between polyolefin and the inorganic filler is preferable from the viewpoint of highly hardening the fibrils themselves constituting the microporous membrane, and is also preferable because a tendency to excel in the anti-compression performance in the local regions of the polyolefin microporous membrane or to excel in the heat resistance is observed. The cohesion between polyolefin and the inorganic filler is preferable from the viewpoint of realizing a separator improving the affinity of the separator for an electricity storage device to the nonaqueous electrolyte, and being excellent in the performances such as the output power retention performance and the cycle retention performance.

On the other hand, the average particle size set at 1 nm or more is preferable from the viewpoint of ensuring the dispersibility of the inorganic filler and improving the anti-compression property in the local regions.

The mixing of the inorganic particles having a particle size of 1 nm or more and 100 nm or less in the composition including polyethylene and polypropylene is preferable from the viewpoint of improving the compatibility between polyethylene and polypropylene to suppress the phase separation between polyethylene and polypropylene and thus ensuring satisfactory stretchability.

The plasticizer oil absorption amount of the inorganic filler is preferably 150 ml/100 g or more, and the upper limit of the aforementioned oil absorption amount is preferably 1000 ml/100 g or less and more preferably 500 ml/100 g or less. The aforementioned oil absorption amount set at 150 ml/100 g or more is preferable from the viewpoint of suppressing the occurrence of aggregates in the kneaded mixture including the polyolefin resin, the inorganic filler and the plasticizer and thus ensuring satisfactory moldability. The aforementioned oil absorption amount set at 150 ml/100 g or more is also preferable from the viewpoint of being excellent in the impregnation property and the liquid retention property of nonaqueous electrolytes, and ensuring the productivity of electricity storage devices and ensuring the performances in long-term use of electricity storage devices when the polyolefin microporous membrane is used as the separator for electricity storage devices. On the other hand, the aforementioned oil absorption amount set at 1000 ml/100 g or less is preferable from the viewpoint of the handleability of the inorganic filler at the time of producing the polyolefin microporous membrane.

The proportion of the inorganic filler in the total amount of the inorganic filler and the polyolefin resin is preferably 5% by mass or more, more preferably 10% by mass or more and furthermore preferably 20% by mass or more, and the upper limit of the aforementioned proportion is preferably 80% by mass or less, more preferably 60% by mass or less, furthermore preferably 50% by mass or less and particularly preferably 40% by mass or less.

The aforementioned proportion set at 5% by mass or more is preferable from the viewpoint of forming the polyolefin microporous membrane so as to have a high porosity, the viewpoint of improving the thermal contraction ratio of the polyolefin microporous membrane at 140° C. in the transverse direction (widthwise direction, TD direction) of the polyolefin microporous membrane, and moreover, the viewpoint of regulating the membrane thickness retention ratio to be high and the membrane thickness reduction ratio to be small in penetration creep. The aforementioned proportion set at 20% by mass or more is preferable from the viewpoint of improving the heat resistance.

On the other hand, the aforementioned proportion set at 80% by mass or less is preferable from the viewpoint of improving the membrane formability at a high stretching magnification and improving the puncture strength of the polyolefin microporous membrane.

The volume proportion of the inorganic filler in the propylene-based resin composition is preferably 10% by volume or more, more preferably 15% by volume and furthermore preferably 20% by volume or more, and the upper limit of the aforementioned proportion is preferably 80% by volume.

The specific gravity of the inorganic filler is preferably 1.0 g/cm$^3$ or more, more preferably 1.2 g/cm$^3$ ore more and furthermore preferably 1.5 g/cm$^3$ or more, and the upper limit of the aforementioned specific gravity is preferably 10.0 g/cm$^3$ or less.

The mixing ratio between the propylene copolymer and the inorganic filler (propylene copolymer)/(inorganic filler) (mass ratio) is 0.1/1 to 1.5/1, preferably 0.1/1 to 1.3/1 and furthermore preferably 0.1/1 to 1.2/1. The mixing ratio set to fall within the above-described range is preferable from the viewpoint of suppressing the skin layer formation due to low molecular weight polymers and polymers low in crystallinity.

The propylene-based resin composition may further include various additives.

Examples of such additives include the same additives as listed in Embodiment 2.

In the laminated polyolefin microporous membrane of Embodiment 4, on at least one side of the above-described polyolefin microporous membrane, another polyolefin microporous membrane different from the above-described polyolefin microporous membrane is laminated. The formation of such a laminated polyolefin microporous membrane is preferable from the viewpoint of imparting other performances such as low fuse function. From the viewpoint of the productivity, more preferable is an aspect of the two-type three-layer structure in which the two layers as the surface layers are the same in composition and the intermediate layer is different in composition from these two layers.

As the other polyolefin microporous membrane, heretofore known microporous membranes can be used.

As the method for producing the polyolefin microporous membrane or the laminated polyolefin microporous membrane, the same production method as in Embodiment 2 can be used.

For the polyolefin microporous membrane or the laminated polyolefin microporous membrane (simply abbreviated as the "microporous membrane," as the case may be) of Embodiment 4, the appropriate numerical ranges of the puncture strength, the porosity, the average pore size, the membrane thickness, the air permeability, the capacity retention ratio, the high-temperature storage property and the short circuit temperature are the same as in Embodiments 2 and 3.

The microporous membrane is useful as separators for electricity storage devices, in particular. Usually, an electricity storage device uses the aforementioned microporous membrane for the separator and includes a positive electrode, a negative electrode and an electrolyte.

The electricity storage device can be produced in the same manner as in above-described Embodiment 2.

The measurement values of the above-described various parameters in Embodiments 1 to 4 are the values to be measured, unless otherwise specified, according to the measurement methods in below-described Examples corresponding to respective Embodiments.

EXAMPLES

Embodiment 1

Next, Embodiment 1 is more specifically described with reference to Examples and Comparative Examples; however, Embodiment 1 is not limited to following Examples unless the gist of Embodiment 1 is exceeded. The physical properties in Examples were measured with the following methods.

(1) Viscosity Average Molecular Weight (Mv)

The intrinsic viscosity [η] in decalin as solvent at 135° C. was determined on the basis of ASTM-D4020.

The Mv of polyethylene was calculated according to the following formula:

$$[\eta]=6.77\times10^{-4}\,Mv^{0.67}$$

The Mv of polypropylene was calculated according to the following formula:

$$[\eta]=1.10\times10^{-4}\,Mv^{0.80}$$

(2) Total Membrane Thickness (μm)

The total membrane thickness was measured at a room temperature of 23° C., with a micro thickness meter (trade name: KBM, manufactured by Toyo Seiki Seisaku-sho, Ltd.).

(3) Surface Layer Thickness (μm)

The surface layer thickness was measured by observing the cross section with a cross section observation method with a scanning electron microscope or the like.

(4) Primary Particle Size (Nm) of Inorganic Particle

A measurement object was sampled from a laminated separator and subjected to an observation with a scanning electron microscope at a magnification of 30,000 times, and thus the particle sizes of the inorganic particles were identified in a 3.0 μm×3.0 μm field of view. The term "primary particle size" as referred to herein means the particle size in the condition that the individual particles are independently dispersed in a matrix, or when the particles are aggregated, the primary particle size means the size of the smallest aggregate particle of the aggregated particles. An average value of the observed values at ten different positions was taken as the measured value.

(5) Porosity (%)

From a microporous membrane, a 10 cm×10 cm square sample was cut out, and the volume (cm$^3$) and the mass (g) were determined; from these determined values and the membrane density (g/cm$^3$), the porosity was calculated according to the following formula:

$$\text{Porosity (\%)}=(\text{volume}-\text{mass}/\text{density of mixed composition})/\text{volume}\times100$$

The density of the mixed composition used was a value calculated from the densities of the polyolefin resin used and the inorganic particle used, and the mixing ratio between the polyolefin resin and the inorganic particle.

(6) Air Permeability (Sec/100 cc)

The air permeability was measured with a Gurley air permeability tester (manufactured by Toyo Seiki Seisaku-sho, Ltd.) according to JIS P-8117.

(7) Puncture Strength (N/20 μm)

A puncture test was performed with a handy compression tester, KES-G5 (trade name), manufactured by Kato Tech Co., Ltd., under the conditions of a needle tip having a curvature radius of 0.5 mm and a puncture speed of 2 mm/sec. The maximum puncture load was taken as the puncture strength (N). By multiplying this value by 20 (μm)/membrane thickness (μm), the puncture strength (N/20 μm) in terms of the 20-μm membrane thickness was calculated.

(8) Shutdown Temperature (° C.)

FIG. 1(A) schematically shows a shutdown temperature measurement apparatus. Item 1 represents a microporous membrane (a laminated separator as a measurement object), items 2A and 2B represent 10-μm thick nickel foils, items 3A and 3B represent glass plates. Item 4 represents an electrical resistance measurement apparatus (AG-4311 (trademark), an LCR meter, manufactured by Ando Electric Co., Ltd.) which is connected to the nickel foils 2A and 2B. Item 5 represents a thermocouple which is connected to a thermometer 6. Item 7 represents a data collector which is connected to the electrical resistance measurement apparatus 4 and the thermometer 6. Item 8 represents an oven which is used for heating the microporous membrane.

Figure 1B:
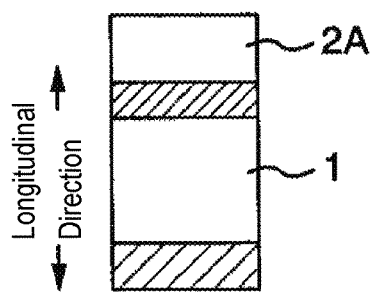
Figure 1C:
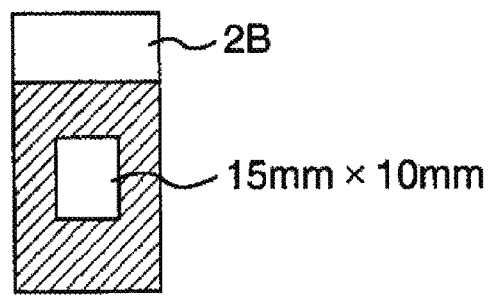

More specifically, as shown in FIG. 1(B), the microporous membrane 1 is superposed on the nickel foil 2A, and longitudinally fixed to the nickel foil 2A with a TEFLON tape (including PTFE; the shaded section in the figure). The microporous membrane 1 is impregnated with a 1 mol/liter lithium borofluoride solution (solvent: propylene carbonate/ethylene carbonate/γ-butyl lactone=1/1/2). Onto the nickel foil 2B, as shown in FIG. 1(C), a TEFLON tape (including PTFE; the shaded section in the figure) was bonded, and then the nickel foil 2B was masked with a 15 mm×10 mm window section left unmasked in the central section of the foil 2B.

The nickel foil 2A and the nickel foil 2B were superposed on each other so as to sandwich the microporous membrane 1, and the two-sheets of the nickel foils were sandwiched from the both sides with the glass plates 3A and 3B. In this case, the window section of the foil 2B and the microporous membrane 1 were arranged so as to face each other.

The two sheets of the glass plates were fixed by clipping with commercially available double clips. The thermocouple 5 was fixed onto the glass plates with a TEFLON tape including PTFE.

With such an apparatus, the temperature and the electrical resistance were continuously measured. The temperature was increased from 25° C. to 200° C. at a rate of 2° C./min, and the electrical resistance was measured with an alternating current of 1 V and 1 kHz. The shutdown temperature was defined as the temperature where the electrical resistance of the microporous membrane reached 10$^3$Ω.

(9) Soldering Test (mm$^2$)

A soldering iron of 1 mm in diameter was arranged so as to be perpendicular to the microporous membrane fixed to a frame. The temperature of the soldering iron was set at 300° C. or 400° C. When the temperature of the soldering iron was stabilized, the soldering iron was allowed to move downward at a rate of 10 mm/sec, and was allowed to puncture the microporous membrane for 3 seconds, and then was allowed to move upward. The area of the thus formed hole was observed with an optical microscope and was subjected to an image processing to measure the area.

(10) Capacity Retention Ratio (%)

a. Preparation of Positive Electrode

A slurry was prepared by dispersing 92.2% by mass of a lithium cobalt composite oxide ($LiCoO_2$) as a positive electrode active material, 2.3% by mass of a scale-like graphite and 2.3% by mass of acetylene black, both being conductive, and 3.2% by mass of polyvinylidene fluoride (PVDF) as a binder in N-methylpyrrolidone (NMP). The slurry was applied onto one side of a 20-μm thick aluminum foil to be a positive electrode current collector with a die coater, dried at 130° C. for 3 minutes, and then compression molded with a roll press. In this case, the coating amount of the active material of the positive electrode was regulated to be 250 g/m$^2$ and the active material bulk density of the positive electrode was regulated to be 3.00 g/cm$^3$.

b. Preparation of Negative Electrode

A slurry was prepared by dispersing 96.9% by mass of an artificial graphite as a negative electrode active material, and 1.4% by mass of an ammonium salt of carboxymethyl cellulose and 1.7% by mass of a styrene-butadiene copolymer latex, both being binders, in purified water. The slurry was applied onto one side of a 12-μm thick copper foil to be a negative electrode current collector with a die coater, dried at 120° C. for 3 minutes, and then compression molded with a roll press. In this case, the coating amount of the active material of the negative electrode was regulated to be 106 g/m$^2$ and the active material bulk density of the negative electrode was regulated to be 1.35 g/cm$^3$.

c. Preparation of Nonaqueous Electrolyte

A nonaqueous electrolyte was prepared by dissolving $LiPF_6$ as a solute in a mixed solvent of ethylene carbonate: ethyl methyl carbonate=1:2 (volume ratio) so as for the concentration to be 1.0 mol/L.

d. Assembly of Battery

The separator was cut out as a 30-mm ϕ disc, and the positive electrode and the negative electrode were each cut out as a 16-mm ϕ disc. The negative electrode, the separator and the positive electrode were superposed in this order so as for the active material sides of the positive electrode and the negative electrode to face each other, and the resulting superposed assembly was housed in a stainless steel vessel with a lid. The vessel and the lid were insulated, and the vessel was brought into contact with the copper foil of the negative electrode and the lid was brought into contact with the aluminum foil of the positive electrode. The above-described nonaqueous electrolyte was injected into the vessel and the vessel was hermetically sealed. The assembled battery was allowed to stand at room temperature for 1 day, and then the first charge of the battery subsequent to the assembly of the battery was performed for a total time of 8 hours in such a way that the battery was charged in an atmosphere of 25° C. with a current value of 2.0 mA (0.33 C) until the battery voltage reached 4.2 V; after the attainment of 4.2 V, while the battery voltage was being regulated to hold 4.2 V, the current value was decreased starting from 2.0 mA. Successively, the battery was discharged down to a battery voltage of 3.0 V with a current value of 2.0 mA (0.33 C).

e. Capacity Retention Ratio (%)

In the atmosphere of 60° C., 100 cycles of charge and discharge were performed. The charge of the battery was performed for a total time of 3 hours in such a way that the battery was charged with a current value of 6.0 mA (1.0 C) until the battery voltage reached 4.2 V; after the attainment of 4.2 V, while the battery voltage was being regulated to hold 4.2 V, the current value was decreased starting from 6.0 mA. The discharge of the battery was performed with a current value of 6.0 mA (1.0 C) until the battery voltage reached 3.0 V. From the discharge capacity of the 100th cycle and the discharge capacity of the first cycle, the capacity retention ratio was calculated. The cases where the capacity retention ratio was high were evaluated to have a satisfactory cycle property.

Example 1-1

The raw material mixture for a first polyolefin microporous layer was prepared by preliminarily mixing a mixture with a super mixer. The mixture includes: $SiO_2$ having a primary particle size of 15 nm, "DM10C" (trademark, manufactured by Tokuyama Corp., hydrophobized with dimethyldichlorosilane) in an amount of 24.0 parts by mass (60% by mass as the inorganic particle concentration); an ultrahigh molecular weight polyethylene having a viscosity average molecular weight (Mv) of 2,000,000, "UH850" (trademark, manufactured by Asahi Kasei Chemicals Corp.) in an amount of 6.4 parts by mass (16% by mass as the proportion in the total amount of the polyolefin resin and the inorganic particle); and a homopolypropylene having a Mv of 400,000, "H-100M" (manufactured by Prime Polymer Co., Ltd.) in an amount of 9.6 parts by mass (24% by mass as the proportion in the total amount of the polyolefin resin and the inorganic particle); and further, 28.8 parts by mass of a liquid paraffin SMOIL P-350 (trademark, Matsumura Oil Research Corp.) added as a plasticizer and 0.3 part by mass of pentaerythrityl-tetrakis-[3-(3,5-di-t-butyl-4-hydroxyphenyl) propionate] added as an antioxidant.

The raw material mixture for a second polyolefin microporous layer was prepared as a mixture including: a high-density polyethylene "UH650" (trademark, manufactured by Asahi Kasei Chemicals Corp.) having a Mv of 700,000 in an amount of 20 parts by mass (50% by mass in the total amount of the polyolefin resin); and a high-density polyethylene "SH800" (trademark, manufactured by Asahi Kasei Chemicals Corp.) having a Mv of 270,000 in an amount of 20 parts by mass (50% by mass in the total amount of the polyolefin resin); and further, 0.3 part by mass of pentaerythrityl-tetrakis-[3-(3,5-di-t-butyl-4-hydroxyphenyl) propionate] added as an antioxidant.

The resulting raw material mixtures were fed with feeders to the feed inlets of two corotation double screw extruders, respectively. In each of the raw material mixtures, a liquid paraffin was side fed to the cylinder of the concerned double screw extruder in such a way that the proportion of the plasticizer in the whole mixture to be melt-kneaded and extruded was regulated to be 60% by mass. The melt-kneading conditions in the extruders were such that the raw material mixture for the first microporous layer was melt-kneaded at a temperature set at 200° C., a screw rotation number of 100 rpm and a discharge rate of 5 kg/h, and the raw material mixture for the second microporous layer was melt-kneaded at a temperature set at 200° C., a screw rotation number of 120 rpm and a discharge rate of 16 kg/h.

Successively, the melt-kneaded mixtures were respectively passed through gear pumps, ducts and a T-die capable of performing two-type three-layer coextrusion, all set at a temperature of 220° C., extruded onto a roll having a surface temperature controlled at 30° C., and cooled with a roll having a surface temperature of 25° C., to yield a 1200-µm thick sheet-like composition in which the first layers formed of the raw material for the first microporous layer were the surface layers. Next, the sheet-like composition was successively led to a simultaneous biaxial tenter and was simultaneously biaxially stretched with a longitudinal magnification of 7 times and a transverse magnification of 7 times. The set temperature of the simultaneous biaxial tenter was 123° C. Then, the sheet-like composition was introduced into an extraction vessel, and sufficiently immersed in methylene chloride, and thus the liquid paraffin was extracted and removed. Then, the methylene chloride in the sheet-like composition was dried. Further, the sheet-like composition was led to a transverse tenter, stretched in TD with a magnification of 1.4 times and relaxed so as to have a magnification of 1.2 times in TD at the final outlet and then taken up (in the concerned tables, described as "1.4-1.2"). The set temperature of the TD stretching section was 120° C. and the set temperature of the relaxation section was 125° C. (in the concerned tables, described as "120-125"). The properties of the thus obtained laminated separator are shown in Table 1.

Examples 1-2 to 1-17 and Comparative Example 1-2

Laminated separators were obtained in the same manner as in Example 1-1 except for the conditions described in Tables 1 and 2. The results are shown in Tables 1 and 2.

Example 1-18

A laminated separator was obtained in the same manner as in Example 1-1 except that the raw material for the first polyolefin microporous layer was prepared by using $SiO_2$ having a primary particle size of 15 nm in an amount of 24.0 parts by mass, an ultra high molecular weight polyethylene having a viscosity average molecular weight (Mv) of 270,000 in an amount of 5.1 parts by mass, a polyethylene having a viscosity average molecular weight (Mv) of 1,000 in an amount of 1.3 parts by mass and a homopolypropylene having a Mv of 400,000 in an amount of 9.6 parts by mass.

The obtained laminated separator was excellent in the shutdown property.

The origins of the respective raw materials are as follows.
[Inorganic Particle]
$SiO_2$: Silica "DM10C" (trademark, manufactured by Tokuyama Corp., hydrophobized with dimethyldichlorosilane) having an average primary particle size of 15 nm
$Al_2O_3$: Various commercially available aluminas having an average primary particle size of 13 nm to 100 nm
[PP]
Mv 400,000: Homopropylene "H-100M" (manufactured by Prime Polymer Co., Ltd.) having a Mv of 400,000
[PE]
Mv 2,000,000: Ultra high molecular weight polyethylene "UH850" (trademark, manufactured by Asahi Kasei Chemicals Corp.) having a Mv of 2,000,000

Mv 700,000: High-density polyethylene "UH650" (trademark, manufactured by Asahi Kasei Chemicals Corp.) having a Mv of 700,000

Mv 270,000: High-density polyethylene "SH800" (trademark, manufactured by Asahi Kasei Chemicals Corp.) having a Mv of 270,000

Comparative Example 1-1

A raw material mixture was prepared by preliminarily mixing a mixture with a super mixer. The mixture includes: silica having an average primary particle size of 15 nm, "DM10C" (trademark, manufactured by Tokuyama Corp., hydrophobized with dimethyldichlorosilane) in an amount of 24.0 parts by mass; an ultrahigh molecular weight polyethylene having a viscosity average molecular weight (Mv) of 2,000,000, "UH850" (trademark, manufactured by Asahi Kasei Chemicals Corp.) in an amount of 6.4 parts by mass; and a homopolypropylene having a Mv of 400,000, "H-100M" (manufactured by Prime Polymer Co., Ltd.) in an amount of 9.6 parts by mass; and further, 28.8 parts by mass of a liquid paraffin SMOIL P-350 (trademark, manufactured by Matsumura Oil Research Corp.) added as a plasticizer and 0.3 part by mass of pentaerythrityl-tetrakis-[3-(3,5-di-t-butyl-4-hydroxyphenyl) propionate] added as an antioxidant.

The resulting raw material mixture was fed with a feeder to the feed inlet of a corotation double screw extruder. A liquid paraffin was side fed to the cylinder of the concerned double screw extruder in such a way that the proportion of the plasticizer in the whole mixture to be melt-kneaded and extruded was regulated to be 60% by mass. The melt-kneading conditions in the extruder were such that the set temperature was 200° C., a screw rotation number was 150 rpm and a discharge rate was 20 kg/h. Successively, the melt-kneaded mixture was passed through a gear pump, a duct and a monolayer T-die, all set at a temperature of 220° C., extruded onto a roll having a surface temperature controlled at 30° C., and cooled with a roll having a surface temperature controlled at 25° C., to yield a 1200-µm thick sheet-like composition. Next, the sheet-like composition was successively led to a simultaneous biaxial tenter and was simultaneously biaxially stretched with a longitudinal magnification of 7 times and a transverse magnification of 7 times. The set temperature of the simultaneous biaxial tenter was 123° C. Then, the sheet-like composition was introduced into an extraction vessel, and sufficiently immersed in methylene chloride, and thus the liquid paraffin was extracted and removed. Then, the methylene chloride in the sheet-like composition was dried. Further, the sheet-like composition was led to a transverse tenter, stretched in the transverse direction with a magnification of 1.4 times and relaxed so as to have a magnification of 1.2 times at the final outlet and then taken up. The set temperature of the transverse stretching section was 120° C. and the set temperature of the relaxation section was 125° C. The properties of the thus obtained microporous membrane are shown in Table 2.

TABLE 1

|  |  |  | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|---|
|  | Structure |  | First layer/ second layer/ first layer | First layer/ second layer/ first layer | First layer/ second layer/ first layer | First layer/ second layer/ first layer | First layer/ second layer/ first layer | First layer/ second layer/ first layer | First layer/ second layer/ first layer | First layer/ second layer/ first layer | First layer/ second layer/ first layer | First layer/ second layer/ first layer |
| First layer composition | Type of inorganic particle |  | SiO2 | Al2O3 | Al2O3 | Al2O3 | SiO2 | SiO2 | SiO2 | SiO2 | SiO2 | SiO2 |
|  | Primary particle size of inorganic particle | nm | 15 | 13 | 50 | 80 | 15 | 15 | 15 | 15 | 15 | 15 |
|  | PP(Mv) | in units of 10000 | 40 | 40 | 40 | 40 | 40 | 40 | 40 | 40 | 40 | 40 |
|  | PE(Mv) | in units of 10000 | 200 | 200 | 200 | 200 | 200 | 200 | 200 | 200 | 200 | 200 |
|  | Inorganic particle | mass % | 60 | 60 | 60 | 60 | 80 | 40 | 20 | 60 | 60 | 60 |
|  | PP | mass % | 24 | 24 | 24 | 24 | 12 | 36 | 48 | 32 | 16 | 24 |
|  | Propylene-ethylene copolymer | mass % | — | — | — | — | — | — | — | — | — | — |
|  | PE | mass % | 16 | 16 | 16 | 16 | 8 | 24 | 32 | 8 | 24 | 16 |
|  | PP content in first layer (ratio of PP to PO) | mass % | 60 | 60 | 60 | 60 | 80 | 40 | 20 | 60 | 60 | 60 |
| Second layer composition | Type of inorganic particle |  | — | — | — | — | — | — | — | — | — | — |
|  | Primary particle size of inorganic particle | nm | — | — | — | — | — | — | — | — | — | — |
|  | PP(Mv) | in units of 10000 | — | — | — | — | — | — | — | — | — | — |
|  | PE1(Mv) | in units of 10000 | 70 | 70 | 70 | 70 | 70 | 70 | 70 | 70 | 70 | 70 |
|  | PE2(Mv) | in units of 10000 | 27 | 27 | 27 | 27 | 27 | 27 | 27 | 27 | 27 | 27 |
|  | Inorganic particle | mass % | 0 | 0 | 0 | 0 | 0 | 0 | 0 | 0 | 0 | 0 |
|  | PP | mass % | 0 | 0 | 0 | 0 | 0 | 0 | 0 | 0 | 0 | 0 |
|  | PE1 | mass % | 50 | 50 | 50 | 50 | 50 | 50 | 50 | 50 | 50 | 50 |
|  | PE2 | mass % | 50 | 50 | 50 | 50 | 50 | 50 | 50 | 50 | 50 | 50 |
| Extrusion (first layer) | Extrusion rate | kg/h | 5 | 5 | 5 | 5 | 5 | 5 | 5 | 5 | 5 | 10 |
|  | Plasticizer proportion | mass % | 60 | 60 | 60 | 60 | 60 | 60 | 60 | 60 | 60 | 60 |
|  | Rotation number | rpm | 100 | 100 | 100 | 100 | 100 | 100 | 100 | 100 | 100 | 120 |
|  | Temperature | ° C. | 200 | 200 | 200 | 200 | 200 | 200 | 200 | 200 | 200 | 200 |
| Extrusion (second layer) | Extrusion rate | kg/h | 16 | 16 | 16 | 16 | 16 | 16 | 16 | 16 | 16 | 11 |
|  | Plasticizer proportion | mass % | 60 | 60 | 60 | 60 | 60 | 60 | 60 | 60 | 60 | 60 |
|  | Rotation number | rpm | 120 | 120 | 120 | 120 | 120 | 120 | 120 | 120 | 120 | 100 |

TABLE 1-continued

|  |  |  | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|---|
|  | Temperature | °C. | 200 | 200 | 200 | 200 | 200 | 200 | 200 | 200 | 200 | 200 |
| Biaxial tenter | Temperature | °C. | 123 | 123 | 123 | 123 | 123 | 123 | 123 | 123 | 123 | 123 |
|  | Magnification | times | 7 × 7 | 7 × 7 | 7 × 7 | 7 × 7 | 7 × 7 | 7 × 7 | 7 × 7 | 7 × 7 | 7 × 7 | 7 × 7 |
| Relaxation | Temperature | °C. | 120-125 | 120-125 | 120-125 | 120-125 | 120-125 | 120-125 | 120-125 | 120-125 | 120-125 | 120-125 |
|  | Magnification | times | 1.4-1.2 | 1.4-1.2 | 1.4-1.2 | 1.4-1.2 | 1.4-1.2 | 1.4-1.2 | 1.4-1.2 | 1.4-1.2 | 1.4-1.2 | 1.4-1.2 |
| Total membrane thickness |  | μm | 18 | 18 | 18 | 18 | 18 | 18 | 18 | 18 | 18 | 18 |
| Surface layer thickness |  | μm | 2 (both of 2 layers) | 2 (both of 2 layers) | 2 (both of 2 layers) | 2 (both of 2 layers) | 2 (both of 2 layers) | 2 (both of 2 layers) | 2 (both of 2 layers) | 2 (both of 2 layers) | 2 (both of 2 layers) | 4 (both of 2 layers) |
| Porosity |  | % | 57 | 55 | 58 | 60 | 61 | 53 | 49 | 56 | 58 | 60 |
| Air permeability |  | sec/100 cc | 170 | 188 | 159 | 133 | 131 | 208 | 234 | 183 | 165 | 142 |
| Puncture strength |  | N/20 μm | 4.5 | 4.5 | 4.4 | 4.2 | 4.3 | 4.5 | 4.5 | 4.5 | 4.5 | 4.4 |
| Shutdown temperature |  | °C. | 141 | 141 | 141 | 141 | 141 | 140 | 139 | 141 | 141 | 144 |
| Soldering test | 300° C. | mm2 | 3.3 | 3.5 | 3.9 | 4.4 | 3.1 | 4.5 | 4.8 | 3.2 | 3.8 | 3.3 |
|  | 400° C. | mm2 | 6.1 | 6.3 | 7.0 | 7.5 | 5.8 | 7.4 | 7.9 | 5.9 | 6.8 | 6.0 |
| Capacity retention ratio |  | % | 87 | 87 | 86 | 84 | 88 | 84 | 82 | 88 | 84 | 87 |

TABLE 2

|  |  |  | Example 1-11 | Example 1-12 | Example 1-13 | Example 1-14 | Example 1-15 | Example 1-16 | Example 1-17 | Comparative Example 1-1 | Comparative Example 1-2 |
|---|---|---|---|---|---|---|---|---|---|---|---|
|  | Structure |  | Second layer/first layer/second layer | First layer/first layer/second layer | First layer/second layer/first layer | Second layer/second layer/first layer | First layer/first layer/second layer | First layer/second layer/first layer | Second layer/second layer/first layer | Monolayer | First layer/second layer/first layer |
| First layer composition | Type of inorganic particle |  | SiO2 | SiO2 | SiO2 | SiO2 | SiO2 | SiO2 | SiO2 | SiO2 | Al2O3 |
|  | Primary particle size of inorganic particle | nm | 15 | 15 | 15 | 15 | 15 | 15 | 15 | 15 | 100 |
|  | PP(Mv) | in units of 10000 | 40 | 40 | 40 | 40 | 40 | 40 | 40 | 40 | 40 |
|  | PE(Mv) | in units of 10000 | 200 | 200 | 200 | 27 | 27 | 27 | 27 | 200 | 200 |
|  | Inorganic particle | mass % | 60 | 60 | 60 | 30 | 30 | 30 | 30 | 60 | 60 |
|  | PP | mass % | 24 | 24 | 24 | 49 | 28 | 34 | 34 | 24 | 24 |
|  | Propylene-ethylene copolymer | mass % | — | — | — | — | — | 15 | 15 | — | — |
|  | PE | mass % | 16 | 16 | 16 | 21 | 42 | 21 | 21 | 16 | 16 |
|  | PP content in first layer (ratio of PP to PO) | mass % | 60 | 60 | 60 | 70 | 40 | 70 | 70 | 60 | 60 |

TABLE 2-continued

| | | | Example 1-11 | Example 1-12 | Example 1-13 | Example 1-14 | Example 1-15 | Example 1-16 | Example 1-17 | Comparative Example 1-1 | Comparative Example 1-2 |
|---|---|---|---|---|---|---|---|---|---|---|---|
| Second layer composition | Type of inorganic particle | | — | — | SiO2 | — | — | — | — | — | — |
| | Primary particle size of inorganic particle | nm | — | — | 15 | — | — | — | — | — | — |
| | PP(Mv) | in units of 10000 | — | 40 | — | — | — | — | — | — | — |
| | PE1(Mv) | in units of 10000 | 70 | 70 | 70 | 70 | 70 | 70 | 70 | — | 70 |
| | PE2(Mv) | in units of 10000 | 27 | 27 | 27 | 27 | 27 | 27 | 27 | — | 27 |
| | Inorganic particle | mass % | 0 | 0 | 15 | 0 | 0 | 0 | 0 | — | 0 |
| | PP | mass % | 0 | 15 | 0 | 5 | 20 | 5 | 5 | — | 0 |
| | PE1 | mass % | 50 | 42.5 | 42.5 | 47.5 | 40 | 47.5 | 47.5 | — | 50 |
| | PE2 | mass % | 50 | 42.5 | 42.5 | 47.5 | 40 | 47.5 | 47.5 | — | 50 |
| Extrusion (first layer) | Extrusion rate | kg/h | 14 | 5 | 5 | 5 | 5 | 5 | 5 | — | 5 |
| | Plasticizer proportion | mass % | 60 | 60 | 60 | 60 | 60 | 60 | 60 | — | 60 |
| | Rotation number | rpm | 140 | 100 | 100 | 100 | 100 | 100 | 100 | — | 100 |
| | Temperature | °C. | 200 | 200 | 200 | 200 | 200 | 200 | 200 | — | 200 |
| Extrusion (second layer) | Extrusion rate | kg/h | 7 | 16 | 16 | 16 | 16 | 16 | 16 | 16 | 5 |
| | Plasticizer proportion | mass % | 60 | 60 | 60 | 60 | 60 | 60 | 60 | 60 | 60 |
| | Rotation number | rpm | 80 | 120 | 120 | 120 | 120 | 120 | 120 | 120 | 100 |
| | Temperature | °C. | 200 | 200 | 200 | 200 | 200 | 200 | 200 | 200 | 200 |
| Biaxial tenter | Temperature | °C. | 123 | 123 | 123 | 123 | 123 | 123 | 123 | 123 | 123 |
| | Magnification | times | 7 × 7 | 7 × 7 | 7 × 7 | 7 × 7 | 7 × 7 | 7 × 7 | 7 × 7 | 7 × 7 | 7 × 7 |
| Relaxation | Temperature | °C. | 120-125 | 120-125 | 120-125 | 120-125 | 120-125 | 120-125 | 120-125 | 120-125 | 120-125 |
| | Magnification | times | 1.4-1.2 | 1.4-1.2 | 1.4-1.2 | 1.4-1.2 | 1.4-1.2 | 1.4-1.2 | 1.4-1.2 | 1.4-1.2 | 1.4-1.2 |
| Total membrane thickness | | μm | 18 | 18 | 18 | 18 | 18 | 18 | 18 | 18 | 18 |
| Surface layer thickness | | μm | 3 (both of 2 layers) | 2 (both of 2 layers) | 2 (both of 2 layers) | 2 (both of 2 layers) | 2 (both of 2 layers) | 2 (both of 2 layers) | 2 (both of 2 layers) | 18 (Monolayer) | 2 (both of 2 layers) |
| Porosity | | % | 62 | 58 | 55 | 52 | 56 | 53 | 53 | 66 | 63 |
| Air permeability | | sec/100 cc | 127 | 179 | 161 | 220 | 150 | 210 | 230 | 82 | 106 |
| Puncture strength | | N/20 μm | 3.3 | 4.5 | 4.5 | 3.5 | 3.5 | 3.4 | 3.4 | 2.9 | 4 |
| Shutdown temperature | | °C. | 143 | 143 | 143 | 141 | 141 | 140 | 140 | — | 141 |
| Soldering test | 300° C. | mm2 | 4.2 | 3.3 | 3.1 | 4.2 | 4.4 | 4.6 | 4.6 | 5.4 | 5.2 |
| | 400° C. | mm2 | 7.2 | 6.0 | 5.9 | 7.0 | 7.4 | 7.4 | 7.4 | 8.5 | 8.3 |
| Capacity retention ratio | | % | 84 | 87 | 87 | 84 | 83 | 85 | 86 | 78 | 79 |

From the results shown in Tables 1 and 2, the following contents can be recognized.

(1) As can be seen from a comparison between Examples 1-1 to 1-4 and Comparative Examples 1-1 and 1-2, the laminated separators of Embodiment 1 including inorganic particles having primary particle sizes falling within a specific range and having a laminated structure provides a satisfactory compatibility between the heat resistance, the cycle property and the shutdown property with a satisfactory balance therebetween, in contrast to an embodiment in which the primary particle size deviates from the specific range or an embodiment which has no laminated structure.

(2) As can be seen from the results of Example 1-1 and Examples 1-5 to 1-7, the effect of establishing the compatibility between the heat resistance, the cycle property and the shutdown property is realized over a wide range of the inorganic particle content.

(3) As can be seen from the results of Example 1-1 and Examples 1-8 and 1-9, the effect of establishing the compatibility between the heat resistance, the cycle property and the shutdown property is realized over a wide range of the PP content.

(4) As can be seen from the results of Example 1-1 and Examples 1-10 to 1-13, the effect of establishing the compatibility between the heat resistance, the cycle property and the shutdown property is realized for various surface layer thicknesses and for various layer structures.

Embodiment 2

Next, Embodiment 2 is more specifically described with reference to Examples and Comparative Examples; however, Embodiment 2 is not limited to following Examples unless the gist of Embodiment 2 is exceeded. The physical properties in Examples were measured with the following methods.

(1) Viscosity Average Molecular Weight (Mv)

The intrinsic viscosity [η] in decalin as solvent at 135° C. was determined on the basis of ASTM-D4020.

The Mv of polyethylene was calculated according to the following formula:

$$[\eta]=0.00068\times Mv^{0.67}$$

The Mv of polypropylene was calculated according to the following formula:

$$[\eta]=1.10\times Mv^{0.80}$$

The Mv of a layer was calculated by using the formula for polyethylene.

(2) Membrane Thickness (μm)

The membrane thickness was measured at a room temperature of 23±2° C., with a micro thickness meter (trade name: KBM, manufactured by Toyo Seiki Seisaku-sho, Ltd.).

(3) Porosity (%)

From a microporous membrane, a 10 cm×10 cm square sample was cut out, and the volume (cm$^3$) and the mass (g) were determined; from these determined values and the membrane density (g/cm3), the porosity was calculated according to the following formula:

Porosity (%)=(volume−mass/density of mixed composition)/volume×100

The density of the mixed composition used was a value calculated from the densities of the polyolefin resin used and the inorganic filler used, and the mixing ratio between the polyolefin resin and the inorganic filler.

(4) Air Permeability (sec/100 cc)

The air permeability was measured with a Gurley air permeability tester (manufactured by Toyo Seiki Seisaku-sho, Ltd.) according to JIS P-8117.

(5) Puncture Strength (g)

A puncture test was performed with a handy compression tester, KES-G5 (trademark), manufactured by Kato Tech Co., Ltd., under the conditions of a needle tip having a curvature radius of 0.5 mm and a puncture speed of 2 mm/sec. The maximum puncture load was taken as the puncture strength (g).

(6) Electrolyte Impregnation Property

As an electrolyte, a 1 mol/L lithium hexafluorophosphate (solvent: propylene carbonate) was used. In a glove box, the electrolyte was dropwise placed on a microporous membrane. The case where 80% or more of the area in which the electrolyte droplet and the microporous membrane were brought into contact with each other was transparent after an elapsed time of 30 seconds was evaluated that the impregnation property was satisfactory (○), and the case where less than 80% of the aforementioned area was transparent after an elapsed time of 30 seconds was evaluated that the impregnation property was insufficient (X).

(7) Cycle Property (%/100 times)

An electrolyte was prepared by dissolving 1 M of LiPF$_6$ in a mixed solvent composed of ethylene carbonate (EC): methylene carbonate (MEC)=1:2 (weight ratio). A carbon electrode was used for the negative electrode, and LiCoO$_2$ was used for the positive electrode. As a separator, a microporous membrane of a measurement sample was used. Thus, a lithium ion battery was assembled. A cycle test was performed in which the operation of charging the battery to 4.2 V and then discharging the battery was repeated at 25° C. 100 times. The battery capacity change after the cycle test was examined.

(8) Shutdown Temperature (° C.) and Short-Circuit Temperature (° C.)

FIG. 1(A) schematically shows a shutdown temperature measurement apparatus. Item 1 represents a microporous membrane (a laminated separator as a measurement object), items 2A and 2B represent 10-μm thick nickel foils, and items 3A and 3B represent glass plates. Item 4 represents an electrical resistance measurement apparatus (AG-4311 (trademark), an LCR meter, manufactured by Ando Electric Co., Ltd.) which is connected to the nickel foils 2A and 2B. Item 5 represents a thermocouple which is connected to a thermometer 6. Item 7 represents a data collector which is connected to the electrical resistance measurement apparatus 4 and the thermometer 6. Item 8 represents an oven which is used for heating the microporous membrane.

More specifically, as shown in FIG. 1(B), the microporous membrane 1 was superposed on the nickel foil 2A, and longitudinally fixed to the nickel foil 2A with a TEFLON tape (including PTFE; the shaded section in the figure). The microporous membrane 1 was impregnated with a 1 mol/liter lithium borofluoride solution (solvent: propylene carbonate/ethylene carbonate/γ-butyl lactone=1/1/2). Onto the nickel foil 2B, as shown in FIG. 1(C), a TEFLON tape (including PTFE; the shaded section in the figure) was bonded, and thus the nickel foil 2B was masked with a 15 mm×10 mm window section left unmasked in the central section of the foil 2B.

The nickel foil 2A and the nickel foil 2B were superposed on each other so as to sandwich the microporous membrane 1, and the two-sheets of the nickel foils were sandwiched from the both sides with the glass plates 3A and 3B. In this case, the window section of the foil 2B and the microporous membrane 1 were arranged so as to face each other.

The two sheets of the glass plates were fixed by clipping with commercially available double clips. The thermocouple 5 was fixed onto the glass plates with a TEFLON tape including PTFE.

With such an apparatus, the temperature and the electrical resistance were continuously measured. The temperature was increased from 25° C. to 200° C. at a rate of 2° C./min, and the electrical resistance was measured with an alternating current of 1 V and 1 kHz. The shutdown temperature was defined as the temperature where the electrical resistance of the microporous membrane reached 10$^3$Ω. The short-circuit temperature was defined as the temperature where after the membrane underwent shutdown and the pores reached a blocked condition, the impedance again reached a value smaller than 10$^3$Ω.

(9) Ethylene Content in Polypropylene-Ethylene Copolymer

From a $^{13}$C-NMR spectrum measured under the following conditions, the ethylene content was determined on the basis of the report published by Kakugo et al. (Macromolecules 1982, 15, 1150-1152). In a 10-mmϕ test tube, about 200 mg of propylene-ethylene block copolymer was uniformly dissolved in 3 ml of ortho-dichlorobenzene to prepare a sample, and a measurement was performed under the following conditions.

Measurement temperature: 135° C.
Pulse repetition time: 10 seconds
Pulse width: 45°
Accumulation number: 2500

(10) Plasticizer Oil Absorption Amount of Inorganic Filler

The measurement was performed as follows with a FRONTEX 5410 plasticizer oil absorption meter. In the meter, 5 g of an inorganic filler was placed, and a plasticizer (paraffin oil) was added dropwise with kneading. The torque during the kneading was increased and then decreased; accordingly, the addition amount (ml) of the plasticizer at the time when the torque was decreased to 70% of the maximum torque was measured; the plasticizer oil absorption amount was calculated from this addition amount (ml) and the weight (g) of the inorganic filler according to the following formula.

Plasticizer oil absorption amount (mL/100 g)=addition amount of plasticizer/weight of inorganic filler×100

Example 2-1

A raw material mixture was prepared by mixing 21.2 parts by mass (78% by mass) of a polypropylene (melting point: 163° C.) having a viscosity average molecular weight of 400,000, 0.4 part by mass (2% by mass) of a propylene-ethylene copolymer (melting point: 160° C.) having a viscosity average molecular weight of 250,000 and an ethylene content of 3% by mass, 5.4 parts by mass (20% by mass) of a high-density polyethylene (melting point: 137° C.) having a viscosity average molecular weight of 250,000, 0.3 part by mass of bis(p-ethylbenzylidene) sorbitol as a nucleating agent, 0.2 part by mass of tetrakis-[methylene-(3',5'-di-t-butyl-4'-hydroxyphenyl) propionate] methane as an antioxidant and 63 parts by mass (70% by mass) of a paraffin oil (P350P, manufactured by Matsumura Oil Research Corp.). The resulting raw material mixture was kneaded with a batch-type melt kneader (Laboplastomill, manufactured by Toyo Seiki Seisaku-sho, Ltd.) at 200° C. at 50 rpm for 10 minutes. The resulting kneaded mixture was molded at 5 MPa with a hot press set at 200° C., and heat treated as it was for 3 minutes, and then cooled at 5 MPa with a water-cooling press controlled at 25° C. to form a 500-μm thick sheet. The sheet was stretched 4 times×4 times at 120° C. with a simultaneous biaxial stretching machine (manufactured by Toyo Seiki Seisaku-sho, Ltd.), then the paraffin oil was extracted and removed with methylene chloride, and the sheet was dried. The physical properties of the obtained polyethylene microporous membrane are shown in Table 3.

Examples 2-2 to 2-5 and Comparative Examples 2-1 to 2-3

Polyethylene microporous membranes were obtained in the same manner as in Example 2-1 except for the conditions shown in Table 3. The physical properties of the obtained polyethylene microporous membranes are shown in Table 3.

The oil absorption amount of the silica used as the inorganic filler was 200 mL/100 g.

Example 2-6

The raw material mixture for the surface layer was prepared by stirring with a mixer 31.4 parts by mass of a polypropylene (melting point: 163° C.) having a viscosity average molecular weight of 400,000, 0.6 part by mass of a propylene-ethylene copolymer (melting point: 160° C.) having a viscosity average molecular weight of 250,000 and an ethylene content of 3% by mass, 8.0 parts by mass of a high-density polyethylene (melting point: 137° C.) having a viscosity average molecular weight of 250,000, 0.3 part by mass of bis(p-ethylbenzylidene) sorbitol as a nucleating agent, 0.2 part by mass of tetrakis-[methylene-(3',5'-di-t-butyl-4'-hydroxyphenyl) propionate] methane as an antioxidant and 9.6 parts by mass of a liquid paraffin (P350P, manufactured by Matsumura Oil Research Corp.) as a plasticizer.

The raw material mixture for the intermediate layer was prepared by mixing 14.25 parts by mass of a high-density polyethylene having a viscosity average molecular weight of 250,000, 14.25 parts by mass of a high-density polyethylene having a viscosity average molecular weight of 700,000, 1.5 parts by mass of a polypropylene having a viscosity average molecular weight of 400,000 and 0.2 part by mass of tetrakis-[methylene-(3',5'-di-t-butyl-4'-hydroxyphenyl) propionate] methane as an antioxidant.

The resulting raw material mixtures were fed through feeders to two double screw extruders each having a diameter of 25 mm and with L/D=48. Further, 65 parts by mass of a liquid paraffin and 70 parts by mass of a liquid paraffin were added to the raw material mixture for the surface layer and the raw material mixture for the intermediate layer, respectively, in such a way that, for each of these raw material mixtures, liquid paraffin was injected into the concerned double screw extruder by side feeding. The extrusion rates for the both surface layers and the intermediate layer were regulated to be 4 kg per 1 hour and 16 kg per 1 hour, respectively. After kneading under the conditions of 200° C. and 200 rpm, the kneaded raw material mixtures were extruded from a T-die, fixed to the end of each of the extruders, capable of performing coextrusion (two-type three-layer) under a condition of 220° C. Immediately, the extruded product was extruded to a roll having a surface temperature controlled at 70° C., and further cooled with a roll having a surface temperature controlled at 25° C., and thus, a 1.4-mm thick sheet was formed. The sheet was stretched 7 times×7 times under a condition of 123° C. with a simultaneous biaxial stretching machine, then immersed in methylene chloride to extract and remove the liquid paraffin, and then dried. The dried sheet was stretched with a tenter stretching machine under a condition of 119° C. in the transverse direction with a magnification of 1.4 times. Then, the stretched sheet was heat treated at 124° C. to be relaxed by 21% in the transverse direction, and thus a microporous membrane having a two-type three-layer structure in which the two surface layers were the same in composition, and the intermediate layer was different in composition from the surface layers was obtained. The physical properties of the obtained microporous membrane are shown in Table 4.

Examples 2-7 to 2-15 and Comparative Examples 2-4 and 2-5

Polyethylene microporous membranes were obtained in the same manner as in Example 2-6 except for the conditions shown in Table 4. The physical properties of the obtained polyethylene microporous membranes are shown in Table 4.

Example 2-16

A microporous membrane having a two-type three-layer structure was obtained in the same manner as in Example 2-6 except that the raw material for the first polyolefin microporous membrane had a composition including 24.4 parts by mass of a polypropylene (melting point: 163° C.) having a viscosity average molecular weight of 400,000, 1.2 parts by mass of a propylene-ethylene copolymer (melting point: 160° C.) having a viscosity average molecular weight of 250,000 and an ethylene content of 3% by mass, 5.9 parts by mass of a high-density polyethylene (melting point: 137° C.) having a viscosity average molecular weight of 250,000, 0.5 part by mass of a polyethylene (melting point: 120° C.) having a viscosity average molecular weight of 1000 and 8 parts by mass of silica having an average primary particle size of 15 nm.

The obtained laminated separator was excellent in the shutdown property.

The oil absorption amount of the silica used as the inorganic filler was 200 mL/100 g.

TABLE 3

| | Sample | Example 2-1 | Example 2-2 | Example 2-3 | Example 2-4 | Example 2-5 | Comparative Example 2-1 | Comparative Example 2-2 | Comparative Example 2-3 |
|---|---|---|---|---|---|---|---|---|---|
| First layer (A) | Polypropylene | | | | | | | | |
| | Mv (in units of 10000) | 40 | 40 | 40 | 40 | 40 | 40 | 40 | 40 |
| | Melting point (° C.) | 163 | 163 | 163 | 163 | 163 | 163 | 163 | 163 |
| | wt % | 78 | 78 | 56 | 61 | 45 | 80 | 78 | 64 |
| | Propylene-ethylene copolymer | | | | | | | | |
| | Mv (in units of 10000) | 25 | 25 | 25 | 25 | 25 | — | 25 | — |
| | Melting point (° C.) | 160 | 160 | 160 | 160 | 160 | — | 160 | — |
| | Ethylene content (wt %) | 3 | 10 | 3 | 3 | 3 | — | 20 | — |
| | wt % | 2 | 2 | 24 | 3 | 19 | 0 | 2 | 0 |
| | High-density polyethylene | | | | | | | | |
| | Mv (in units of 10000) | 25 | 25 | 25 | 25 | 25 | 25 | 25 | 25 |
| | Melting point (° C.) | 137 | 137 | 137 | 137 | 137 | 137 | 137 | 137 |
| | wt % | 20 | 20 | 20 | 16 | 16 | 20 | 20 | 16 |
| | Silica | | | | | | | | |
| | wt % | 0 | 0 | 0 | 20 | 20 | 0 | 0 | 20 |
| | Polyolefin resin concentration (wt %)*) | 30 | 30 | 30 | 24 | 24 | 30 | 30 | 24 |
| Second layer (B) | Polypropylene | | | | | | | | |
| | Mv (in units of 10000) | | | | | | | | |
| | Melting point (° C.) | | | | | | | | |
| | wt % | | | | | | | | |
| | High-density polyethylene | | | | | | | | |
| | Mv (in units of 10000) | | | | | | | | |
| | Melting point (° C.) | | | | | | | | |
| | wt % | | | | | | | | |
| | Mv (in units of 10000) | | | | | | | | |
| | Melting point (° C.) | | | | | | | | |
| | wt % | | | | | | | | |
| | Polyolefin resin concentration (wt %)*) | | | | | | | | |
| Production conditions | Layer structure | A | A | A | A | A | A | A | A |
| | Kneading temperature (° C.) | 200 | 200 | 200 | 200 | 200 | 200 | 200 | 200 |
| | First stretching | | | | | | | | |
| | Stretching temperature (° C.) | 120 | 120 | 120 | 120 | 120 | 123 | 123 | 123 |
| | Stretching magnification | 4 × 4 | 4 × 4 | 4 × 4 | 4 × 4 | 4 × 4 | 7 × 7 | 7 × 7 | 7 × 7 |
| | Second stretching (times) | | | | | | | | |
| | Stretching temperature (° C.) | — | — | — | — | — | 119 | 119 | 119 |
| | Stretching magnification (times) | — | — | — | — | — | 1.4 | 1.4 | 1.4 |
| Physical properties of membrane | Thickness ratio (A/B/A) | — | — | — | — | — | — | — | — |
| | Membrane thickness (μm) | 18 | 18 | 18 | 18 | 18 | 18 | 18 | 18 |
| | Porosity (%) | 64 | 62 | 64 | 64 | 62 | 59 | 59 | 61 |
| | Air permeability (s/100cc) | 140 | 190 | 150 | 115 | 130 | 286 | 300 | 270 |
| | Puncture strength (g) | 180 | 190 | 180 | 140 | 140 | 200 | 180 | 150 |
| | Cycle property (%/100 times) | 80 | 80 | 80 | 90 | 90 | 60 | 65 | 65 |
| | Electrolyte impregnation property | X | X | X | ○ | ○ | X | X | ○ |
| | Short-circuit temperature (° C.) | 170 | 170 | 170 | 170 | 170 | 170 | 170 | 170 |

*)Proportion of polyolefin resin in total amount of polyolefin resin, inorganic filler and plasticizer

TABLE 4

| | Sample | Example 2-6 | Example 2-7 | Example 2-8 | Example 2-9 | Example 2-10 | Example 2-11 | Example 2-12 | Example 2-13 | Example 2-14 | Example 2-15 | Comparative Example 2-4 | Comparative Example 2-5 |
|---|---|---|---|---|---|---|---|---|---|---|---|---|---|
| First layer (A) | Polypropylene | | | | | | | | | | | | |
| | Mv (in units of 10000) | 40 | 40 | 40 | 40 | 40 | 40 | | 40 | 40 | 40 | 40 | 40 |
| | Melting point (° C.) | 163 | 163 | 163 | 163 | 163 | 163 | 163 | 163 | 163 | 163 | 163 | 163 |
| | wt % | 78 | 78 | 56 | 61 | 45 | 53 | 47 | 40 | 61 | 40 | 80 | 64 |
| | Propylene-ethylene copolymer | | | | | | | | | | | | |
| | Mv (in units of 10000) | 25 | 25 | 25 | 25 | 25 | 25 | 25 | 25 | 25 | 25 | — | — |
| | Melting point (° C.) | 160 | 160 | 160 | 160 | 160 | 160 | 160 | 160 | 160 | 160 | — | — |
| | Ethylene content (wt %) | 3 | 10 | 3 | 3 | 3 | 3 | 3 | 3 | 3 | 3 | — | — |
| | wt % | 2 | 2 | 24 | 3 | 19 | 3 | 2 | 2 | 3 | 2 | 0 | 0 |

TABLE 4-continued

|  | Sample | Example 2-6 | Example 2-7 | Example 2-8 | Example 2-9 | Example 2-10 | Example 2-11 | Example 2-12 | Example 2-13 | Example 2-14 | Example 2-15 | Comparative Example 2-4 | Comparative Example 2-5 |
|---|---|---|---|---|---|---|---|---|---|---|---|---|---|
|  | High-density polyethylene | | | | | | | | | | | | |
|  | Mv (in units of 10000) | 25 | 25 | 25 | 25 | 25 | 25 | 25 | 25 | 25 | 25 | 25 | 25 |
|  | Melting point (° C.) | 137 | 137 | 137 | 137 | 137 | 137 | 137 | 137 | 137 | 137 | 137 | 137 |
|  | wt % | 20 | 20 | 20 | 16 | 16 | 14 | 21 | 18 | 16 | 18 | 20 | 16 |
|  | Silica | | | | | | | | | | | | |
|  | wt % | 0 | 0 | 0 | 20 | 20 | 30 | 30 | 40 | 20 | 40 | 0 | 20 |
|  | Polyolefin resin concentration (wt %)*) | 35 | 35 | 35 | 30 | 30 | 30 | 30 | 30 | 30 | 30 | 35 | 30 |
| Second layer (B) | Polypropylene | | | | | | | | | | | | |
|  | Mv (in units of 10000) | 40 | 40 | 40 | 40 | 40 | 40 | 40 | 40 | 40 | 40 | 40 | 40 |
|  | Melting point (° C.) | 163 | 163 | 163 | 163 | 163 | 163 | 163 | 163 | 163 | 163 | 163 | 163 |
|  | wt % | 5 | 5 | 5 | 5 | 5 | 5 | 5 | 5 | 5 | 5 | 5 | 5 |
|  | High-density polyethylene | | | | | | | | | | | | |
|  | Mv (in units of 10000) | 25 | 25 | 25 | 25 | 25 | 25 | 25 | 25 | 25 | 25 | 25 | 25 |
|  | Melting point (° C.) | 137 | 137 | 137 | 137 | 137 | 137 | 137 | 137 | 137 | 137 | 137 | 137 |
|  | wt % | 47.5 | 47.5 | 47.5 | 47.5 | 47.5 | 47.5 | 47.5 | 47.5 | 47.5 | 47.5 | 47.5 | 47.5 |
|  | Mv (in units of 10000) | 70 | 70 | 70 | 70 | 70 | 70 | 70 | 70 | 70 | 70 | 70 | 70 |
|  | Melting point (° C.) | 137 | 137 | 137 | 137 | 137 | 137 | 137 | 137 | 137 | 137 | 137 | 137 |
|  | wt % | 47.5 | 47.5 | 47.5 | 47.5 | 47.5 | 47.5 | 47.5 | 47.5 | 47.5 | 47.5 | 47.5 | 47.5 |
|  | Polyolefin resin concentration (wt %)*) | 30 | 30 | 30 | 30 | 30 | 30 | 30 | 30 | 30 | 30 | 30 | 30 |
| Production conditions | Layer structure | A/B/A | A/B/A | A/B/A | A/B/A | A/B/A | A/B/A | A/B/A | A/B/A | B/A/B | B/A/B | A/B/A | A/B/A |
|  | Kneading temperature (° C.) | 200 | 200 | 200 | 200 | 200 | 200 | 200 | 200 | 200 | 200 | 200 | 200 |
|  | First stretching Stretching temperature (° C.) | 123 | 123 | 123 | 123 | 123 | 123 | 123 | 123 | 123 | 123 | 123 | 123 |
|  | Stretching magnification (times) | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 |
|  | Second stretching Stretching temperature (° C.) | 119 | 119 | 119 | 119 | 119 | 119 | 119 | 119 | 119 | 119 | 119 | 119 |
|  | Stretching magnification (times) | 1.4 | 1.4 | 1.4 | 1.4 | 1.4 | 1.4 | 1.4 | 1.4 | 1.4 | 1.4 | 1.4 | 1.4 |
|  | Thickness ratio | 1/8/1 | 1/8/1 | 1/8/1 | 1/8/1 | 1/8/1 | 1/8/1 | 1/8/1 | 1/8/1 | 2/1/2 | 2/1/2 | 1/8/1 | 1/8/1 |
|  | Membrane thickness (μm) | 18 | 18 | 18 | 18 | 18 | 18 | 18 | 18 | 18 | 18 | 18 | 18 |
|  | Porosity (%) | 56 | 55 | 53 | 57 | 57 | 59 | 59 | 63 | 56 | 63 | 49 | 53 |
|  | Air permeability (s/100 cc) | 240 | 245 | 260 | 210 | 220 | 170 | 150 | 120 | 190 | 150 | 420 | 370 |
|  | Puncture strength (g) | 300 | 300 | 310 | 300 | 300 | 300 | 320 | 280 | 320 | 260 | 380 | 380 |
|  | Cycle property (%/100 times) | 80 | 80 | 80 | 90 | 90 | 90 | 90 | 95 | 85 | 90 | 65 | 65 |
|  | Electrolyte impregnation property | X | X | X | ○ | ○ | ○ | ○ | ○ | X | X | X | ○ |
|  | Short-circuit temperature (° C.) | 200< | 200< | 200< | 200< | 200< | 200< | 200< | 200< | 200< | 200< | 200< | 200< |

*)Proportion of polyolefin resin in total amount of polyolefin resin, inorganic filler and plasticizer As is clear from the results of Tables 3 and 4, the microporous membranes of Embodiment 2 are suitable separators capable of improving the cycle property of electricity storage devices.

Embodiment 3

Next, Embodiment 3 is more specifically described with reference to Examples and Comparative Examples; however, Embodiment 3 is not limited to following Examples unless the gist of Embodiment 3 is exceeded. The physical properties in Examples were measured with the following methods.

The viscosity average molecular weight (Mv), the membrane thickness, the porosity, the air permeability, the puncture strength and the plasticizer oil absorption amount of the inorganic filler were measured in the same manner as in Examples of Embodiment 2.

(1) Melting Point (° C.)

The melting point was measured with the DSC 60 manufactured by Shimadzu Corp. A sample (3 mg) was sampled and used as a measurement sample. The sample was spread over an aluminum open sample pan of 5 mm in diameter, and a cramping cover was placed thereon, and fixed in the pan with a sample sealer. The measurement was performed from 30° C. to 200° C. at a temperature increase rate of 10° C./min in a nitrogen atmosphere to obtain a melting endothermic curve. For the obtained melting endothermic curve, a straight base line was drawn in the range from 85° C. to 175° C., and a heat quantity was calculated from the area of the section surrounded by the straight base line and the melting endothermic curve. This heat quantity was converted into a value per unit mass of the sample to derive the heat of fusion. The temperature corresponding to the minimum value of the heat of fusion ΔH and the temperature corresponding to the minimum of the melting endothermic curve was measured as the melting point.

(2) Primary Particle Size (nm) of Inorganic Particle

A measurement object was sampled from a laminated separator and subjected to an observation with a scanning electron microscope at a magnification of 30,000 times, and thus the particle sizes of the inorganic particles were identified in a 3.0 μm×3.0 μm field of view. The term "primary particle size" as referred to herein means the particle size in the condition that the individual particles are independently dispersed in a matrix, or when the particles are aggregated, the primary particle size means the size of the smallest aggregate particle of the aggregated particles. An average value of the observed values at ten different positions was taken as the measured value.

(3) Cycle Property (%/100 Times)

a. Preparation of Positive Electrode

A slurry was prepared by dispersing 92.2% by mass of a lithium cobalt composite oxide ($LiCoO_2$) as a positive electrode active material, 2.3% by mass of a scale-like graphite and 2.3% by mass of acetylene black, both being conductive, and 3.2% by mass of polyvinylidene fluoride (PVDF) as a binder in N-methylpyrrolidone (NMP). The slurry was applied onto one side of a 20-μm thick aluminum foil to be a positive electrode current collector with a die coater, dried at 130° C. for 3 minutes, and then compression molded with a roll press. In this case, the coating amount of the active material of the positive electrode was regulated to be 250 $g/m^2$ and the active material bulk density of the positive electrode was regulated to be 3.00 $g/cm^3$.

b. Preparation of Negative Electrode

A slurry was prepared by dispersing 96.9% by mass of an artificial graphite as a negative electrode active material, and 1.4% by mass of an ammonium salt of carboxymethyl cellulose and 1.7% by mass of a styrene-butadiene copolymer latex, both being binders, in purified water. The slurry was applied onto one side of a 12-μm thick copper foil to be a negative electrode current collector with a die coater, dried at 120° C. for 3 minutes, and then compression molded with a roll press. In this case, the coating amount of the active material of the negative electrode was regulated to be 106 $g/m^2$ and the active material bulk density of the negative electrode was regulated to be 1.35 $g/cm^3$.

c. Preparation of Nonaqueous Electrolyte

A nonaqueous electrolyte was prepared by dissolving $LiPF_6$ as a solute in a mixed solvent of ethylene carbonate:ethyl methyl carbonate=1:2 (volume ratio) so as for the concentration to be 1.0 mol/L.

d. Assembly of Battery

The separator was cut out as a 30-mm ϕ disc, and the positive electrode and the negative electrode were each cut out as a 16-mm ϕ disc. The negative electrode, the separator and the positive electrode were superposed in this order so as for the active material sides of the positive electrode and the negative electrode to face each other, and the resulting superposed assembly was housed in a stainless steel vessel with a lid. The vessel and the lid were insulated, and the vessel was brought into contact with the copper foil of the negative electrode and the lid was brought into contact with the aluminum foil of the positive electrode. The above-described nonaqueous electrolyte was injected into the vessel and the vessel was hermetically sealed. The assembled battery was allowed to stand at room temperature for 1 day, and then the first charge of the battery subsequent to the assembly of the battery was performed for a total time of 8 hours in such a way that the battery was charged in an atmosphere of 25° C. with a current value of 2.0 mA (0.33 C) until the battery voltage reached 4.2 V; after the attainment of 4.2 V, while the battery voltage was being regulated to hold 4.2 V, the current value was decreased starting from 2.0 mA. Successively, the battery was discharged down to a battery voltage of 3.0 V with a current value of 2.0 mA (0.33 C).

e. Capacity Retention Ratio (%)

In the atmosphere of 60° C., 100 cycles of charge and discharge were performed. The charge of the battery was performed for a total time of 3 hours in such a way that the battery was charged with a current value of 6.0 mA (1.0 C) until the battery voltage reached 4.2 V; after the attainment of 4.2 V, while the battery voltage was being regulated to hold 4.2 V, the current value was decreased starting from 6.0 mA. The discharge of the battery was performed with a current value of 6.0 mA (1.0 C) until the battery voltage reached 3.0 V. From the discharge capacity of the 100th cycle and the discharge capacity of the first cycle, the capacity retention ratio was calculated. The cases where the capacity retention ratio was high were evaluated to have a satisfactory cycle property.

(4) Evaluation of High-Temperature Storage Property (%)

The charge of a simple battery assembled as described in the aforementioned a to d was performed in an atmosphere of 25° C., for a total time of 6 hours in such a way that the battery was charged with a current value of 3 mA (about 0.5 C) until the battery voltage reached 4.2 V; after the attainment of 4.2 V, while the battery voltage was being regulated to hold 4.2 V, the current value was decreased starting from 3 mA. Then the battery was discharged with a current value of 3 mA until the battery voltage reached 3.0 V.

Next, the charge of the battery was performed in an atmosphere of 25° C., for a total time of 3 hours in such a way that the battery was charged with a current value of 6 mA (about 1.0 C) until the battery voltage reached 4.2 V; after the attainment of 4.2 V, while the battery voltage was being regulated to hold 4.2 V, the current value was decreased starting from 6 mA. Then, the battery was discharged with a current value of 6 mA until the battery voltage reached 3.0 V. The discharge capacity in this case was represented by A (mAh).

Next, the charge of the battery was performed in an atmosphere of 25° C., for a total time of 3 hours in such a way that the battery was charged with a current value of 6 mA (about 1.0 C) until the battery voltage reached 4.2 V; after the attainment of 4.2 V, while the battery voltage was being regulated to hold 4.2 V, the current value was decreased starting from 6 mA. The battery maintained in a charged state was allowed to stand in an atmosphere of 60° C. for 7 days. Then, the battery was taken out from such an atmosphere, and was discharged in an atmosphere of 25° C. with a current value of 6 mA until the battery voltage reached 3.0 V. Next, the charge of the battery was performed in an atmosphere of 25° C., for a total time of 3 hours in such a way that the battery was charged with a current value of 6 mA (about 1.0 C) until the battery voltage reached 4.2 V; after the attainment of 4.2 V, while the battery voltage was being regulated to hold 4.2 V, the current value was decreased starting from 6 mA. Then, the battery was discharged with a current value of 6 mA until the battery voltage reached 3.0 V. The discharge capacity in this case was represented by B (mAh). From the ratio of B to A, the capacity retention ratio was calculated as the high-temperature storage property.

(5) Shutdown Temperature (° C.) and Short-Circuit Temperature (° C.)

FIG. 1(A) schematically shows a shutdown temperature measurement apparatus. Item 1 represents a microporous membrane (a laminated separator as a measurement object), reference 2A and 2B represent 10-μm thick nickel foils, and reference 3A and 3B represent glass plates. Item 4 represents an electrical resistance measurement apparatus (AG-4311 (trademark), an LCR meter, manufactured by Ando Electric Co., Ltd.) which is connected to the nickel foils 2A and 2B. Item 5 represents a thermocouple which is connected to a thermometer 6. Item 7 represents a data collector which is connected to the electrical resistance measurement apparatus 4 and the thermometer 6. Item 8 represents an oven which is used for heating the microporous membrane.

More specifically, as shown in FIG. 1(B), the microporous membrane 1 was superposed on the nickel foil 2A, and longitudinally fixed to the nickel foil 2A with a TEFLON tape (including PTFE; the shaded section in the figure). The microporous membrane 1 was impregnated with a 1 mol/liter lithium borofluoride solution (solvent: propylene carbonate/ethylene carbonate/γ-butyl lactone=1/1/2). Onto the nickel foil 2B, as shown in FIG. 1(C), a TEFLON tape (including PTFE; the shaded section in the figure) was bonded, and thus the nickel foil 2B was masked with a 15 mm×10 mm window section left unmasked in the central section of the foil 2B.

The nickel foil 2A and the nickel foil 2B were superposed on each other so as to sandwich the microporous membrane 1, and the two-sheets of the nickel foils were sandwiched from the both sides with the glass plates 3A and 3B. In this case, the window section of the foil 2B and the microporous membrane 1 were arranged so as to face each other.

The two sheets of the glass plates were fixed by clipping with commercially available double clips. The thermocouple 5 was fixed onto the glass plates with a TEFLON tape including PTFE.

With such an apparatus, the temperature and the electrical resistance were continuously measured. The temperature was increased from 25° C. to 200° C. at a rate of 2° C./min, and the electrical resistance was measured with an alternating current of 1 V and 1 kHz. The shutdown temperature was defined as the temperature where the electrical resistance of the microporous membrane reached $10^3 \Omega$. The short-circuit temperature was defined as the temperature where after the membrane underwent shutdown and the pores reached a blocked condition, the impedance again reached a value smaller than $10^3 \Omega$.

(6) Content of Copolymerized Monomers

The identification of the comonomers (ethylene and α-olefin) in the propylene copolymer and the measurement of the content of the comonomers were performed on the basis of a method on the 13C-NMR method (Macromolecules, 10, 537 (1977)) reported by C. J. Carman et al.

(7) Average Pore Size

As is known, a fluid inside a capillary follows the Poiseuille flow when the mean free path of the fluid is smaller than the inner diameter of the capillary, and follows the Knudsen flow when the mean free path of the fluid is larger than the inner diameter of the capillary. On the assumption that the air flow in the air permeability measurement follows the Knudsen flow and the water flow in the water permeability measurement at normal temperature follows the Poiseuille flow, the average pore diameter d(m) and the pore tortuosity (τ) (dimensionless) can be obtained from the following formula by using the permeation rate constant of air $R_{gas}$ the permeation rate constant of water $R_{liq}$, the viscosity of water η (Pa·sec), the standard pressure Ps (101325 Pa), the porosity ε (dimensionless) and the membrane thickness L (m) and the molecular velocity of gas v (m/sec):

$$d=2v(R_{liq}/R_{gas})(16\eta/3)(1/Ps)$$

wherein $R_{gas}$ is obtained from the air permeability (sec) by using the following formula:

$$R_{gas}(m^3/(m^2 \cdot sec \cdot Pa))=0.0001/(\text{air permeability})/0.0006424/(0.01276 \times 101325),$$

and $R_{liq}$ is obtained from the water permeability (cm$^3$/(cm$^2$·sec·Pa)) by using the following formula:

$$R_{liq}(m^3/(m^2 \cdot sec \cdot Pa))=(\text{water permeability})/1000000/0.0001$$

The water permeability in the foregoing formula is measured as follows:

A microporous membrane which has been immersed in ethanol in advance is set in a stainless steel liquid-permeability cell having a diameter of 42 mm, the ethanol remaining on the membrane is washed away with water, and then the membrane is permeated with water at a differential pressure of about 50000 Pa, and the amount of the permeated water (cm$^3$) at an elapsed time of 120 seconds is measured. From the measured amount of the permeated water, the amount of the permeated water per unit time, unit pressure and unit area is calculated, and the calculated value is taken as the water permeability (to be the water permeability (cm$^3$/(cm$^2$·sec·Pa)).

The molecular velocity of gas v (m/sec) is obtained from the gas constant R (8.3114 J/mol·K), the absolute temperature T (K), the circular constant π and the average molecular weight of the air M (=2.896×10$^{-2}$) (kg/mol):

$$v^2=8RT/\pi M$$

Example 3-1

A raw material mixture was prepared by mixing 50.4 parts by mass of a polypropylene (melting point: 163° C.) having a viscosity average molecular weight of 400,000, 12.6 parts by mass of a propylene-ethylene random copolymer (melting point: 140° C.) having a viscosity average molecular weight of 250,000, an ethylene content of 5% by mass and a heat of fusion of 70 J/g, 0.3 part by mass of bis(p-ethylbenzylidene) sorbitol as a nucleating agent, 0.2 part by mass of tetrakis-[methylene-(3',5'-di-t-butyl-4'-hydroxyphenyl) propionate] methane as an antioxidant and 63 parts by mass of a paraffin oil (P350P, plasticizer density: 0.868 g/cm$^3$, manufactured by Matsumura Oil Research Corp.). The resulting raw material mixture was kneaded with a batch-type melt kneader (Laboplastomill, manufactured by Toyo Seiki Seisaku-sho, Ltd.) at 200° C. at 50 rpm for 10 minutes. The resulting kneaded mixture was molded at 5 MPa with a hot press set at 200° C., and heat treated as it was for 3 minutes, and then cooled at 5 MPa with a water-cooling press controlled at 25° C. to form a 500-μm thick sheet. The sheet was stretched at 125° C. 5 times×5 times with a simultaneous biaxial stretching machine (manufactured by Toyo Seiki Seisaku-sho, Ltd.), then the paraffin oil was extracted and removed with methylene chloride, and the sheet was dried. The physical properties of the obtained polyethylene microporous membrane are shown in Table 5.

Examples 3-2 to 3-8 and Comparative Examples 3-1 to 3-4

Polyethylene microporous membranes were obtained in the same manner as in Example 3-1 except for the conditions shown in Table 5. The physical properties of the obtained polyethylene microporous membranes are shown in Table 5.

The oil absorption amount of the silica used as the inorganic filler was 200 mL/100 g.

The viscosity average molecular weight and the melting point of the high-density polyethylene used were 250,000 and 137° C., respectively.

Example 3-9

The raw material mixture for the surface layer was prepared by mixing 50.4 parts by mass of a polypropylene (melting point: 163° C.) having a viscosity average molecular weight of 400,000, 12.6 parts by mass of a propylene-ethylene random copolymer (melting point: 140° C., heat of fusion: 70 J/g) having a viscosity average molecular weight of 250,000 and an ethylene content of 5% by mass, 0.3 part by mass of bis(p-ethylbenzylidene) sorbitol as a nucleating agent and 0.2 part by mass of tetrakis-[methylene-(3',5'-di-t-butyl-4'-hydroxyphenyl) propionate] methane as an antioxidant.

The raw material mixture for the intermediate layer was prepared by mixing 14.25 parts by mass of a high-density polyethylene 1 having a viscosity average molecular weight of 250,000 and a melting point of 137° C., 14.25 parts by mass of a high-density polyethylene 2 having a viscosity average molecular weight of 700,000 and a melting point of 137° C., 1.5 parts by mass of a polypropylene having a viscosity average molecular weight of 400,000 and a melting point of 163° C. and 0.2 part by mass of tetrakis-[methylene-(3',5'-di-t-butyl-4'-hydroxyphenyl) propionate] methane as an antioxidant.

The resulting raw material mixtures were fed through feeders to two double screw extruders each having a diameter of 25 mm and with L/D=48. Further, 63 parts by mass of a liquid paraffin and 68 parts by mass of a liquid paraffin were added to the raw material mixture for the surface layer and the raw material mixture for the intermediate layer, respectively, in such a way that, for each of these raw material mixtures, liquid paraffin was injected into the concerned double screw extruder by side feeding. The extrusion rates for the both surface layers and the intermediate layer were regulated to be 4 kg per 1 hour and 16 kg per 1 hour, respectively. After kneading under the conditions of 200° C. and 200 rpm, the kneaded raw material mixtures were extruded from a T-die, fixed to the end of each of the extruders, capable of performing coextrusion (two-type three-layer) under a condition of 200° C. Immediately, the extruded product was extruded to a roll having a surface temperature controlled at 90° C., and further cooled with a roll having a surface temperature controlled at 25° C., and thus, a 1.4-mm thick sheet was formed. The sheet was stretched 7 times×7 times under a condition of 125° C. with a simultaneous biaxial stretching machine, then immersed in methylene chloride to extract and remove the liquid paraffin, and then dried. The dried sheet was stretched with a tenter stretching machine under a condition of 120° C. in the transverse direction with a magnification of 1.5 times. Then, the stretched sheet was heat treated at 125° C. to be relaxed by 13% in the width direction, and thus a microporous membrane having a two-type three-layer structure in which the two surface layers were the same in composition, and the intermediate layer was different in composition from the surface layers. The physical properties of the obtained microporous membrane are shown in Table 6.

Examples 3-10 to 3-21 and Comparative Examples 3-5 to 3-8

Polyethylene microporous membranes were obtained in the same manner as in Example 3-9 except for the conditions shown in Table 6. The physical properties of the obtained polyethylene microporous membranes are shown in Table 6.

Example 3-22

A microporous membrane having a two-type three-layer structure was obtained in the same manner as in Example 3-9 except that the raw material for the first polyolefin microporous membrane had a composition including 24.4 parts by mass of a polypropylene (melting point: 163° C.) having a viscosity average molecular weight of 400,000, 1.2 parts by mass of a propylene-ethylene copolymer (melting point: 160° C.) having a viscosity average molecular weight of 250,000 and an ethylene content of 5% by mass, 5.9 parts by mass of a high-density polyethylene (melting point: 137° C.) having a viscosity average molecular weight of 250,000, 0.5 part by mass of a polyethylene (melting point: 120° C.) having a viscosity average molecular weight of 1000 and 8 parts by mass of silica having an average primary particle size of 15 nm.

The obtained laminated separator was excellent in the shutdown property.

The oil absorption amount of the silica used as the inorganic filler was 200 mL/100 g.

TABLE 5

| | Sample | Example 3-1 | Example 3-2 | Example 3-3 | Example 3-4 | Example 3-5 | Example 3-6 | Example 3-7 | Example 3-8 | Comparative Example 3-1 | Comparative Example 3-2 | Comparative Example 3-3 | Comparative Example 3-4 |
|---|---|---|---|---|---|---|---|---|---|---|---|---|---|
| First layer (A) | Polypropylene Mv (in units of 10000) | 40 | 40 | 40 | 40 | 40 | 40 | 40 | 40 | 40 | 40 | 40 | 40 |
| | Melting point (° C.) | 163 | 163 | 163 | 163 | 163 | 163 | 163 | 163 | 163 | 163 | 163 | 163 |
| | wt % | 80 | 20 | 80 | 80 | 64 | 51 | 39 | 29 | 90 | 80 | 64 | 90 |
| | Propylene copolymer Mv fin units of 10000) | 25 | 25 | 25 | 25 | 25 | 25 | 25 | 25 | 25 | 25 | 25 | 25 |
| | Melting point (° C.) | 140 | 140 | 134 | 140 | 140 | 140 | 140 | 140 | 140 | 147 | 147 | 147 |
| | Heat of fusion (J/g) | 70 | 70 | 65 | 70 | 70 | 70 | 70 | 70 | 70 | 70 | 70 | 70 |
| | Polymerization form | Random | Random | Random | Random | Random | Random | Random | Random | Random | Random | Random | Random |
| | Content of copolymerized monomer (wt %) | 5 | 5 | 5 | 15 | 5 | 5 | 5 | 5 | 5 | 5 | 5 | 5 |
| | Type of copolymerized monomer | Ethylene | Ethylene | Ethylene | Ethylene | Ethylene | Ethylene | Ethylene | Ethylene | Ethylene | Ethylene | Ethylene | Ethylene |
| | wt % | 20 | 80 | 20 | 20 | 16 | 13 | 17 | 13 | 10 | 20 | 16 | 10 |
| | High-density polyethylene Mv fin units of 10000) | 25 | 25 | 25 | 25 | 25 | 25 | 25 | 25 | 25 | 25 | 25 | 25 |
| | Melting point (° C.) | 137 | 137 | 137 | 137 | 137 | 137 | 137 | 137 | 137 | 137 | 137 | 137 |
| | wt % | 0 | 0 | 0 | 0 | 20 | 16 | 24 | 18 | 0 | 0 | 0 | 0 |
| | Inorganic filler Type of inorganic filler | Silica | Silica | Silica | Silica | Silica | Silica | Silica | Silica | Silica | Silica | Silica | Silica |
| | Primary particle size of inorganic filler (nm) | 15 | 15 | 15 | 15 | 15 | 15 | 15 | 15 | 15 | 15 | 15 | 15 |
| | wt % | 0 | 0 | 0 | 0 | 0 | 20 | 20 | 40 | 0 | 0 | 20 | 0 |
| | Polyolefin resin concentration (wt %)*) | 37 | 37 | 37 | 37 | 37 | 37 | 37 | 37 | 37 | 37 | 37 | 37 |
| Production conditions | Layer structure | A | A | A | A | A | A | A | A | A | A | A | A |
| | Kneading temperature (° C.) | 200 | 200 | 200 | 200 | 200 | 200 | 200 | 200 | 200 | 200 | 200 | 200 |
| | First stretching Stretching temperature (° C.) | 125 | 125 | 125 | 125 | 125 | 125 | 125 | 125 | 125 | 125 | 125 | 125 |
| | Stretching magnification (times) | 5 × 5 | 5 × 5 | 5 × 5 | 5 × 5 | 5 × 5 | 5 × 5 | 5 × 5 | 5 × 5 | 5 × 5 | 5 × 5 | 5 × 5 | 5 × 5 |
| | Second stretching Stretching temperature (° C.) | — | — | — | — | — | — | — | — | — | — | — | — |
| | Stretching magnification (times) | — | — | — | — | — | — | — | — | — | — | — | — |
| Physical properties of membrane | Membrane thickness (μm) | 16 | 16 | 16 | 16 | 16 | 16 | 15 | 17 | 16 | 16 | 17 | 16 |
| | Porosity (%) | 54 | 54 | 55 | 55 | 54 | 55 | 57 | 59 | 53 | 52 | 53 | 51 |
| | Air permeability (s/100 cc) | 470 | 420 | 480 | 490 | 380 | 310 | 280 | 160 | 540 | 520 | 480 | 520 |
| | Puncture strength (g) | 300 | 300 | 360 | 360 | 300 | 300 | 290 | 310 | 200 | 210 | 240 | 230 |
| | Average pore size (μm) | 0.035 | 0.037 | 0.038 | 0.039 | 0.04 | 0.043 | 0.045 | 0.046 | 0.031 | 0.033 | 0.033 | 0.033 |
| | Cycle property (%/100 times) | 60 | 60 | 55 | 55 | 65 | 70 | 70 | 75 | 45 | 45 | 40 | 45 |
| | High-temperature storage property (%/100 times) | 65 | 66 | 62 | 63 | 64 | 68 | 66 | 70 | 65 | 65 | 66 | 65 |
| | Short-circuit temperature (° C.) | 170 | 170 | 170 | 170 | 170 | 170 | 170 | 170 | 170 | 170 | 170 | 170 |

*)Proportion of polyolefin resin in total amount of polyolefin resin, inorganic filler and plasticizer

TABLE 6

| Sample | | Example 3-9 | Example 3-10 | Example 3-11 | Example 3-12 | Example 3-13 | Example 3-14 | Example 3-15 | Example 3-16 | Example 3-17 | Example 3-18 | Example 3-19 | Example 3-20 | Example 3-21 | Comparative Example 3-5 | Comparative Example 3-6 | Comparative Example 3-7 | Comparative Example 3-8 |
|---|---|---|---|---|---|---|---|---|---|---|---|---|---|---|---|---|---|---|
| First layer (A) | Polypropylene Mv (in units of 10000) | 40 | 40 | 40 | 40 | 40 | 40 | 40 | 40 | 40 | 40 | 40 | 40 | 40 | 40 | 40 | 40 | 40 |
| | Melting point (° C.) | 163 | 163 | 163 | 163 | 163 | 163 | 163 | 163 | 163 | 163 | 163 | 163 | 163 | 163 | 163 | 163 | 163 |
| | wt % | 80 | 20 | 80 | 80 | 64 | 51 | 39 | 29 | 39 | 51 | 39 | 39 | 29 | 90 | 80 | 64 | 90 |
| | Propylene copolymer Mv (in units of 10000) | 25 | 25 | 25 | 25 | 25 | 25 | 25 | 25 | 25 | 25 | 25 | 25 | 25 | 25 | 25 | 25 | 25 |
| | Melting point (° C.) | 140 | 140 | 134 | 140 | 140 | 140 | 140 | 140 | 140 | 140 | 140 | 140 | 140 | 140 | 147 | 147 | 147 |
| | Heat of fusion (J/g) | 70 | 70 | 65 | 70 | 70 | 70 | 70 | 70 | 70 | 70 | 70 | 70 | 70 | 70 | 70 | 70 | 70 |
| | Polymerization form | Random | Random | Random | Random | Random | Random | Random | Random | Random | Random | Random | Random | Random | Random | Random | Random | Random |
| | Content of copolymerized monomer (wt %) | 5 | 5 | 15 | 15 | 5 | 5 | 5 | 5 | 5 | 5 | 5 | 5 | 5 | 5 | 5 | 5 | 5 |
| | Type of copolymerized monomer | Ethylene | Ethylene | Ethylene | Ethylene | Ethylene | Ethylene | Ethylene | Ethylene | Ethylene | Ethylene | Ethylene | Ethylene | Ethylene | Ethylene | Ethylene | Ethylene | Ethylene |
| | wt % | 20 | 80 | 20 | 20 | 16 | 13 | 17 | 13 | 17 | 13 | 17 | 17 | 13 | 10 | 20 | 16 | 10 |

TABLE 6-continued

| Sample | | | Example 3-9 | Example 3-10 | Example 3-11 | Example 3-12 | Example 3-13 | Example 3-14 | Example 3-15 | Example 3-16 | Example 3-17 | Example 3-18 | Example 3-19 | Example 3-20 | Example 3-21 | Comparative Example 3-5 | Comparative Example 3-6 | Comparative Example 3-7 | Comparative Example 3-8 |
|---|---|---|---|---|---|---|---|---|---|---|---|---|---|---|---|---|---|---|---|
| | High-density polyethylene | Mv (in units of 10000) | 25 | 25 | 25 | 25 | 25 | 25 | 25 | 25 | 25 | 25 | 25 | 25 | 25 | 25 | 25 | 25 | 25 |
| | | Melting point (° C.) | 137 | 137 | 137 | 137 | 137 | 137 | 137 | 137 | 137 | 137 | 137 | 137 | 137 | 137 | 137 | 137 | 137 |
| | | wt % | 0 | 0 | 0 | 0 | 20 | 16 | 24 | 18 | 24 | 16 | 24 | 24 | 18 | 0 | 0 | 0 | 0 |
| | Inorganic filler | Type of inorganic filler | Silica | Silica | Silica | Silica | Silica | Silica | Silica | Silica | Silica | Silica | Silica | Silica | Alumina | Silica | Silica | Silica | Silica |
| | | Primary particle size of inorganic filler (nm) | 15 | 15 | 15 | 15 | 15 | 15 | 15 | 15 | 15 | 15 | 15 | 15 | 13 | 15 | 15 | 15 | 15 |
| | | wt % | 0 | 0 | 0 | 0 | 0 | 20 | 20 | 40 | 20 | 20 | 20 | 20 | 40 | 0 | 0 | 20 | 0 |
| | Polyolefin resin concentration (wt %)* | | 37 | 37 | 37 | 37 | 37 | 37 | 37 | 37 | 37 | 37 | 37 | 37 | 37 | 37 | 37 | 37 | 37 |
| Second layer (B) | Polypropylene | Mv (in units of 10000) | 40 | 40 | 40 | 40 | 40 | 40 | 40 | 40 | 40 | 40 | 40 | 40 | 40 | 40 | 40 | 40 | 40 |
| | | Melting point (° C.) | 163 | 163 | 163 | 163 | 163 | 163 | 163 | 163 | 163 | 163 | 163 | 163 | 163 | 163 | 163 | 163 | 163 |
| | | wt % | 5 | 5 | 5 | 5 | 5 | 5 | 5 | 5 | 20 | 5 | 5 | 20 | 5 | 5 | 5 | 5 | 5 |

TABLE 6-continued

| Sample | | Example 3-9 | Example 3-10 | Example 3-11 | Example 3-12 | Example 3-13 | Example 3-14 | Example 3-15 | Example 3-16 | Example 3-17 | Example 3-18 | Example 3-19 | Example 3-20 | Example 3-21 | Comparative Example 3-5 | Comparative Example 3-6 | Comparative Example 3-7 | Comparative Example 3-8 |
|---|---|---|---|---|---|---|---|---|---|---|---|---|---|---|---|---|---|---|
| | High-density polyethylene 1 Mv (in units of 10000) | 25 | 25 | 25 | 25 | 25 | 25 | 25 | 25 | 25 | 25 | 25 | 25 | 25 | 25 | 25 | 25 | 25 |
| | Melting point (° C.) | 137 | 137 | 137 | 137 | 137 | 137 | 137 | 137 | 137 | 137 | 137 | 137 | 137 | 137 | 137 | 137 | 137 |
| | wt % | 47.5 | 47.5 | 47.5 | 47.5 | 47.5 | 47.5 | 47.5 | 47.5 | 40 | 47.5 | 47.5 | 40 | 47.5 | 47.5 | 47.5 | 47.5 | 47.5 |
| | High-density polyethylene 2 Mv (in units of 10000) | 70 | 70 | 70 | 70 | 70 | 70 | 70 | 70 | 70 | 70 | 70 | 70 | 70 | 70 | 70 | 70 | 70 |
| | Melting point (° C.) | 137 | 137 | 137 | 137 | 137 | 137 | 137 | 137 | 137 | 137 | 137 | 137 | 137 | 137 | 137 | 137 | 137 |
| | wt % | 47.5 | 47.5 | 47.5 | 47.5 | 47.5 | 47.5 | 47.5 | 47.5 | 40 | 47.5 | 47.5 | 40 | 47.5 | 47.5 | 47.5 | 47.5 | 47.5 |
| | Polyolefin resin concentration (wt %)* | 32 | 32 | 32 | 32 | 32 | 32 | 32 | 32 | 32 | 32 | 32 | 32 | 32 | 32 | 32 | 32 | 32 |
| Production conditions | Layer structure | A/B/A | A/B/A | A/B/A | A/B/A | A/B/A | A/B/A | A/B/A | A/B/A | A/B/A | B/A/B | B/A/B | B/A/B | A/B/A | A/B/A | A/B/A | A/B/A | A/B/A |
| | Kneading temperature (° C.) | 200 | 200 | 200 | 200 | 200 | 200 | 200 | 200 | 200 | 200 | 200 | 200 | 200 | 200 | 200 | 200 | 200 |
| | First stretching Stretching temperature (° C.) | 120 | 120 | 120 | 120 | 120 | 120 | 120 | 120 | 120 | 120 | 120 | 120 | 120 | 120 | 120 | 120 | 120 |

TABLE 6-continued

| Sample | | Example 3-9 | Example 3-10 | Example 3-11 | Example 3-12 | Example 3-13 | Example 3-14 | Example 3-15 | Example 3-16 | Example 3-17 | Example 3-18 | Example 3-19 | Example 3-20 | Example 3-21 | Comparative Example 3-5 | Comparative Example 3-6 | Comparative Example 3-7 | Comparative Example 3-8 |
|---|---|---|---|---|---|---|---|---|---|---|---|---|---|---|---|---|---|---|
| | Stretching magnification (times) | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 |
| | Second stretching temperature (° C.) | 120 | 120 | 120 | 120 | 120 | 120 | 120 | 120 | 120 | 120 | 120 | 120 | 120 | 120 | 120 | 120 | 120 |
| | Stretching magnification (times) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Thickness ratio | 1/8/1 | 1/8/1 | 1/8/1 | 1/8/1 | 1/8/1 | 1/8/1 | 1/8/1 | 1/8/1 | 1/8/1 | 2/1/2 | 2/1/2 | 2/1/2 | 1/8/1 | 1/8/1 | 1/8/1 | 1/8/1 | 1/8/1 |
| Physical properties of membrane | Membrane thickness (μm) | 14 | 14 | 14 | 14 | 14 | 14 | 14 | 14 | 14 | 14 | 14 | 14 | 14 | 14 | 14 | 14 | 14 |
| | Porosity (%) | 45 | 46 | 44 | 46 | 48 | 50 | 50 | 52 | 50 | 49 | 50 | 50 | 51 | 45 | 46 | 50 | 44 |
| | Air permeability (S/100 cc) | 400 | 400 | 430 | 410 | 380 | 240 | 220 | 180 | 220 | 240 | 200 | 200 | 190 | 480 | 530 | 480 | 500 |
| | Puncture strength (g) | 300 | 300 | 300 | 300 | 300 | 300 | 300 | 300 | 300 | 300 | 310 | 300 | 310 | 300 | 300 | 300 | 300 |
| | Average pore size (μm) | 0.043 | 0.048 | 0.048 | 0.048 | 0.048 | 0.054 | 0.056 | 0.058 | 0.054 | 0.055 | 0.057 | 0.055 | 0.058 | 0.036 | 0.038 | 0.04 | 0.036 |

TABLE 6-continued

| Sample | Example 3-9 | Example 3-10 | Example 3-11 | Example 3-12 | Example 3-13 | Example 3-14 | Example 3-15 | Example 3-16 | Example 3-17 | Example 3-18 | Example 3-19 | Example 3-20 | Example 3-21 | Comparative Example 3-5 | Comparative Example 3-6 | Comparative Example 3-7 | Comparative Example 3-8 |
|---|---|---|---|---|---|---|---|---|---|---|---|---|---|---|---|---|---|
| Cycle property (%/100 times) | 75 | 75 | 70 | 75 | 75 | 85 | 85 | 90 | 85 | 85 | 85 | 85 | 90 | 60 | 55 | 60 | 55 |
| High-temperature storage property (%/100 times) | 72 | 72 | 70 | 72 | 68 | 77 | 74 | 82 | 74 | 76 | 72 | 68 | 83 | 72 | 72 | 73 | 72 |
| Short-circuit temperature (° C.) | 200< | 200< | 200< | 200< | 200< | 200< | 200< | 200< | 200< | 200< | 200< | 200< | 200< | 200< | 200< | 200< | 200< |

*)Proportion of polyolefin resin in total amount of polyolefin resin, inorganic filler and plasticizer As is clear from the results of Tables 5 and 6, the microporous membranes of Embodiment 3 are suitable separators capable of improving the cycle property of electricity storage devices.

Embodiment 4

Next, Embodiment 4 is more specifically described with reference to Examples and Comparative Examples; however, Embodiment 4 is not limited to following Examples unless the gist of Embodiment 4 is exceeded. The physical properties in Examples were measured with the following methods.

The following properties were measured in the same manners as in Examples of foregoing Embodiments 2 and 3: the viscosity average molecular weight (Mv), the melting point, the primary particle size of the inorganic particle, the membrane thickness, the porosity, the air permeability, the puncture strength, the cycle property, the evaluation of the high-temperature storage property, the shutdown temperature, the short-circuit temperature, the content of the copolymerized monomer, and the plasticizer oil absorption amount of the inorganic filler.

Example 4-1

A raw material mixture was prepared by mixing 12.9 parts by mass of a polypropylene (melting point: 163° C.) having a viscosity average molecular weight of 400,000, 5.7 parts by mass of a propylene-ethylene random copolymer (melting point: 140° C.) having a viscosity average molecular weight of 250,000 and an ethylene content of 5% by mass, 8.0 parts by mass of a high-density polyethylene (melting point: 137° C.) having a viscosity average molecular weight of 250,000, 8 parts by mass of silica (oil absorption amount: 200 ml/100 g), 0.3 part by mass of bis(p-ethylbenzylidene) sorbitol as a nucleating agent, 0.2 part by mass of tetrakis-[methylene-(3',5'-di-t-butyl-4'-hydroxyphenyl) propionate] methane as an antioxidant and 62 parts by mass of a paraffin oil (P350P, plasticizer density: 0.868 g/cm$^3$, manufactured by Matsumura Oil Research Corp.). The resulting raw material mixture was kneaded with a batch-type melt kneader (Laboplastomill, manufactured by Toyo Seiki Seisaku-sho, Ltd.) at 200° C. at 50 rpm for 10 minutes. The resulting kneaded mixture was molded at 5 MPa with a hot press set at 200° C., and heat treated as it was for 3 minutes, and then cooled at 5 MPa with a water-cooling press controlled at 25° C. to form a 500-μm thick sheet. The sheet was stretched at 125° C. 5 times×5 times with a simultaneous biaxial stretching machine (manufactured by Toyo Seiki Seisaku-sho, Ltd.), then the paraffin oil was extracted and removed from the sheet with methylene chloride, and the sheet was dried. The physical properties of the obtained polyethylene microporous membrane are shown in Table 7.

Examples 4-2 to 4-6 and Comparative Examples 4-1 to 4-3

Polyethylene microporous membranes were obtained in the same manner as in Example 4-1 except for the conditions shown in Table 7. The physical properties of the obtained polyethylene microporous membranes are shown in Table 7.

Example 4-7

The raw material mixture for the surface layer was prepared by stirring with a mixer 16.3 parts by mass of a polypropylene (melting point: 163° C.) having a viscosity average molecular weight of 400,000, 7.2 parts by mass of a propylene-ethylene random copolymer (melting point: 140° C., heat of fusion: 70 J/g) having a viscosity average molecular weight of 250,000 and an ethylene content of 5% by mass, 10.1 parts by mass of a high-density polyethylene (melting point: 137° C.) having a viscosity average molecular weight of 250,000, 14.4 parts by mass of silica (oil absorption amount: 200 ml/100 g), 0.3 part by mass of bis(p-ethylbenzylidene) sorbitol as a nucleating agent, 0.2 part by mass of tetrakis-[methylene-(3',5'-di-t-butyl-4'-hydroxyphenyl) propionate] methane as an antioxidant and 17.3 parts by mass of a liquid paraffin (P350P, manufactured by Matsumura Oil Research Corp.) as a plasticizer.

The raw material mixture for the intermediate layer was prepared by mixing 14.25 parts by mass of a high-density polyethylene 1 having a viscosity average molecular weight of 250,000 and a melting point of 137° C., 14.25 parts by mass of a high-density polyethylene 2 having a viscosity average molecular weight of 700,000 and a melting point of 137° C., 1.5 parts by mass of a polypropylene having a viscosity average molecular weight of 400,000 and a melting point of 163° C. and 0.2 part by mass of tetrakis-[methylene-(3',5'-di-t-butyl-4'-hydroxyphenyl) propionate] methane as an antioxidant.

The resulting raw material mixtures were fed through feeders to two double screw extruders each having a diameter of 25 mm and with L/D=48. Further, 60 parts by mass of a liquid paraffin and 70 parts by mass of a liquid paraffin were added to the raw material mixture for the surface layer and the raw material mixture for the intermediate layer, respectively, in such a way that, for each of these raw material mixtures, liquid paraffin was injected into the concerned double screw extruder by side feeding. The extrusion rates for the both surface layers and the intermediate layer were regulated to be 4 kg per 1 hour and 16 kg per 1 hour, respectively. After kneading under the conditions of 200° C. and 200 rpm, the kneaded raw material mixtures were extruded from a T-die, fixed to the end of each of the extruders, capable of performing coextrusion (two-type three-layer) under a condition of 220° C. Immediately, the extruded product was extruded to a roll having a surface temperature controlled at 70° C., and further cooled with a roll having a surface temperature controlled at 25° C., and thus, a 1.4-mm thick sheet was formed. The sheet was stretched 7 times×7 times under a condition of 125° C. with a simultaneous biaxial stretching machine, then immersed in methylene chloride to extract and remove the liquid paraffin, and then dried. The dried sheet was stretched with a tenter stretching machine under a condition of 125° C. in the transverse direction with a magnification of 1.5 times. Then, the stretched sheet was heat treated at 132° C. to be relaxed by 21% in the width direction, and thus a microporous membrane having a two-type three-layer structure in which the two surface layers were the same in composition, and the intermediate layer was different in composition from the surface layers. The physical properties of the obtained microporous membrane are shown in Table 8.

Examples 4-8 to 4-17 and Comparative Examples 4-4 to 4-6

Polyethylene microporous membranes were obtained in the same manner as in Example 4-7 except for the conditions shown in Table 8. The physical properties of the obtained polyethylene microporous membranes are shown in Table 8.

Example 4-18

A microporous membrane having a two-type three-layer structure was obtained in the same manner as in Example 4-7 except that the raw material for the first polyolefin microporous membrane had a composition including 24.4 parts by mass of a polypropylene (melting point: 163° C.) having a viscosity average molecular weight of 400,000, 1.2 parts by mass of a propylene-ethylene copolymer (melting point: 160° C.) having a viscosity average molecular weight of 250,000 and an ethylene content of 5% by mass, 5.9 parts by mass of a high-density polyethylene (melting point: 137° C.) having a viscosity average molecular weight of 250,000, 0.5 part by mass of a polyethylene (melting point: 120° C.) having a viscosity average molecular weight of 1000 and 8 parts by mass of silica having an average primary particle size of 15 nm.

The obtained laminated separator was excellent in the shutdown property.

TABLE 7

| | Sample | Example 4-1 | Example 4-2 | Example 4-3 | Example 4-4 | Example 4-5 | Example 4-6 | Comparative Example 4-1 | Comparative Example 4-2 | Comparative Example 4-3 |
|---|---|---|---|---|---|---|---|---|---|---|
| First layer (A) | Polypropylene | | | | | | | | | |
| | Mv (in units of 10000) | 40 | 40 | 40 | 40 | 40 | 40 | 40 | 40 | 40 |
| | Melting point (° C.) | 163 | 163 | 163 | 163 | 163 | 163 | 163 | 163 | 163 |
| | wt % | 34 | 15 | 34 | 34 | 34 | 29 | 34 | 32 | 34 |
| | Propylene copolymer | | | | | | | | | |
| | Mv (in units of 10000) | 25 | 25 | 25 | 25 | 25 | 25 | 25 | 25 | 25 |
| | Melting point (° C.) | 140 | 140 | 125 | 140 | 140 | 140 | 152 | 140 | 105 |
| | Heat of fusion (J/g) | 70 | 70 | 70 | 40 | 70 | 70 | 70 | 70 | 70 |
| | Polymerization form | Random | Random | Random | Random | Random | Random | Random | Random | Random |
| | Type of copolymerized monomer | Ethylene | Ethylene | Ethylene | Ethylene | Ethylene | Ethylene | Ethylene | Ethylene | Ethylene |
| | Content of copolymerized monomer (wt %) | 5 | 5 | 15 | 5 | 5 | 15 | 3 | 5 | 30 |
| | wt % | 15 | 34 | 15 | 15 | 8 | 13 | 15 | 32 | 15 |
| | High-density polyethylene | | | | | | | | | |
| | Mv (in units of 10000) | 25 | 25 | 25 | 25 | 25 | 25 | 25 | 25 | 25 |
| | Melting point (° C.) | 137 | 137 | 137 | 137 | 137 | 137 | 137 | 137 | 137 |
| | wt % | 21 | 21 | 21 | 21 | 28 | 18 | 30 | 16 | 30 |
| | Inorganic filler | | | | | | | | | |
| | Type of inorganic filler | Silica | Silica | Silica | Silica | Silica | Silica | Silica | Silica | Silica |
| | Primary particle size of inorganic filler (nm) | 15 | 15 | 15 | 15 | 15 | 15 | 15 | 15 | 15 |
| | wt % | 30 | 30 | 30 | 30 | 30 | 40 | 30 | 20 | 30 |
| | Propylene copolymer/inorganic filler (mass ratio) | 0.5 | 1.1 | 0.5 | 0.5 | 0.3 | 0.3 | 0.5 | 1.6 | 0.5 |
| | Polyolefin resin concentration (wt %)*) | 38 | 38 | 38 | 38 | 38 | 38 | 38 | 38 | 38 |
| Second layer (B) | Polypropylene | | | | | | | | | |
| | Mv (in units of 10000) | | | | | | | | | |
| | Melting point (° C.) | | | | | | | | | |
| | wt % | | | | | | | | | |
| | High-density polyethylene | | | | | | | | | |
| | Mv (in units of 10000) | | | | | | | | | |
| | Melting point (° C.) | | | | | | | | | |
| | wt % | | | | | | | | | |
| | Mv (in units of 10000) | | | | | | | | | |
| | Melting point (° C.) | | | | | | | | | |
| | wt % | | | | | | | | | |
| | Polyolefin resin concentration (wt %)*) | A | A | A | A | A | A | A | A | A |
| Production conditions | Layer structure | | | | | | | | | |
| | Kneading temperature (° C.) | 200 | 200 | 200 | 200 | 200 | 200 | 200 | 200 | 200 |
| | First stretching | | | | | | | | | |
| | Stretching temperature (° C.) | 125 | 125 | 125 | 125 | 125 | 125 | 125 | 125 | 125 |
| | Stretching magnification (times) | 5 × 5 | 5 × 5 | 5 × 5 | 5 × 5 | 5 × 5 | 5 × 5 | 5 × 5 | 5 × 5 | 5 × 5 |
| | Second stretching | | | | | | | | | |
| | Stretching temperature (° C.) | — | — | — | — | — | — | — | — | — |
| | Stretching magnification (times) | — | — | — | — | — | — | — | — | — |
| Physical properties of membrane | Thickness ratio | — | — | — | — | — | — | — | — | — |
| | Membrane thickness (μm) | 18 | 18 | 16 | 18 | 19 | 19 | 18 | 17 | 18 |
| | Porosity (%) | 52 | 52 | 51 | 52 | 53 | 55 | 51 | 52 | 52 |
| | Air permeability (s/100cc) | 350 | 380 | 380 | 340 | 300 | 230 | 370 | 950 | 1200 |
| | Puncture strength (g) | 300 | 300 | 320 | 310 | 300 | 340 | 320 | 300 | 330 |
| | Cycle property (%/100 times) | 70 | 70 | 70 | 70 | 75 | 80 | 65 | 40 | 30 |
| | High-temperature storage property (%/100 times) | 66 | 64 | 63 | 61 | 60 | 70 | 65 | 55 | 50 |
| | Short-circuit temperature (° C.) | 170 | 170 | 170 | 170 | 170 | 170 | 170 | 170 | 170 |

*)Proportion of polyolefin resin in total amount of polyolefin resin, inorganic filler and plasticizer

TABLE 8

| Sample | | Example 4-7 | Example 4-8 | Example 4-9 | Example 4-10 | Example 4-11 | Example 4-12 | Example 4-13 | Example 4-14 | Example 4-15 | Example 4-16 | Example 4-17 | Comparative Example 4-4 | Comparative Example 4-5 | Comparative Example 4-6 |
|---|---|---|---|---|---|---|---|---|---|---|---|---|---|---|---|
| First layer (A) | Polypropylene Mv (in units of 10000) | 40 | 40 | 40 | 40 | 40 | 40 | 40 | 40 | 40 | 40 | 40 | 40 | 40 | 40 |
| | Melting point (° C.) | 163 | 163 | 163 | 163 | 163 | 163 | 163 | 163 | 163 | 163 | 163 | 163 | 163 | 163 |
| | wt % | 34 | 15 | 34 | 34 | 34 | 29 | 34 | 8 | 15 | 25 | 29 | 34 | 32 | 34 |
| | Propylene copolymer Mv (in units of 10000) | 25 | 25 | 25 | 25 | 25 | 25 | 25 | 25 | 25 | 25 | 25 | 25 | 25 | 25 |
| | Melting point (° C.) | 140 | 140 | 125 | 137 | 137 | 140 | 137 | 140 | 140 | 140 | 140 | 152 | 140 | 105 |
| | Heat of fusion (J/g) | 70 | 70 | 70 | 40 | 70 | 70 | 70 | 70 | 70 | 70 | 70 | 70 | 70 | 70 |
| | Polymerization form | Random | Random | Random | Random | Random | Random | Random | Random | Random | Random | Random | Random | Random | Random |
| | Type of copolymerized monomer | Ethylene | Ethylene | Ethylene | Ethylene | Ethylene | Ethylene | Ethylene | Ethylene | Ethylene | Ethylene | Ethylene | Ethylene | Ethylene | Ethylene |
| | Content of copolymerized monomer (wt %) | 5 | 5 | 5 | 5 | 5 | 5 | 5 | 5 | 5 | 5 | 5 | 3 | 5 | 30 |
| | High-density polyethylene wt % | 15 | 34 | 15 | 15 | 8 | 13 | 15 | 15 | 34 | 10 | 13 | 15 | 32 | 15 |
| | Inorganic filler Type of inorganic filler | Silica | Silica | Silica | Silica | Silica | Silica | Silica | Silica | Silica | Silica | Alumina | Silica | Silica | Silica |
| | Primary particle size of inorganic filler (nm) | 15 | 15 | 15 | 15 | 15 | 15 | 15 | 15 | 15 | 15 | 13 | 15 | 15 | 15 |
| | wt % | 30 | 30 | 30 | 30 | 30 | 40 | 30 | 30 | 30 | 50 | 40 | 30 | 20 | 30 |
| | Propylene copolymer/inorganic filler (mass ratio) | 0.5 | 1.1 | 0.5 | 0.5 | 0.3 | 0.3 | 0.5 | 0.5 | 1.1 | 0.2 | 0.3 | 0.5 | 1.6 | 0.5 |
| | Polyolefin resin concentration (wt %)* | 38 | 38 | 38 | 38 | 38 | 38 | 38 | 38 | 38 | 38 | 38 | 38 | 38 | 38 |
| Second layer (B) | Polypropylene Mv (in units of 10000) | 40 | 40 | 40 | 40 | 40 | 40 | 40 | 40 | 40 | 40 | 40 | 40 | 40 | 40 |
| | Melting point (° C.) | 163 | 163 | 163 | 163 | 163 | 163 | 163 | 163 | 163 | 163 | 163 | 163 | 163 | 163 |
| | wt % | 5 | 5 | 5 | 5 | 5 | 5 | 5 | 20 | 5 | 5 | 5 | 5 | 5 | 5 |
| | High-density polyethylene 1 Mv (in units of 10000) | 25 | 25 | 25 | 25 | 25 | 25 | 25 | 25 | 25 | 25 | 25 | 25 | 25 | 25 |
| | Melting point (° C.) | 137 | 137 | 137 | 137 | 137 | 137 | 137 | 137 | 137 | 137 | 137 | 137 | 137 | 137 |
| | wt % | 47.5 | 47.5 | 47.5 | 47.5 | 47.5 | 47.5 | 47.5 | 40 | 47.5 | 47.5 | 47.5 | 47.5 | 47.5 | 47.5 |
| | High-density polyethylene 2 Mv (in units of 10000) | 70 | 70 | 70 | 70 | 70 | 70 | 70 | 70 | 70 | 70 | 70 | 70 | 70 | 70 |
| | Melting point (° C.) | 137 | 137 | 137 | 137 | 137 | 137 | 137 | 137 | 137 | 137 | 137 | 137 | 137 | 137 |
| | wt % | 47.5 | 47.5 | 47.5 | 47.5 | 47.5 | 47.5 | 47.5 | 40 | 47.5 | 47.5 | 47.5 | 47.5 | 47.5 | 47.5 |
| | Polyolefin resin concentration (wt %)* | 32 | 32 | 32 | 32 | 32 | 32 | 32 | 32 | 32 | 32 | 32 | 32 | 32 | 32 |
| Production conditions | Layer structure | A/B/A | A/B/A | A/B/A | A/B/A | A/B/A | A/B/A | B/A/B | A/B/A | B/A/B | A/B/A | A/B/A | A/B/A | A/B/A | A/B/A |
| | Kneading temperature (° C.) | 200 | 200 | 200 | 200 | 200 | 200 | 200 | 200 | 200 | 200 | 200 | 200 | 200 | 200 |
| | First stretching Stretching temperature (° C.) | 125 | 125 | 125 | 125 | 125 | 125 | 125 | 125 | 125 | 125 | 125 | 125 | 125 | 125 |
| | Stretching magnification (times) | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 | 7 × 7 |
| | Second stretching Stretching temperature (° C.) | 132 | 132 | 132 | 132 | 132 | 132 | 132 | 132 | 132 | 132 | 132 | 132 | 132 | 132 |
| | Stretching magnification (times) | 1.5 | 1.5 | 1.5 | 1.5 | 1.5 | 1.5 | 1.5 | 1.5 | 1.5 | 1.5 | 1.5 | 1.5 | 1.5 | 1.5 |
| | Thickness ratio | 1/8/1 | 1/8/1 | 1/8/1 | 1/8/1 | 1/8/1 | 1/8/1 | 2/1/2 | 1/8/1 | 2/1/2 | 1/8/1 | 1/8/1 | 1/8/1 | 1/8/1 | 1/8/1 |
| Physical properties | Membrane thickness (μm) | 14 | 14 | 13 | 13 | 14 | 13 | 14 | 14 | 14 | 14 | 14 | 14 | 14 | 14 |

TABLE 8-continued

| Sample | | Example 4-7 | Example 4-8 | Example 4-9 | Example 4-10 | Example 4-11 | Example 4-12 | Example 4-13 | Example 4-14 | Example 4-15 | Example 4-16 | Example 4-17 | Comparative Example 4-4 | Comparative Example 4-5 | Comparative Example 4-6 |
|---|---|---|---|---|---|---|---|---|---|---|---|---|---|---|---|
| of membrane | Porosity (%) | 40 | 40 | 41 | 38 | 41 | 43 | 40 | 44 | 40 | 46 | 44 | 42 | 43 | 42 |
| | Air permeability (s/100cc) | 210 | 230 | 240 | 260 | 190 | 180 | 180 | 170 | 200 | 150 | 200 | 260 | 880 | 900 |
| | Puncture strength (g) | 300 | 300 | 320 | 310 | 300 | 340 | 300 | 300 | 300 | 300 | 320 | 320 | 300 | 330 |
| | Cycle property (%/100 times) | 90 | 85 | 80 | 75 | 80 | 95 | 90 | 90 | 85 | 95 | 90 | 65 | 50 | 45 |
| | High-temperature storage property (%/100 times) | 83 | 81 | 78 | 81 | 75 | 82 | 80 | 68 | 79 | 85 | 83 | 83 | 68 | 64 |
| | Short-circuit temperature (° C.) | 200< | 200< | 200< | 200< | 200< | 200< | 200< | 200< | 200< | 200< | 200< | 200< | 200< | 200< |

*)Proportion of polyolefin resin in total amount of polyolefin resin, inorganic filler and plasticizer As is clear from the results of Tables 7 and 8, the microporous membranes of Embodiment 4 are suitable separators capable of improving the cycle property of electricity storage devices.

The present application is based on Japanese Patent Application (Japanese Patent Application No. 2009-054795) filed at Japan Patent Office on Mar. 9, 2009, Japanese Patent Application (Japanese Patent Application No. 2009-064533) filed at Japan Patent Office on Mar. 17, 2009, Japanese Patent Application (Japanese Patent Application No. 2009-280486) filed at Japan Patent Office on Dec. 10, 2009, Japanese Patent Application (Japanese Patent Application No. 2009-280488) filed at Japan Patent Office on Dec. 10, 2009, Japanese Patent Application (Japanese Patent Application No. 2010-021859) filed at Japan Patent Office on Feb. 3, 2010, and Japanese Patent Application (Japanese Patent Application No. 2010-022481) filed at Japan Patent Office on Feb. 3, 2010, and the contents thereof are incorporated herein by reference.

INDUSTRIAL APPLICABILITY

According to the present invention, a separator having a high level of compatibility between the heat resistance, the cycle property and the shutdown property is provided. Such a separator has an industrial applicability, in particular as separators for lithium ion batteries.

Also, according to the present invention, a polyolefin microporous membrane suitable a separator capable of improving the cycle property of electricity storage devices is provided.

ITEM LIST

1: Microporous membrane
2A, 2B: Nickel foil of 10 μm in thickness
3A, 3B; Glass plate
4: Electrical resistance measurement apparatus
5: Thermocouple
6: Thermometer
7: Data collector
8: Oven

The invention claimed is:
1. A laminated separator comprising:
first polyolefin microporous layers and
a second polyolefin microporous layer which is laminated on the first polyolefin microporous layers and which is different from the first polyolefin microporous layers,
wherein at least one of the first polyolefin microporous layers and the second polyolefin microporous layer comprise an inorganic filler (i) having a primary particle size of 10 nm or more and 80 nm or less and (ii) comprising silica and/or alumina, and
wherein the inorganic filler has a concentration of 20% by mass or more and 60% by mass or less in a total amount of the polyolefin and the inorganic filler in the first polyolefin microporous layers.

2. The laminated separator according to claim 1, wherein the primary particle size is 13 nm or more and 80 nm or less.

3. The laminated separator according to claim 1, wherein the primary particle size is 10 nm or more and 63 nm or less.

4. The laminated separator according to claim 1, wherein the primary particle size is 13 nm or more and 50 nm or less.

5. The laminated separator according to claim 1, wherein an amount of polypropylene in a first polyolefin resin in the first polyolefin microporous layers is 40% by mass or more.

6. The laminated separator according to claim 1, wherein the first polyolefin microporous layers comprise a first polyolefin resin comprising polypropylene.

7. The laminated separator according to claim 1, wherein a thickness of each of the first polyolefin microporous layers is 0.5 μm or more and 3 μm or less.

8. The laminated separator according to claim 1, wherein a content of the inorganic filler in each of the first polyolefin microporous layers is different from a content of the inorganic filler in the second polyolefin microporous layer.

9. The laminated separator according to claim 1, wherein the laminated separator comprises a two-type three-layer structure comprising the first polyolefin microporous layers as surface layers and the second polyolefin microporous layer as an intermediate layer.

10. The laminated separator according to claim 1, wherein the second polyolefin microporous layer comprises a second polyolefin resin.

11. The laminated separator according to claim 10, wherein the second polyolefin resin comprises polyethylene and/or polypropylene.

12. The laminated separator according to claim 10, wherein the second polyolefin resin comprises polyolefin selected from the group consisting of polyethylene, polypropylene, polybutene, ethylene-propylene rubber, propylene-ethylene copolymer, and propylene-α-olefin copolymer.

13. The laminated separator according to claim 1, wherein concentration C2 of inorganic filler in a total amount of the polyolefin and the inorganic filler in the second polyolefin microporous layer is 0% by mass or more and 40% by mass or less.

14. The laminated separator according to claim 13, wherein a difference between concentration C1 of the inorganic filler in the total amount of the polyolefin and the inorganic filler in the first polyolefin microporous layers and concentration C2 of the inorganic filler in the total amount of the polyolefin and the inorganic filler in the second polyolefin microporous layer is from 10% by mass to 60% by mass.

15. The laminated separator according to claim 13, wherein a difference between concentration C1 of the inorganic filler in the total amount of the polyolefin and the inorganic filler in the first polyolefin microporous layers and concentration C2 of the inorganic filler in the total amount of the polyolefin and the inorganic filler in the second polyolefin microporous layer is from 20% by mass to 60% by mass.

16. The laminated separator according to claim 1, wherein both the first polyolefin microporous layers and the second polyolefin microporous layer comprise the inorganic filler (i) having primary particle size of 10 nm or more and 80 nm or less and (ii) comprising silica and/or alumina, and
a difference between concentration C1 of the inorganic filler in the total amount of the polyolefin and the inorganic filler in the first polyolefin microporous layers and concentration C2 of inorganic filler in a total amount of the polyolefin and the inorganic filler in the second polyolefin microporous layer is from 10% by mass to 60% by mass.

17. The laminated separator according to claim 16, wherein the primary particle size is 13 nm or more and 50 nm or less.

18. The laminated separator according to claim 1, wherein both the first polyolefin microporous layers and the second polyolefin microporous layer comprise the inorganic filler (i) having primary particle size of 10 nm or more and 80 nm or less and (ii) comprising silica and/or alumina, and a difference between concentration C1 of the inorganic filler in the total amount of the polyolefin and the inorganic filler in the first polyolefin microporous layers and concentration C2 of the inorganic filler in a total amount of the polyolefin and the inorganic filler in the second polyolefin microporous layer is from 20% by mass to 60% by mass.

19. The laminated separator according to claim 18, wherein the primary particle size is 13 nm or more and 50 nm or less.

* * * * *